(12) United States Patent  
Ihara et al.

(10) Patent No.: US 10,411,300 B2
(45) Date of Patent: Sep. 10, 2019

(54) ELECTROLYTIC SOLUTION MATERIAL, ELECTROLYTIC SOLUTION, AND SECONDARY BATTERY

(71) Applicant: Murata Manufacturing Co., Ltd., Kyoto (JP)

(72) Inventors: Masayuki Ihara, Fukushima (JP); Shigeru Fujita, Fukushima (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 575 days.

(21) Appl. No.: 14/454,178

(22) Filed: Aug. 7, 2014

(65) Prior Publication Data

US 2015/0056501 A1    Feb. 26, 2015

(30) Foreign Application Priority Data

Aug. 26, 2013    (JP) .................. 2013-174173

(51) Int. Cl.
 *H01M 10/0567* (2010.01)
 *H01M 10/0525* (2010.01)
 *H01M 10/05* (2010.01)

(52) U.S. Cl.
 CPC ....... *H01M 10/0567* (2013.01); *H01M 10/05* (2013.01); *H01M 10/0525* (2013.01); *H01M 2220/30* (2013.01); *H01M 2300/0028* (2013.01)

(58) Field of Classification Search
 CPC ......... H01M 10/0567; H01M 10/0568; H01M 10/0569; H01M 10/05; H01M 10/0525
 See application file for complete search history.

(56) References Cited

U.S. PATENT DOCUMENTS

| | | | | |
|---|---|---|---|---|
| 2007/0243470 A1* | 10/2007 | Yamamoto | ........ | H01M 10/0567 429/326 |
| 2009/0325065 A1* | 12/2009 | Fujii | ........ | H01M 4/04 429/199 |
| 2010/0047695 A1* | 2/2010 | Smart | ........ | H01M 10/0567 429/307 |
| 2010/0124707 A1* | 5/2010 | Hirose | ........ | H01M 4/1395 429/331 |
| 2011/0183218 A1* | 7/2011 | Odani | ........ | H01M 6/164 429/338 |
| 2011/0281179 A1* | 11/2011 | Abe | ........ | H01M 6/168 429/332 |
| 2011/0311886 A1* | 12/2011 | Funada | ........ | H01M 10/0525 429/338 |

FOREIGN PATENT DOCUMENTS

| | | |
|---|---|---|
| CN | 101740811 | 6/2010 |
| CN | 102136604 | 7/2011 |
| CN | 102224630 | 10/2011 |
| CN | 102326287 | 1/2012 |
| JP | 10-247517 | 9/1998 |
| JP | 11-067211 | 3/1999 |
| JP | 11-073964 | 3/1999 |
| JP | H111-073991 A | 3/1999 |
| JP | 2000-030685 | 1/2000 |
| JP | 2000-149904 | 5/2000 |
| JP | 2000-251943 | 9/2000 |
| JP | 2001-338684 | 12/2001 |
| JP | 2003-123837 | 4/2003 |
| JP | 2003-197172 | 7/2003 |
| JP | 2003-282063 | 10/2003 |
| JP | 2006-209995 | 8/2006 |
| JP | 2007-317654 A | 12/2007 |
| JP | 2010-282906 A | 12/2010 |
| JP | 2011-108454 A | 6/2011 |
| JP | 2011-154987 A | 8/2011 |
| JP | 2013-131394 A | 7/2013 |
| JP | 2013-131395 A | 7/2013 |

OTHER PUBLICATIONS

Machine translation of CN 102326287, published on Jan. 18, 2012 (Year: 2012).*
Machine translation of CN 101740811, published on Jun. 16, 2010 (Year: 2010).*
Machine translation of CN 102136604, published on Jul. 27, 2011 (Year: 2011).*
Machine translation of CN 102224630, published on Oct. 19, 2011 (Year: 2011).*
Japanese Office Action dated Nov. 22, 2016 in corresponding Japanese application No. 2013-174173 (4 pages).
Chinese Office Action dated Jan. 22, 2018 in corresponding Chinese Application No. 201410409225.2.
Chinese Office Action dated Sep. 3, 2018 in corresponding Chinese Application No. 201410409225.
Chinese Search Report dated Aug. 27, 2018 in corresponding Chinese Application No. 201410409225.
Chinese Office Action dated Apr. 28, 2019 in corresponding Chinese Application No. 201410409225.2.
Chinese Office Action dated Feb. 25, 2019 in corresponding Chinese Application No. 201410409225.2.

* cited by examiner

*Primary Examiner* — Anca Eoff
(74) *Attorney, Agent, or Firm* — K&L Gates LLP

(57) ABSTRACT

A secondary battery includes a cathode, an anode, and an electrolytic solution. The electrolytic solution contains an electrolytic solution material together with a nonaqueous solvent and an electrolyte salt. The electrolytic solution material includes one or more of first unsaturated compounds and second unsaturated compounds represented, and one or more of phenol-type compounds, phosphorus-containing compounds, and sulfur-containing compounds.

8 Claims, 6 Drawing Sheets

ELECTROLYTIC SOLUTION MATERIAL, ELECTROLYTIC SOLUTION, AND SECONDARY BATTERY

CROSS REFERENCES TO RELATED APPLICATIONS

The present application claims priority to Japanese Priority Patent Application JP 2013-174173 filed in the Japan Patent Office on Aug. 26, 2013, the entire content of which is hereby incorporated by reference.

BACKGROUND

The present application relates to an electrolytic solution material used for an electrolytic solution of a secondary battery, and to an electrolytic solution and a secondary battery that use the electrolytic solution material.

In recent years, various electronic apparatuses such as a mobile phone and a personal digital assistant (PDA) have been widely used, and it has been demanded to further reduce the size and the weight of the electronic apparatuses and to achieve their long lives. Accordingly, as an electric power source for the electronic apparatuses, a battery, in particular, a small and light-weight secondary battery capable of providing high energy density has been developed.

In these days, it has been considered to apply such a secondary battery not only to the foregoing electronic apparatuses but also to various applications. Examples of such various applications may include a battery pack attachably and detachably mounted on the electronic apparatuses or the like, an electric vehicle such as an electric automobile, an electric power storage system such as a home electric power server, and an electric power tool such as an electric drill.

Secondary batteries utilizing various charge and discharge principles to obtain a battery capacity have been proposed. In particular, a secondary battery that obtains a battery capacity by utilizing insertion and extraction of an electrode reactant or precipitation and dissolution of an electrode reactant has attracted attention, since such a secondary battery provides higher energy density than a lead battery, a nickel-cadmium battery, etc.

The secondary battery includes a cathode, an anode, and an electrolytic solution. The electrolytic solution contains a solvent and an electrolyte salt. Since the composition of the electrolytic solution serving as a medium of a charge-discharge reaction largely affects performance of the secondary battery, various considerations have been made on the composition of the electrolytic solution.

Specifically, considerations have been made on various materials as additives of the electrolytic solution. In order to obtain a long life and a high capacity retention ratio, 4-methylene-1,3-dioxolane-2-one or the like has been used (for example, see Japanese Unexamined Patent Application Publication (Translation of PCT application) No. 2010-533359). In order to suppress degradation of battery characteristics under high-temperature environment, a phenol-based antioxidant or the like has been used together with halogenated ester carbonate (for example, see Japanese Unexamined Patent Application Publication No. 2011-154987). In order to improve high-temperature conservation characteristics, an antioxidant such as phenols has been used together with vinylene carbonate (for example, see Japanese Unexamined Patent Application Publication No. 2001-283906).

SUMMARY

High performance and multi-functions of electronic apparatuses, etc. have been increasingly achieved. Accordingly, use frequency of the electronic apparatuses, etc. is increased, and therefore, secondary batteries tend to be frequently charged and discharged, and the secondary batteries tend to be charged and discharged under various conditions. Further, since the electronic apparatuses, etc. are used in various environments, the secondary batteries tend to be exposed to various temperature environments. Therefore, there is room for improvement of characteristics of the secondary batteries.

It is desirable to provide an electrolytic solution material, an electrolytic solution, and a secondary battery that are capable of obtaining superior characteristics.

According to an embodiment of the present application, there is provided an electrolytic solution material including: one or more of first unsaturated compounds represented by Formula (1) and second unsaturated compounds represented by Formula (2); and one or more of phenol-type compounds represented by Formula (3), phosphorus-containing compounds represented by Formula (4), and sulfur-containing compounds represented by Formula (5),

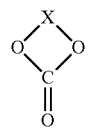
(1)

where X is a divalent group in which m-number of >C=CR1R2 and n-number of >CR3R4 are bonded in any order; each of R1 to R4 is one of a hydrogen group, a halogen group, a monovalent hydrocarbon group, a monovalent oxygen-containing hydrocarbon group, a monovalent halogenated hydrocarbon group, a monovalent halogenated oxygen-containing hydrocarbon group, and a group obtained by bonding two or more thereof to one another; any two or more of the R1 to the R4 may be bonded to one another; and m and n satisfy m≥1 and n≥0,

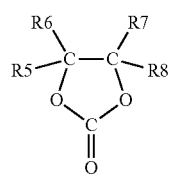
(2)

where each of R5 to R8 is one of a hydrogen group, a monovalent saturated hydrocarbon group, a monovalent unsaturated hydrocarbon group, and a group obtained by bonding two or more thereof to one another; any two or more of the R5 to the R8 may be bonded to one another; and each one or more of the R5 to the R8 is one of a monovalent unsaturated hydrocarbon group and a group obtained by bonding two or more thereof to one another,

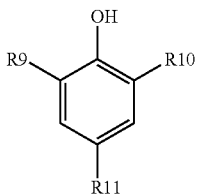

(3)

where each of R9 to R11 is one of a hydrogen group, a halogen group, a hydroxyl group, a monovalent hydrocarbon group, a monovalent oxygen-containing hydrocarbon group, a monovalent halogenated hydrocarbon group, a monovalent halogenated oxygen-containing hydrocarbon group, and a group obtained by bonding two or more thereof to one another; any two or more of the R9 to the R11 may be bonded to one another; and each of one or more of the R9 to the R11 is one of a halogen group, a hydroxyl group, a monovalent hydrocarbon group, a monovalent oxygen-containing hydrocarbon group, a monovalent halogenated hydrocarbon group, a monovalent halogenated oxygen-containing hydrocarbon group, and a group obtained by bonding two or more thereof to one another,

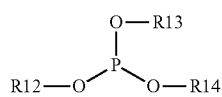

(4)

where each of R12 to R14 is one of a halogen group, a monovalent hydrocarbon group, a monovalent halogenated hydrocarbon group, and a group obtained by bonding two or more thereof to one another; and any two or more of the R12 to the R14 may be bonded to one another, $$R15\text{-}(\text{S})_p\text{-}R16 \qquad (5)$$

where each of R15 and R16 is one of a halogen group, a monovalent hydrocarbon group, a monovalent halogenated hydrocarbon group, and a group obtained by bonding two or more thereof to one another; the R15 and the R16 may be bonded to each other; and p is an integer number equal to or larger than 1.

According to an embodiment of the present application, there is provided an electrolytic solution containing an electrolytic solution material together with a nonaqueous solvent and an electrolyte salt, the electrolytic solution material including: one or more of first unsaturated compounds represented by Formula (1) and second unsaturated compounds represented by Formula (2); and one or more of phenol-type compounds represented by Formula (3), phosphorus-containing compounds represented by Formula (4), and sulfur-containing compounds represented by Formula (5),

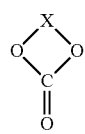

(1)

where X is a divalent group in which m-number of >C=CR1R2 and n-number of >CR3R4 are bonded in any order; each of R1 to R4 is one of a hydrogen group, a halogen group, a monovalent hydrocarbon group, a monovalent oxygen-containing hydrocarbon group, a monovalent halogenated hydrocarbon group, a monovalent halogenated oxygen-containing hydrocarbon group, and a group obtained by bonding two or more thereof to one another; any two or more of the R1 to the R4 may be bonded to one another; and m and n satisfy $m \geq 1$ and $n \geq 0$,

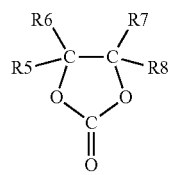

(2)

where each of R5 to R8 is one of a hydrogen group, a monovalent saturated hydrocarbon group, a monovalent unsaturated hydrocarbon group, and a group obtained by bonding two or more thereof to one another; any two or more of the R5 to the R8 may be bonded to one another; and each one or more of the R5 to the R8 is one of a monovalent unsaturated hydrocarbon group and a group obtained by bonding two or more thereof to one another,

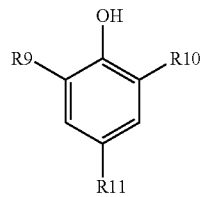

(3)

where each of R9 to R11 is one of a hydrogen group, a halogen group, a hydroxyl group, a monovalent hydrocarbon group, a monovalent oxygen-containing hydrocarbon group, a monovalent halogenated hydrocarbon group, a monovalent halogenated oxygen-containing hydrocarbon group, and a group obtained by bonding two or more thereof to one another; any two or more of the R9 to the R11 may be bonded to one another; and each of one or more of the R9 to the R11 is one of a halogen group, a hydroxyl group, a monovalent hydrocarbon group, a monovalent oxygen-containing hydrocarbon group, a monovalent halogenated hydrocarbon group, a monovalent halogenated oxygen-containing hydrocarbon group, and a group obtained by bonding two or more thereof to one another,

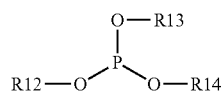

(4)

where each of R12 to R14 is one of a halogen group, a monovalent hydrocarbon group, a monovalent halogenated hydrocarbon group, and a group obtained by bonding two or more thereof to one another; and any two or more of the R12 to the R14 may be bonded to one another, $$R15\text{-}(\text{S})_p\text{-}R16 \qquad (5)$$

where each of R15 and R16 is one of a halogen group, a monovalent hydrocarbon group, a monovalent halogenated hydrocarbon group, and a group obtained by bonding two or more thereof to one another; the R15 and the R16 may be bonded to each other; and p is an integer number equal to or larger than 1.

According to an embodiment of the present application, there is provided a secondary battery provided with a cathode, an anode, and an electrolytic solution, wherein the electrolytic solution contains an electrolytic solution material together with a nonaqueous solvent and an electrolyte salt, and the electrolytic solution material includes: one or more of first unsaturated compounds represented by Formula (1) and second unsaturated compounds represented by Formula (2); and one or more of phenol-type compounds represented by Formula (3), phosphorus-containing compounds represented by Formula (4), and sulfur-containing compounds represented by Formula (5),

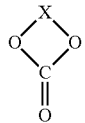
(1)

where X is a divalent group in which m-number of >C=CR1R2 and n-number of >CR3R4 are bonded in any order; each of R1 to R4 is one of a hydrogen group, a halogen group, a monovalent hydrocarbon group, a monovalent oxygen-containing hydrocarbon group, a monovalent halogenated hydrocarbon group, a monovalent halogenated oxygen-containing hydrocarbon group, and a group obtained by bonding two or more thereof to one another; any two or more of the R1 to the R4 may be bonded to one another; and m and n satisfy m≥1 and n≥0,

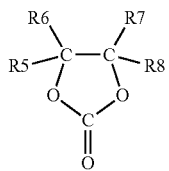
(2)

where each of R5 to R8 is one of a hydrogen group, a monovalent saturated hydrocarbon group, a monovalent unsaturated hydrocarbon group, and a group obtained by bonding two or more thereof to one another; any two or more of the R5 to the R8 may be bonded to one another; and each one or more of the R5 to the R8 is one of a monovalent unsaturated hydrocarbon group and a group obtained by bonding two or more thereof to one another,

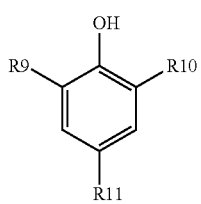
(3)

where each of R9 to R11 is one of a hydrogen group, a halogen group, a hydroxyl group, a monovalent hydrocarbon group, a monovalent oxygen-containing hydrocarbon group, a monovalent halogenated hydrocarbon group, a monovalent halogenated oxygen-containing hydrocarbon group, and a group obtained by bonding two or more thereof to one another; any two or more of the R9 to the R11 may be bonded to one another; and each of one or more of the R9 to the R11 is one of a halogen group, a hydroxyl group, a monovalent hydrocarbon group, a monovalent oxygen-containing hydrocarbon group, a monovalent halogenated hydrocarbon group, a monovalent halogenated oxygen-containing hydrocarbon group, and a group obtained by bonding two or more thereof to one another,

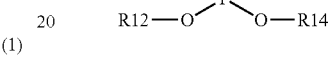
(4)

where each of R12 to R14 is one of a halogen group, a monovalent hydrocarbon group, a monovalent halogenated hydrocarbon group, and a group obtained by bonding two or more thereof to one another; and any two or more of the R12 to the R14 may be bonded to one another,

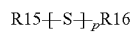
(5)

where each of R15 and R16 is one of a halogen group, a monovalent hydrocarbon group, a monovalent halogenated hydrocarbon group, and a group obtained by bonding two or more thereof to one another; the R15 and the R16 may be bonded to each other; and p is an integer number equal to or larger than 1.

According to the electrolytic solution material and the electrolytic solution according to the above-described embodiments of the present application, one or more of the first unsaturated compounds and the second unsaturated compounds and one or more of the phenol-type compounds, the phosphorus-containing compounds, and the sulfur-containing compounds are contained therein, and therefore, superior characteristics are obtainable.

According to the secondary battery according to the above-described embodiment of the present application, the electrolytic solution contains one or more of the first unsaturated compounds and the second unsaturated compounds and one or more of the phenol-type compounds, the phosphorus-containing compounds, and the sulfur-containing compounds, and therefore, superior characteristics are obtainable.

It is to be understood that both the foregoing general description and the following detailed description are exemplary, and are intended to provide further explanation of the technology as claimed.

Additional features and advantages are described herein, and will be apparent from the following Detailed Description and the figures.

BRIEF DESCRIPTION OF THE FIGURES

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION

Figure 1:
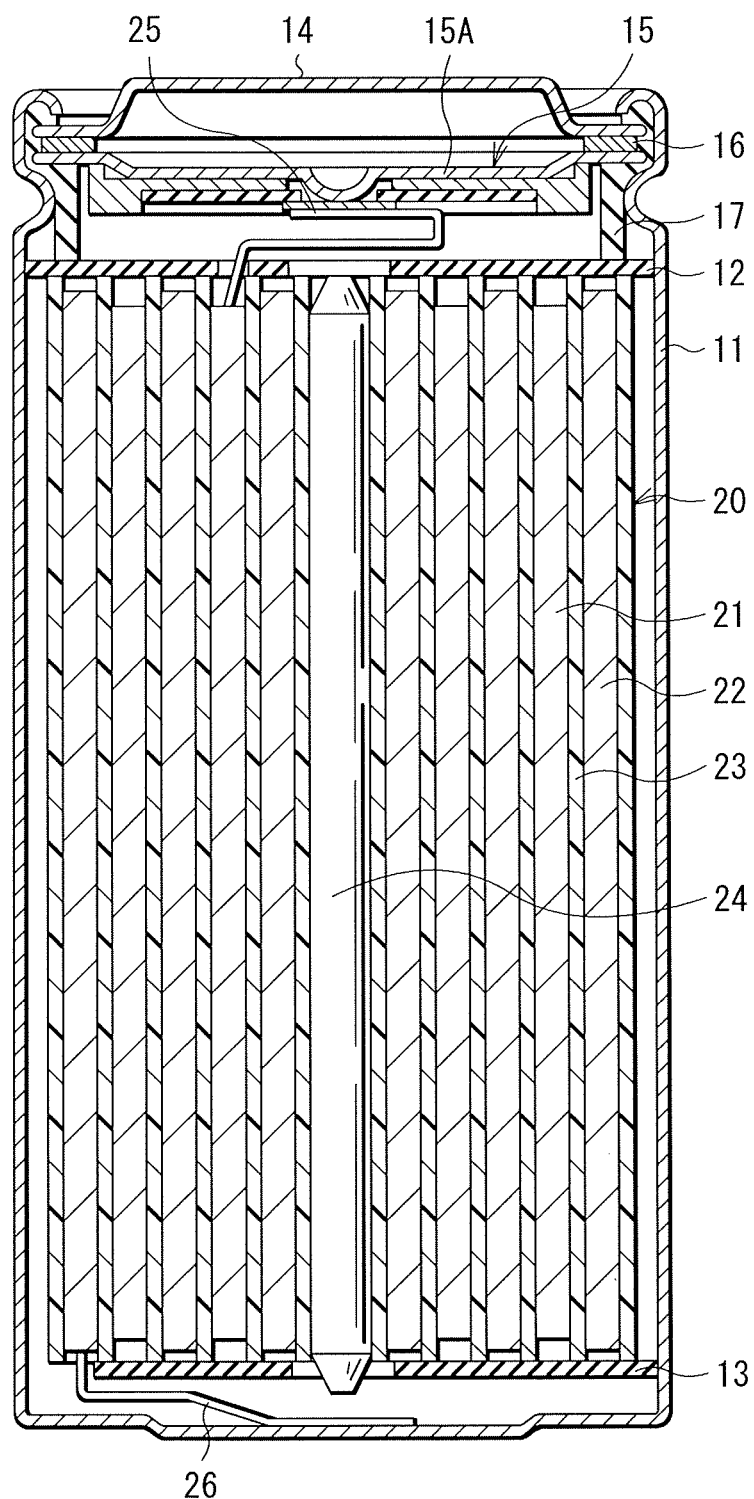
FIG. 1 is a cross-sectional view illustrating a configuration of a secondary battery (cylindrical-type) using an electrolytic solution material and an electrolytic solution according to an embodiment of the present application.

An embodiment of the present application will be described below in detail with reference to the drawings. The description will be given in the following order.
1. Electrolytic Solution Material
2. Electrolytic Solution
3. Secondary Battery
3-1. Lithium Ion Secondary Battery (Cylindrical-Type)
3-2. Lithium Ion Secondary Battery (Laminated-Film-Type)
3-3. Lithium Metal Secondary Battery
4. Applications of Secondary Battery
4-1. Battery Pack
4-2. Electric Vehicle
4-3. Electric Power Storage System
4-4. Electric Power Tool

[1. Electrolytic Solution Material]

First, description will be given of an electrolytic solution material according to an embodiment of the present application.

The electrolytic solution material described here is a material used as a component of an electrolytic solution. Applications of the electrolytic solution are not particularly limited. Examples of the applications of the electrolytic solution may include an electrochemical device such as a battery and other device.

[Configuration of Electrolytic Solution Material]

The electrolytic solution material contains any one or more of first unsaturated compounds and second unsaturated compounds and any one or more of phenol-type compounds, phosphorus-containing compounds, and sulfur-containing compounds.

The first unsaturated compound and the second unsaturated compound are a compound represented by Formula (1) and a compound represented by Formula (2), respectively. The phenol-type compound, the phosphorus-containing compound, and the sulfur-containing compound are a compound represented by Formula (3), a compound represented by Formula (4), and a compound represented by Formula (5), respectively. In the following description, the first unsaturated compound and the second unsaturated compound are also referred to collectively as the "first unsaturated compound, etc.," and the phenol-type compound, the phosphorus-containing compound, and the sulfur-containing compound are also referred to collectively as the "phenol-type compound, etc."

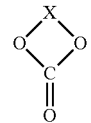

(1)

In Formula (1), X is a divalent group in which m-number of >C=CR1R2 and n-number of >CR3R4 are bonded in any order; each of R1 to R4 is one of a hydrogen group, a halogen group, a monovalent hydrocarbon group, a monovalent oxygen-containing hydrocarbon group, a monovalent halogenated hydrocarbon group, a monovalent halogenated oxygen-containing hydrocarbon group, and a group obtained by bonding two or more thereof to one another; any two or more of R1 to R4 may be bonded to one another; and m and n satisfy m≥1 and n≥0.

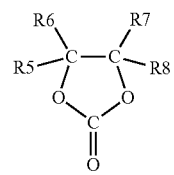

(2)

In Formula (2), each of R5 to R8 is one of a hydrogen group, a monovalent saturated hydrocarbon group, a monovalent unsaturated hydrocarbon group, and a group obtained by bonding two or more thereof to one another; any two or more of R5 to R8 may be bonded to one another; and each one or more of R5 to R8 is one of a monovalent unsaturated hydrocarbon group and a group obtained by bonding two or more thereof to one another.

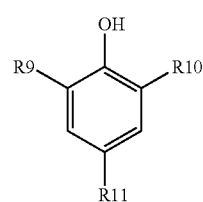

(3)

In Formula (3), each of R9 to R11 is one of a hydrogen group, a halogen group, a hydroxyl group, a monovalent hydrocarbon group, a monovalent oxygen-containing hydrocarbon group, a monovalent halogenated hydrocarbon group, a monovalent halogenated oxygen-containing hydrocarbon group, and a group obtained by bonding two or more thereof to one another; any two or more of R9 to R11 may be bonded to one another; and each of one or more of R9 to R11 is one of a halogen group, a hydroxyl group, a monovalent hydrocarbon group, a monovalent oxygen-containing hydrocarbon group, a monovalent halogenated hydrocarbon group, a monovalent halogenated oxygen-containing hydrocarbon group, and a group obtained by bonding two or more thereof to one another.

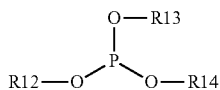
(4)

In Formula (4), each of R12 to R14 is one of a halogen group, a monovalent hydrocarbon group, a monovalent halogenated hydrocarbon group, and a group obtained by bonding two or more thereof to one another; and any two or more of R12 to R14 may be bonded to one another.

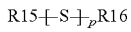
(5)

In Formula (5), each of R15 and R16 is one of a halogen group, a monovalent hydrocarbon group, a monovalent halogenated hydrocarbon group, and a group obtained by bonding two or more thereof to one another; R15 and R16 may be bonded to each other; and p is an integer number equal to or larger than 1.

The electrolytic solution material contains any of the first unsaturated compound, etc. and any of the phenol-type compound, etc. One reason for this is that, in this case, oxidation degradation of any of the first unsaturated compound, etc. is suppressed by any of the phenol-type compound, etc., and therefore, property of such any of the first unsaturated compound, etc. is less likely to be changed with time.

More specifically, examples of compounds similar to the first unsaturated compound, etc. may include after-described unsaturated cyclic ester carbonate. The first unsaturated compound, etc. and the unsaturated cyclic ester carbonate share common characteristics that each thereof has a carbon-carbon unsaturated bond (a carbon-carbon double bond) in each chemical structure.

Attention is focused on oxidation resistivity at the time of conservation as a contributing factor to affect temporal change of property. Since oxidation resistivity of the unsaturated cyclic ester carbonate is fundamentally and inherently high, oxidation degradation tends to be less likely to occur in the course of conservation thereof even when the unsaturated cyclic ester carbonate is conserved alone. Therefore, property of the unsaturated cyclic ester carbonate is easily retained without depending on presence or absence of the phenol-type compound, etc., and accordingly, the property is less likely to be changed with time originally.

In contrast, since oxidation resistivity of any of the first unsaturated compound, etc. is fundamentally and inherently low, oxidation degradation tends to easily occur in the course of conservation thereof when any of the first unsaturated compound, etc. is conserved alone. However, in the case where any of the first unsaturated compound, etc. is conserved in a state of coexisting with any of the phenol-type compound, etc., oxidation degradation of any of the first unsaturated compound, etc. is suppressed by any of the phenol-type compound, etc., and therefore, oxidation degradation becomes less likely to occur in the course of conservation thereof. Therefore, in the case where any of the first unsaturated compound, etc. coexists with any of the phenol-type compound, etc., property of any of the first unsaturated compound, etc. is easily retained despite of the foregoing fundamental and inherent tendency. Accordingly, the property is less likely to be changed with time.

That is, in the case where any of the phenol-type compound, etc. is used together with the unsaturated cyclic ester carbonate having fundamentally high oxidation resistivity, such any of the phenol-type compound, etc. does not fulfill a special function (a special effect). However, in the case where any of the phenol-type compound, etc. is used together with any of the first unsaturated compound, etc. having fundamentally low oxidation resistivity, such any of the phenol-type compound, etc. fulfills such a special function first. Such a special function refers to a function to suppress oxidation degradation of any of the first unsaturated compound, etc. in the course of conservation thereof. Therefore, in order to utilize the foregoing special function of any of the phenol-type compound, etc., it is not meaningful that the unsaturated cyclic ester carbonate coexists with the phenol-type compound, and it is meaningful that any of the first unsaturated compound, etc. coexists with the phenol-type compound.

[First Unsaturated Compound]

The first unsaturated compound shown in Formula (1) is a cyclic ester carbonate having one or more unsaturated bonds (>C═C< as carbon-carbon double bonds), where each of unsaturated bonds in the first unsaturated compound is located outside the ring, and is formed of carbon atoms (C) configuring part of the ring.

X in Formula (1) is a group obtained by bonding m-number of >C═CR1R2 and n-number of >CR3R4 so that the valency becomes divalent as a whole (one bonding hand exists on each of both ends). Adjacent groups (groups bonded to each other) may be the same type of group such as >C═CR1R2 and >C═CR1R2, or may be groups different from each other such as >C═CR1R2 and >CR3R4. That is, the number (integer number m) of >C═CR1R2 used for forming the divalent group and the number (integer number n) of >CR3R4 used for forming the divalent group may be any number, and the bonding order thereof may also be any order.

While >C═CR1R2 is a divalent unsaturated group having the foregoing carbon-carbon double bond, >CR3R4 is a divalent saturated group not having a carbon-carbon double bond. Since n satisfies n≥0, >CR3R4 as a saturated group may be included in X, and is not necessarily included in X. On the other hand, since m satisfies m≥1, it may be necessary to include one or more >C═CR1R2 as an unsaturated group in X typically. Therefore, X may be configured of only >C═CR1R2, or may be configured of both >C═CR1R2 and >CR3R4. One reason for this is that it may be necessary to include one or more unsaturated groups in a chemical structure of the first unsaturated compound.

Values of m and n are not particularly limited as long as the conditions of m≥1 and n≥0 are satisfied. In particular, in the case where >C═CR1R2 is >C═CH$_2$ and >CR3R4 is >CH$_2$, (m+n)≤5 may be preferably satisfied. One reason for this is that, in this case, the carbon number of X is not excessively large, and therefore, the solubility and the compatibility of the first unsaturated compound are secured.

It is to be noted that any two or more of R1 to R4 in >C═CR1R2 and >CR3R4 may be bonded to one another, and the bonded groups may form a ring. As an example, R1 may be bonded to R2, R3 may be bonded to R4, and R2 may be bonded to R3 or R4.

Details of R1 to R4 are described below. R1 to R4 may be the same type of group, or may be groups different from one another. Any two or three of R1 to R4 may be the same type of group.

Each type of R1 to R4 is not particularly limited as long as each of R1 to R4 is one of a hydrogen group, a halogen group, a monovalent hydrocarbon group, a monovalent oxygen-containing hydrocarbon group, a monovalent halogenated hydrocarbon group, a monovalent halogenated oxygen-containing hydrocarbon group, and a group obtained by bonding two or more thereof to one another. One reason for this is that, since, in this case, X has one or more carbon-carbon double bonds (>C=CR1R2), the foregoing advantage is obtained without depending on the types of R1 to R4.

Examples of the halogen group may include any one or more of a fluorine group (—F), a chlorine group (—Cl), a bromine group (—Br), an iodine group (—I), etc. In particular, the fluorine group may be preferable, since a higher effect is thereby obtained.

The monovalent hydrocarbon group is a generic term used to refer to monovalent groups configured of carbon (C) and hydrogen (H), and may have a straight-chain structure or a branched structure having one or more side chains. Examples of the monovalent hydrocarbon group may include any one or more of an alkyl group having carbon number from 1 to 12 both inclusive, an alkenyl group having carbon number from 2 to 12 both inclusive, an alkynyl group having carbon number from 2 to 12 both inclusive, an aryl group having carbon number from 6 to 18 both inclusive, a cycloalkyl group having carbon number from 3 to 18 both inclusive, etc. One reason for this is that, in this case, the foregoing advantage is thereby obtained while the solubility, the compatibility, etc. of the first unsaturated compound are secured.

More specific examples of the alkyl group may include a methyl group (—CH$_3$), an ethyl group (—C$_2$H$_5$), a propyl group (—C$_3$H$_7$), and a t-butyl group (—C(—CH$_3$)$_2$—CH$_3$). Examples of the alkenyl group may include a vinyl group (—CH=CH$_2$) and an allyl group (—CH$_2$—CH=CH$_2$). Examples of the alkynyl group may include an ethynyl group (—C≡CH). Examples of the aryl group may include a phenyl group and a naphtyl group. Examples of the cycloalkyl group may include a cyclopropyl group, a cyclobutyl group, a cyclopentyl group, a cyclohexyl group, a cycloheptyl group, and a cyclooctyl group.

The monovalent oxygen-containing hydrocarbon group is a generic term used to refer to monovalent groups configured of oxygen (O) together with carbon and hydrogen, and may have a straight-chain structure or a branched structure having one or more side chains. Examples of the monovalent oxygen-containing hydrocarbon group may include any one or more of an alkoxy group having carbon number from 1 to 12 both inclusive, an ester group, etc. One reason for this is that the foregoing advantage is thereby obtained while the solubility, the compatibility, etc. of the first unsaturated compound are secured. More specific examples of the alkoxy group may include a methoxy group (—OCH$_3$) and an ethoxy group (—OC$_2$H$_5$). More specific examples of the ester group may include —C$_2$H$_4$—O—C(=O)—CH$_3$, —C$_2$H$_4$—O—C(=O)—C$_2$H$_5$, and —C$_2$H$_4$—O—C(=O)—C$_8$H$_{17}$. In addition thereto, the monovalent oxygen-containing hydrocarbon group may be a group obtained by bonding two or more hydrocarbon groups to one or more oxygen bonds (—O—) in any order, and specific examples thereof may include —CH$_2$—O—CH$_2$—O—CH$_3$.

The monovalent halogenated hydrocarbon group is obtained by substituting (halogenating) each of part or all of hydrogen groups (—H) out of the foregoing monovalent hydrocarbon group by a halogen group. Similarly, the monovalent halogenated oxygen-containing hydrocarbon group is obtained by substituting each of part or all of hydrogen groups out of the foregoing monovalent oxygen-containing hydrocarbon group by a halogen group. In either case, types of the halogen group substituting for a hydrogen group are similar to the types of the halogen group described above.

Examples of the monovalent halogenated hydrocarbon group may include a group obtained by halogenating the foregoing alkyl group or the like. That is, the monovalent halogenated hydrocarbon group is a group obtained by substituting each of part or all of hydrogen groups of the foregoing alkyl group or the like by a halogen group. More specific examples of the group obtained by halogenating an alkyl group or the like may include a trifluoromethyl group (—CF$_3$) and a pentafluoroethyl group (—C$_2$F$_5$).

Examples of the monovalent halogenated oxygen-containing hydrocarbon group may include a group obtained by substituting each of part or all of hydrogen groups of the foregoing alkoxy group or the like by a halogen group. More specific examples of the group obtained by halogenating an alkoxy group or the like may include a trifluoromethoxy group (—OCF$_3$) and a pentafluoroethoxy group (—OC$_2$F$_5$).

Examples of the "group obtained by bonding two or more thereof to one another" may include a group obtained by bonding two or more of the foregoing alkyl group, etc. so that the valency becomes monovalent as a whole. Examples thereof may include a group obtained by bonding an alkyl group to an aryl group and a group obtained by bonding an alkyl group to a cycloalkyl group. More specific examples of the group obtained by bonding an alkyl group to an aryl group may include a benzyl group.

It is to be noted that each of R1 to R4 may be a group other than the foregoing groups. Specifically, each of R1 to R4 may be, for example, a derivative of each of the foregoing groups. The derivative is obtained by introducing one or more substituent groups to each of the foregoing groups. Substituent group types may be any type.

In particular, the first unsaturated compound may preferably include any one or more of compounds represented by Formula (6) and Formula (7). One reason for this is that, in this case, the foregoing advantage is obtained, and such compounds are easily synthesized.

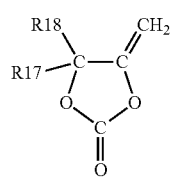

(6)

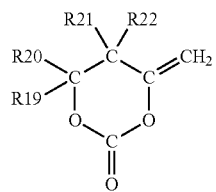

(7)

In Formulas (6) and (7), each of R17 to R22 is one of a hydrogen group, a halogen group, a monovalent hydrocarbon group, a monovalent oxygen-containing hydrocarbon group, a monovalent halogenated hydrocarbon group, a monovalent halogenated oxygen-containing hydrocarbon group, and a group obtained by bonding two or more thereof to one another; R17 and R18 may be bonded to each other; and any two or more of R19 to R22 may be bonded to one another.

Focusing attention on a relation between Formula (1) and Formula (6), the compound shown in such Formula (6) has, as X in Formula (1), one unsaturated group (>C=CH$_2$) corresponding to >C=CR1R2 and one saturated group (>CR17R18) corresponding to >CR3R4. On the other hand, focusing attention on a relation between Formula (1) and Formula (7), the compound shown in Formula (7) has, as X, one unsaturated group (>C=CH$_2$) corresponding to >C=CR1R2 and two saturated groups (>CR19R20 and >CR21R22) corresponding to >CR3R4. However, the foregoing one unsaturated group and the foregoing two saturated groups are bonded in order of >CR19R20, >CR21R22, and C=CH$_2$.

Details of R17 and R18 in Formula (6) and R19 to R22 in Formula (7) are similar to those described for R1 to R4 in Formula (1).

Specific examples of the first unsaturated compound may include any one or more of compounds represented by Formula (1-1) to Formula (1-56). Such compounds may include a geometric isomer. However, specific examples of the first unsaturated compound may include compounds other than the compounds specifically described here.

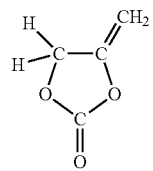
(1-1)

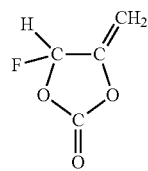
(1-2)

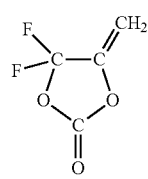
(1-3)

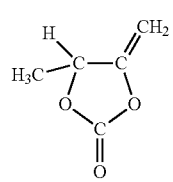
(1-4)

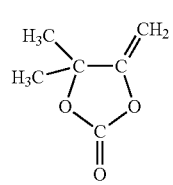
(1-5)

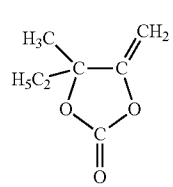
(1-6)

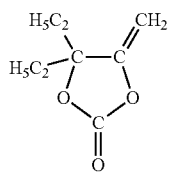
(1-7)

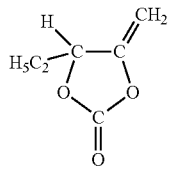
(1-8)

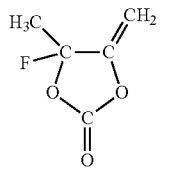
(1-9)

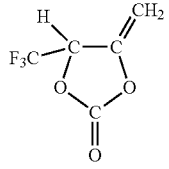
(1-10)

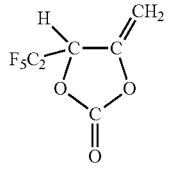
(1-11)

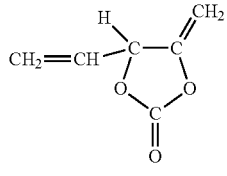
(1-12)

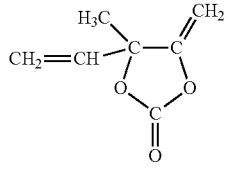
(1-13)

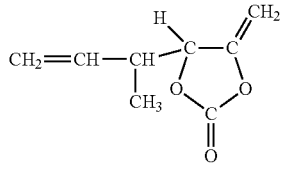
(1-14)

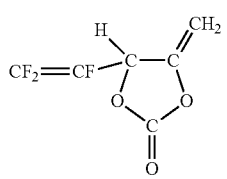
(1-15)

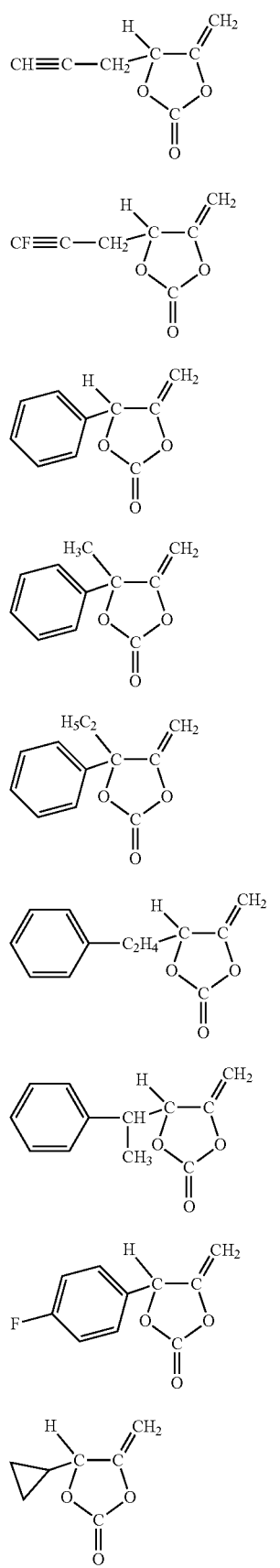
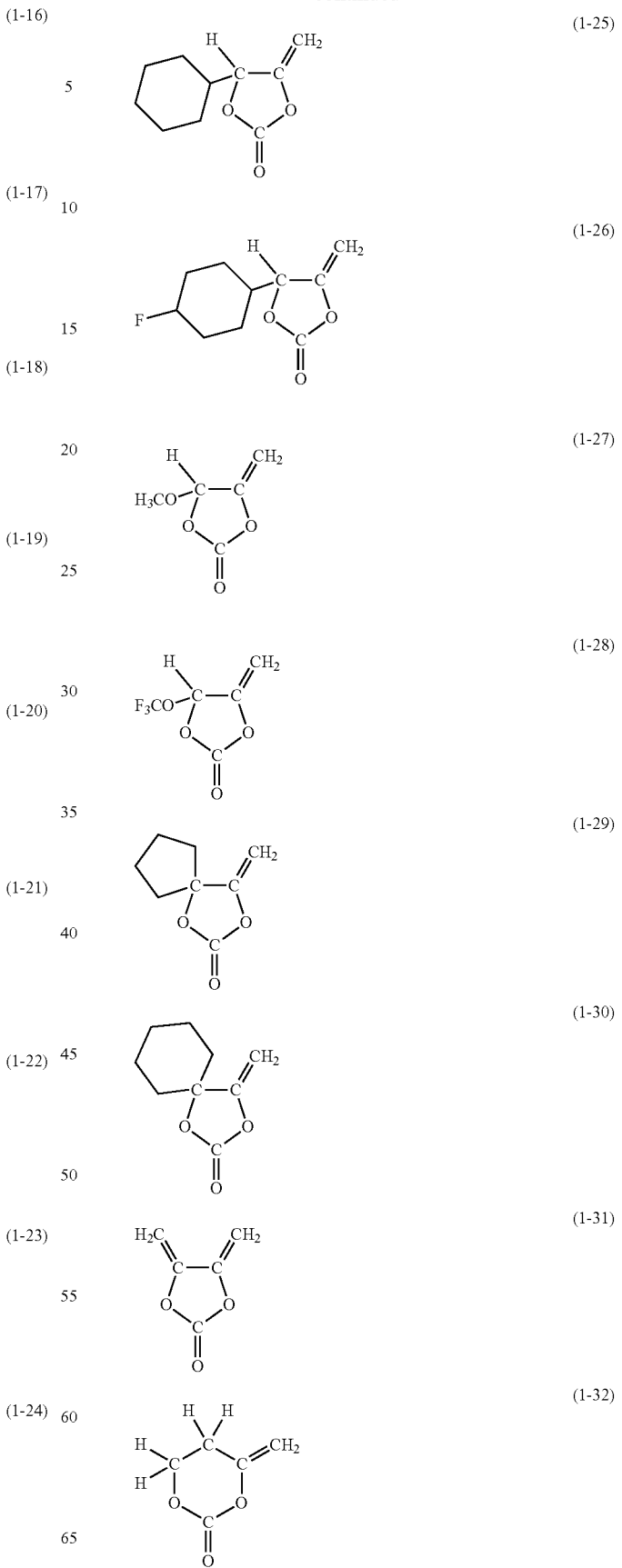

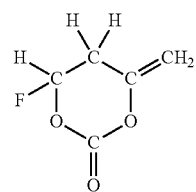 (1-33)
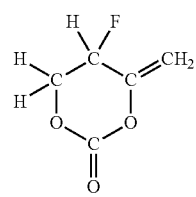 (1-34)
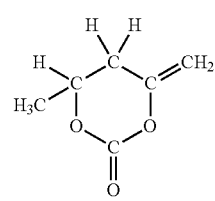 (1-35)
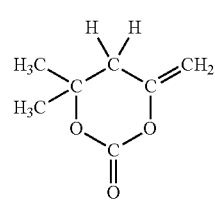 (1-36)
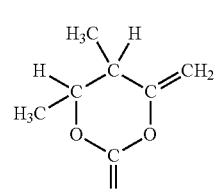 (1-37)
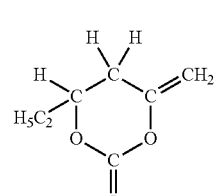 (1-38)
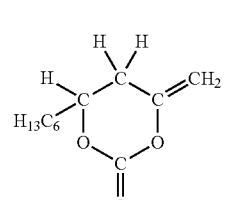 (1-39)
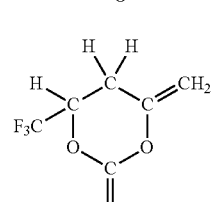 (1-40)
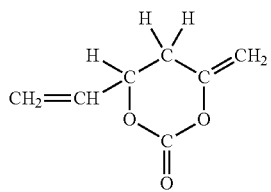 (1-41)
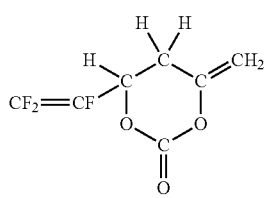 (1-42)
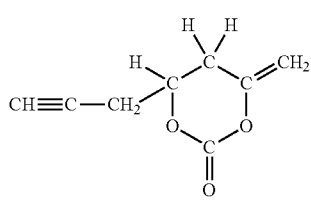 (1-43)
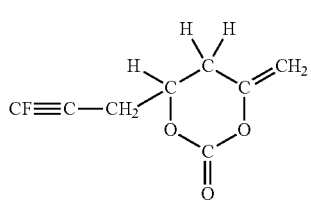 (1-44)
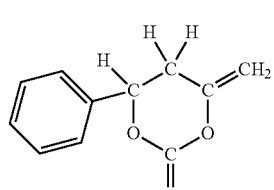 (1-45)
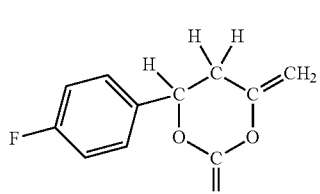 (1-46)
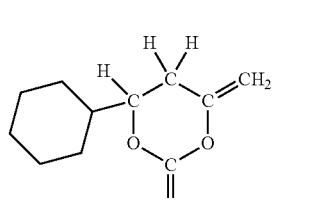 (1-47)
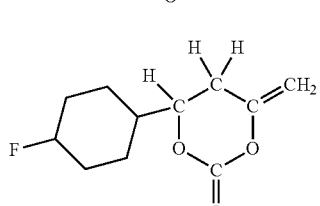 (1-48)

-continued (1-49) 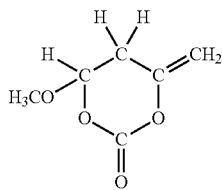

(1-50) 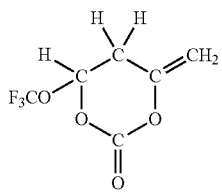

(1-51) 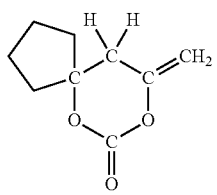

(1-52) 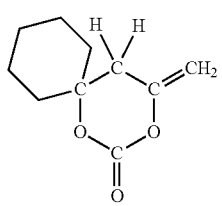

(1-53) 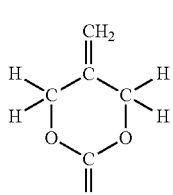

(1-54) 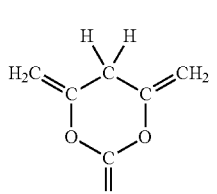

(1-55) 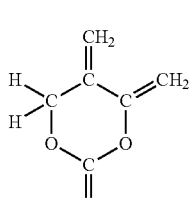

(1-56) 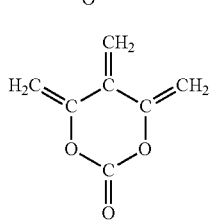

In particular, Formula (1-1), etc. corresponding to Formula (6) may be preferable, and Formula (1-32), etc. corresponding to Formula (7) may be preferable, since a higher effect is thereby obtained.

[Second Unsaturated Compound]

The second unsaturated compound shown in Formula (2) is a cyclic ester carbonate having one or more unsaturated bonds (>C=C< as carbon-carbon double bonds or —C≡C— as carbon-carbon triple bonds) as the foregoing first unsaturated compound is, where each of the unsaturated bonds in the second unsaturated compound is located outside the ring, and is formed of carbon atoms not configuring part of the ring.

Details of R5 to R8 are described below. R5 to R8 may be the same type of group, or may be groups different from one another. Any two or three of R5 to R8 may be the same type of group.

Each type of R5 to R8 is not particularly limited as long as each of R5 to R8 is one of a hydrogen group, a monovalent saturated hydrocarbon group, a monovalent unsaturated hydrocarbon group, and a group obtained by bonding two or more thereof to one another, provided that each of one or more of R5 to R8 is one of a monovalent unsaturated hydrocarbon group and a group obtained by two or more thereof. One reason for this is that, in the case where each of one or more of R5 to R8 is a monovalent unsaturated hydrocarbon group or the like, the foregoing advantage is obtained without depending on the types of R5 to R8.

The monovalent saturated hydrocarbon group is a generic term used to refer to monovalent groups that are configured of carbon and hydrogen and that do not have unsaturated bonds, and may have a straight-chain structure or a branched structure having one or more side chains. The unsaturated bond described here refers to one or both of >C=C< as a carbon-carbon double bond and —C≡C— as a carbon-carbon triple bond. Examples of the monovalent saturated hydrocarbon group may include any one or more of an alkyl group having carbon number from 1 to 12 both inclusive, a cycloalkyl group having carbon number from 3 to 18 both inclusive, etc. One reason for this is that, in this case, the foregoing advantage is thereby obtained while the solubility, the compatibility, etc. of the second unsaturated compound are secured. Specific examples of the alkyl group and the cycloalkyl group are similar to those described for the first unsaturated compound.

The monovalent unsaturated hydrocarbon group is a generic term used to refer to monovalent groups that are configured of carbon and hydrogen and that have one or more unsaturated bonds, and may have a straight-chain structure or a branched structure having one or more side chains. Examples of the monovalent unsaturated hydrocarbon group may include any one or more of an alkenyl group having carbon number from 2 to 12 both inclusive, an alkynyl group having carbon number from 2 to 12 both inclusive, an aryl group having carbon number from 6 to 18 both inclusive, etc. One reason for this is that, in this case, the foregoing advantage is thereby obtained while the solubility, the compatibility, etc. of the second unsaturated compound are secured. Specific examples of the alkenyl group, the alkynyl group, and the aryl group are similar to those described for the first unsaturated compound.

Examples of the "group obtained by bonding two or more thereof to one another" may include a group obtained by bonding two or more of the foregoing alkyl group, etc. so that the valency becomes monovalent as a whole. Specific examples of the group obtained by bonding two or more thereof to one another are similar to those described for the first unsaturated compound. However, the group obtained by bonding two or more thereof to one another in the case where R5 is a monovalent unsaturated hydrocarbon group may be a group obtained by bonding two or more monovalent unsaturated hydrocarbon groups so that the valency becomes monovalent as a whole, or may be a group obtained by bonding one or more monovalent unsaturated hydrocarbon groups to one or more saturated hydrocarbon groups so that the valency becomes monovalent as a whole. The same is applicable in the case of R6 to R8. The foregoing term "monovalent hydrocarbon group" described for the first unsaturated compound refers to a concept including both the monovalent saturated hydrocarbon group and the monovalent unsaturated hydrocarbon group described here. It is to be noted that each of R5 to R8 may be a group (such as a derivative) other than the foregoing groups.

In particular, the second unsaturated compound may preferably include any one or more of compounds represented by Formula (8). One reason for this is that, in this case, the foregoing advantage is obtained, and such compounds are allowed to be easily synthesized.

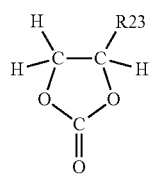
(8)

In Formula (8), R23 is one of a monovalent unsaturated hydrocarbon group and a group obtained by bonding two or more thereof to one another.

Focusing attention on a relation between Formula (2) and Formula (8), the compound shown in such Formula (8) has a hydrogen group (—H) corresponding to each of R5 to R7 in Formula (2), and has R23 corresponding to R8. Details of R23 in Formula (8) are similar to those described for R5 to R8 (monovalent unsaturated hydrocarbon group) in Formula (2).

Specific examples of the second unsaturated compound may include any one or more of compounds represented by Formula (2-1) and Formula (2-2). However, specific examples of the second unsaturated compound may include compounds other than the compounds specifically described here.

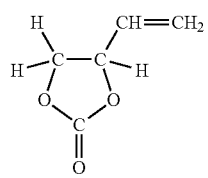
(2-1)

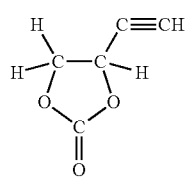
(2-2)

[Phenol-Type Compound]

The phenol-type compound shown in Formula (3) is a compound including phenol as a skeleton.

Details of R9 to R11 are described below. R9 to R11 may be the same type of group, or may be groups different from one another. Any two or three of R9 to R11 may be the same type of group.

Each type of R9 to R11 is not particularly limited as long as each of R9 to R11 is any one or more of a hydrogen group, a halogen group, a hydroxyl group, a monovalent hydrocarbon group, a monovalent oxygen-containing hydrocarbon group, a monovalent halogenated hydrocarbon group, a monovalent halogenated oxygen-containing hydrocarbon group, and a group obtained by bonding two or more thereof to one another, provided that each of one or more of R9 to R11 is one of a halogen group, a hydroxyl group, a monovalent hydrocarbon group, a monovalent oxygen-containing hydrocarbon group, a monovalent halogenated hydrocarbon group, a monovalent halogenated oxygen-containing hydrocarbon group, and a group obtained by bonding two or more thereof to one another. One reason for this is that, in the case where each of one or more of R9 to R11 is a hydroxyl group or the like, the foregoing advantage is obtainable without depending on the types of R9 to R11.

Details of the halogen group, the monovalent hydrocarbon group, the monovalent oxygen-containing hydrocarbon group, the monovalent halogenated hydrocarbon group, and the monovalent halogenated oxygen-containing hydrocarbon group are similar to those described for the first unsaturated compound. Further, details of the group obtained by bonding two or more thereof to one another are similar to those described for the first unsaturated compound, except that a hydroxyl group may be included. It is to be noted that each of R9 to R11 may be a group (such as a derivative) other than the foregoing groups.

Specific examples of the phenol-type compound may include any one or more of compounds represented by Formula (3-1) to Formula (3-5), etc. However, specific examples of the phenol-type compound may include compounds other than the compounds specifically described here.

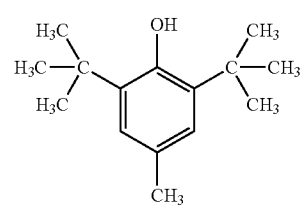
(3-1)

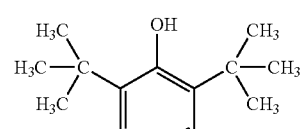
(3-2)

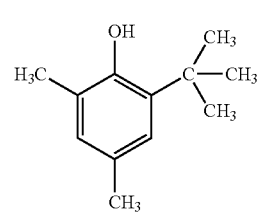
(3-3)

(3-4)

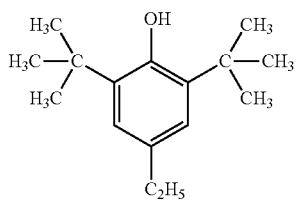

(3-5)

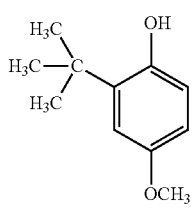

[Phosphorus-Containing Compound]

The phosphorus-containing compound shown in Formula (4) is a compound including a phosphite ester-type skeleton having phosphorus (P) as a central atom.

Details of R12 to R14 are described below. R12 to R14 may be the same type of group, or may be groups different from one another. Any two or three of R12 to R14 may be the same type of group.

Each type of R12 to R14 is not particularly limited as long as each of R12 to R14 is one or more of a halogen group, a monovalent hydrocarbon group, a monovalent halogenated hydrocarbon group, and a group obtained by bonding two or more thereof to one another. One reason for this is that, since a phosphite ester-type skeleton is formed, the foregoing advantage is obtained without depending on the types of R12 to R14.

Details of the halogen group, the monovalent hydrocarbon group, the monovalent halogenated hydrocarbon group, and the group obtained by bonding two or more thereof to one another are similar to those described for the first unsaturated compound. It is to be noted that each of R12 to R14 may be a group (such as a derivative) other than the foregoing groups.

Specific examples of the phosphorus-containing compound may include any one or more of compounds represented by Formula (4-1) and Formula (4-2). However, specific examples of the phosphorus-containing compound may include compounds other than the compounds specifically described here.

(4-1)

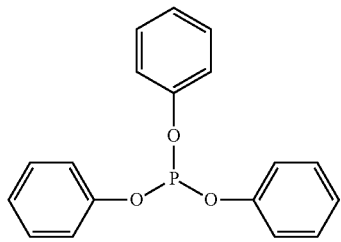

(4-2)

[Sulfur-Containing Compound]

The sulfur-containing compound shown in Formula (5) is a compound including a sulfide-type skeleton having one or more sulfur (S) atoms as central atoms.

Details of R15 and R16 are described below. R15 and R16 may be the same type of group, or may be groups different from each other. Any two or three of R15 and R16 may be the same type of group.

Each type of R15 and R16 is not particularly limited as long as each of R15 and R16 is any one or more of a halogen group, a monovalent hydrocarbon group, a monovalent halogenated hydrocarbon group, and a group obtained by bonding two or more thereof to one another. One reason for this is that, in this case, since a sulfide-type skeleton is formed, the foregoing advantage is obtained without depending on the types of R15 and R16.

Details of the halogen group, the monovalent hydrocarbon group, the monovalent halogenated hydrocarbon group, and the group obtained by bonding two or more thereof to one another are similar to those described for the first unsaturated compound. It is to be noted that each of R15 and R16 may be a group (such as a derivative) other than the foregoing groups.

Specific examples of the sulfur-containing compound may include any one or more of compounds represented by Formula (5-1) to Formula (5-3), etc. However, specific examples of the sulfur-containing compound may include compounds other than the compounds specifically described here.

(5-1)

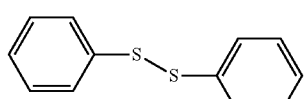

(5-2)

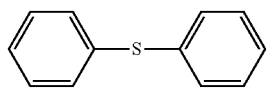

(5-3)

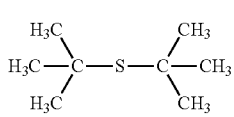

It is to be noted that each content of the first unsaturated compound, the second unsaturated compound, the phenol-type compound, the phosphorus-containing compound, and the sulfur-containing compound in the electrolytic solution material is not particularly limited.

In particular, the sum of contents of the phenol-type compound, etc. may be preferably from about 1 ppm to about 50000 ppm with respect to the sum of contents of the first unsaturated compound, etc. One reason for this is that, in this case, the amounts of the phenol-type compound, etc. having the foregoing oxidation suppression function become appropriate with respect to the amounts of the first unsaturated compound, etc. and therefore, higher effects are obtained.

[Other Configuration of Electrolytic Solution Material]

It is to be noted that the electrolytic solution material may contain, for example, any one or more of other materials in addition to the foregoing first unsaturated compound, the foregoing second unsaturated compound, the foregoing phenol-type compound, the foregoing phosphorus-containing compound, and the foregoing sulfur-containing compound.

Examples of such other materials may include any one or more of nitrogen-containing compounds represented by Formula (9). The nitrogen-containing compound shown in Formula (9) is a compound including an amine-type skeleton having nitrogen (N) as a central atom.

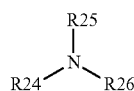

(9)

In Formula (9), each of R24 to R26 is one of a hydrogen group, a halogen group, a monovalent hydrocarbon group, a monovalent halogenated hydrocarbon group, a monovalent nitrogen-containing hydrocarbon group, and a group obtained by bonding two or more thereof to one another.

Details of R24 to R26 are described below. R24 to R26 may be the same type of group, or may be groups different from one another. Any two or three of R24 to R26 may be the same type of group.

Each type of R24 to R26 is not particularly limited as long as each of R24 to R26 is any of a hydrogen group, a halogen group, a monovalent hydrocarbon group, a monovalent halogenated hydrocarbon group, and a group obtained by bonding two or more thereof to one another. One reason for this is that, in this case, since an amine-type skeleton is formed, the foregoing advantage is obtained without depending on the types of R24 to R26.

Details of the halogen group, the monovalent hydrocarbon group, and the monovalent halogenated hydrocarbon group are similar to those described for the first unsaturated compound. The monovalent nitrogen-containing hydrocarbon group is a generic term used to refer to monovalent groups that are configured of nitrogen (N) together with carbon and hydrogen, and may be, for example, an aminophenyl group or the like. Details of the group obtained by bonding two or more thereof to one another are similar to those described for the first unsaturated compound, except that a monovalent nitrogen-containing hydrocarbon group may be included. It is to be noted that each of R24 to R26 may be a group (such as a derivative) other than the foregoing groups.

Specific examples of the nitrogen-containing compound may include any one or more of p-phenylenediamine, 4-aminodiphenylamine, N,N-dimethyl-1,4-phenylenediamine, N,N'-diphenyl-p-phenylenediamine, N-isopropyl-N'-phenyl-p-phenylenediamine, N-(1,3-dimethylbutyl)-N'-phenyl-p-phenylenediamine, N,N'-di-2-naphtyl-p-phenylenediamine, diphenylamine, N-phenyl-β-naphtylamine, 4,4'-dicumyl-diphenylamine, and 4,4'dioctyl-diphenylamine. However, specific examples of the nitrogen-containing compound may include compounds other than the compounds specifically described here.

Further examples of such other materials may include any one or more of solvents such as nonaqueous solvents.

Examples of the nonaqueous solvents may include a cyclic ester carbonate, a chain ester carbonate, lactone, a chain carboxylic ester, and nitrile, since superior solubility, superior compatibility, etc. are thereby obtained. Examples of the cyclic ester carbonate may include ethylene carbonate, propylene carbonate, and butylene carbonate. Examples of the chain ester carbonate may include dimethyl carbonate, diethyl carbonate, ethyl methyl carbonate, and methylpropyl carbonate. Examples of the lactone may include y-butyrolactone and y-valerolactone. Examples of the carboxylic ester may include methyl acetate, ethyl acetate, methyl propionate, ethyl propionate, methyl butyrate, methyl isobutyrate, methyl trimethylacetate, and ethyl trimethylacetate. Examples of the nitrile may include acetonitrile, glutaronitrile, adiponitrile, methoxyacetonitrile, and 3-methoxypropionitrile.

In addition thereto, examples of the nonaqueous solvent may include 1,2-dimethoxyethane, tetrahydrofuran, 2-methyltetrahydrofuran, tetrahydropyran, 1,3-dioxolane, 4-methyl-1,3-dioxolane, 1,3-dioxane, 1,4-dioxane, N,N-dimethylformamide, N-methylpyrrolidinone, N-methyloxazolidinone, N,N'-dimethylimidazolidinone, nitro methane, nitroethane, sulfolane, trimethyl phosphate, and dimethyl sulfoxide. Thereby, a similar advantage is obtained.

In particular, any one or more of ethylene carbonate, propylene carbonate, dimethyl carbonate, diethyl carbonate, and ethyl methyl carbonate may be preferable. In this case, a combination of a high viscosity (high dielectric constant) solvent (for example, specific dielectric constant ε≥30) such as ethylene carbonate and propylene carbonate and a low viscosity solvent (for example, viscosity ≤1 mPa·s) such as dimethyl carbonate, ethylmethyl carbonate, and diethyl carbonate may be more preferable. One reason for this is that, in this case, in the electrolytic solution, the dissociation property of the electrolyte salt and ion mobility are improved.

In addition thereto, the nonaqueous solvent may include any one or more of unsaturated cyclic ester carbonate, halogenated ester carbonate, sultone, an acid anhydride, etc., since thereby, chemical stability of the electrolytic solution is improved. It is to be noted that the nonaqueous solvent may include catechol carbonate having a benzene ring in addition to the unsaturated cyclic ester carbonate.

The unsaturated cyclic ester carbonate is a cyclic ester carbonate having one or more unsaturated bonds (carbon-carbon double bonds), provided that the unsaturated bonds in the unsaturated cyclic ester carbonate are located inside the ring, and are formed of carbon atoms configuring part of the ring. Examples of the unsaturated cyclic ester carbonate may include any one or more of compounds represented by Formula (10), etc.

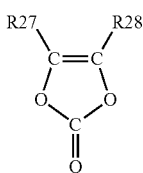
(10)

In Formula (10), each of R27 and R28 is one of a hydrogen group and a monovalent hydrocarbon group.

R27 and R28 may be the same type of group, or may be groups different from each other. Details of the monovalent hydrocarbon group are similar to those described for the first unsaturated compound. Specific examples of the unsaturated cyclic ester carbonate may include any one or more of vinylene carbonate (1,3-dioxole-2-one), methylvinylene carbonate (4-methyl-1,3-dioxole-2-one), ethylvinylene carbonate (4-ethyl-1,3-dioxole-2-one), 4,5-dimethyl-1,3-dioxole-2-one, 4,5-diethyl-1,3-dioxole-2-one, etc. However, specific examples of the unsaturated cyclic ester carbonate may include compounds other than the compounds specifically described here.

The halogenated ester carbonate is a cyclic ester carbonate having one or more halogens as constituent elements or a chain ester carbonate having one or more halogens as constituent elements. Examples of a cyclic halogenated ester carbonate may include any one or more of compounds represented by Formula (11), etc. Examples of a chain halogenated ester carbonate may include any one or more of compounds represented by Formula (12), etc.

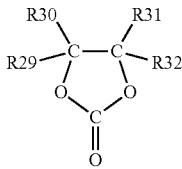
(11)

In Formula (11), each of R29 to R32 is one of a hydrogen group, a halogen group, a monovalent hydrocarbon group, a monovalent halogenated hydrocarbon group, and a group obtained by bonding two or more thereof to one another; and one or more of R29 to R32 are each one of a halogen group and a monovalent halogenated hydrocarbon group.

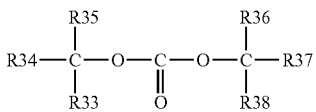
(12)

In Formula (12), each of R33 to R38 is one of a hydrogen group, a halogen group, a monovalent hydrocarbon group, a monovalent halogenated hydrocarbon group, and a group obtained by bonding two or more thereof to one another; and one or more of R33 to R38 are each one of a halogen group and a monovalent halogenated hydrocarbon group.

In the cyclic halogenated ester carbonate, R29 to R32 may be the same type of group, or may be groups different from one another. Any two or more of R29 to R32 may be the same type of group. Details of the halogen group, the monovalent hydrocarbon group, the monovalent halogenated hydrocarbon group, and the group obtained by bonding two or more thereof to one another are similar to those described for the first unsaturated compound. In particular, as a halogen group, a fluorine group may be preferable. Further, the number of halogens may be more preferably two than one, and may be three or more.

Specific examples of the cyclic halogenated ester carbonate may include any one or more of compounds represented by the following Formula (11-1) to the following Formula (11-21), etc. These compounds may include a geometric isomer. In particular, 4-fluoro-1,3-dioxolane-2-one shown in Formula (11-1) and 4,5-difluoro-1,3-dioxolane-2-one shown in Formula (11-3) may be preferable, since these compounds are easily available and provide high effects. However, specific examples of the cyclic halogenated ester carbonate may include compounds other than the compounds specifically described here.

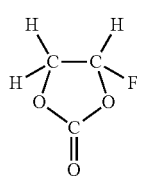
(11-1)

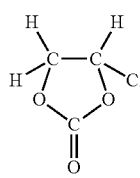
(11-2)

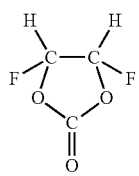
(11-3)

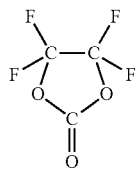
(11-4)

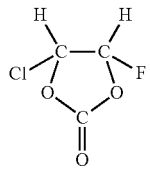
(11-5)

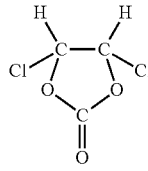
(11-6)

-continued

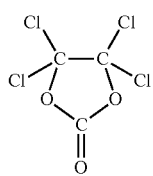
(11-7)

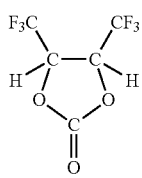
(11-8)

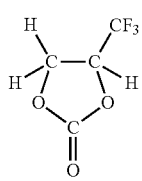
(11-9)

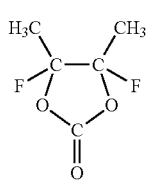
(11-10)

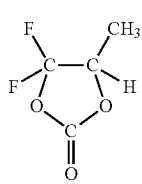
(11-11)

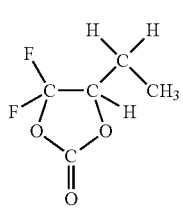
(11-12)

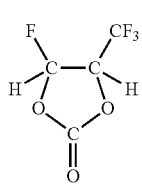
(11-13)

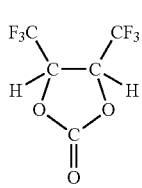
(11-14)

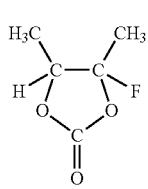
(11-15)

-continued

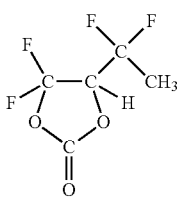
(11-16)

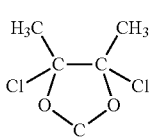
(11-17)

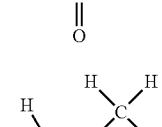
(11-18)

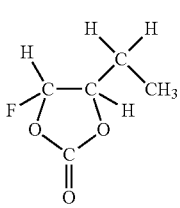
(11-19)

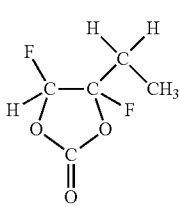
(11-20)

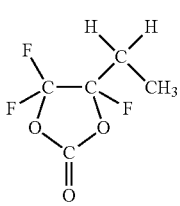
(11-21)

In the chain halogenated ester carbonate, R33 to R38 may be the same type of group, or may be groups different from one another. Any two or three of R33 to R38 may be the same type of group. Details of the halogen group, the monovalent hydrocarbon group, the monovalent halogenated hydrocarbon group, and the group obtained by bonding two or more thereof to one another are similar to those described for the chain halogenated ester carbonate.

Specific examples of the chain halogenated ester carbonate may include any one or more of fluoromethyl methyl carbonate, bis (fluoromethyl) carbonate, and difluoromethyl methyl carbonate. However, specific examples of the chain halogenated ester carbonate may include compounds other than the compounds specifically described here.

The sultone is so-called cyclic sulfonic ester. Specific examples of the sultone may include any one or more of propane sultone and propene sultone. However, specific examples of the sultone may include compounds other than the compounds specifically described here.

The acid anhydride is a compound obtained by detaching water from an acid. Specific examples of the acid anhydride may include any one or more of a dicarboxylic anhydride, a disulfonic anhydride, a carboxylic acid sulfonic acid anhydride, etc. Examples of the carboxylic anhydride may include a succinic anhydride, a glutaric anhydride, and a maleic anhydride. Examples of the disulfonic anhydride may include an ethane disulfonic anhydride and a propane disulfonic anhydride. Examples of the carboxylic acid sulfonic acid anhydride may include a sulfobenzoic anhydride, a sulfopropionic anhydride, and a sulfobutyric anhydride. However, specific examples of the acid anhydride may include compounds other than the compounds specifically described here.

[Method of Manufacturing Electrolytic Solution Material]

Upon manufacturing the electrolytic solution material, for example, any of the first unsaturated compound, etc. any of the phenol-type compound, etc., and as necessary, a nonaqueous solvent and/or the like are mixed, and thereafter, the resultant mixture is stirred.

[Function and Effect of Electrolytic Solution Material]

The electrolytic solution material contains any of the first unsaturated compound, etc. and any of the phenol-type compound, etc. together. In this case, as described above, even though oxidation resistivity of any of the first unsaturated compound, etc. is fundamentally and inherently low, oxidation degradation of any of the first unsaturated compound, etc. is suppressed by any of the phenol-type compound, etc., and therefore, oxidation degradation is less likely to occur in the course of conservation thereof. Thereby, since property of any of the first unsaturated compound, etc. is easily retained, the property is less likely to be specifically changed with time. Accordingly, superior characteristics are obtainable.

In particular, in the case where the first unsaturated compound includes any one or more of compounds shown in Formula (6) and Formula (7), or the second unsaturated compound includes any one or more of compounds shown in Formula (8), higher effects are obtainable.

Further, in the case where the first unsaturated compound includes any one or more of compounds shown in Formula (1-1) to Formula (1-56), and the second unsaturated compound includes any one or more of compounds shown in Formula (2-1) and Formula (2-2), higher effects are obtainable. Further, in the case where the phenol-type compound includes any one or more of compounds shown in Formula (3-1) to Formula (3-5), the phosphorus-containing compound includes any one or more of compounds shown in Formula (4-1) and Formula (4-2), and the sulfur-containing compound includes any one or more of compounds shown in Formula (5-1) and Formula (5-3), higher effects are obtainable.

Further, in the case where the sum of contents of the phenol-type compound, etc. is from about 1 ppm to about 50000 ppm with respect to the sum of contents of the first unsaturated compound, etc., higher effects are obtainable.

[2. Electrolytic Solution]

Next, description will be given of an electrolytic solution using the foregoing electrolytic solution material. Use applications of the electrolytic solution described here are not particularly limited as described above.

[Configuration of Electrolytic Solution]

The electrolytic solution contains the electrolytic solution material together with a nonaqueous solvent and an electrolyte salt, and may further contain any one or more of other materials such as an additive.

One reason why the electrolytic solution contains the electrolytic solution material is as follows. That is, as described above, even if the electrolytic solution contains any of the first unsaturated compound, etc., oxidation degradation of any of the first unsaturated compound, etc. is suppressed by any of the phenol-type compound, etc., and therefore, oxidation degradation is less likely to occur in the course of conservation thereof. Thereby, since property of the electrolytic solution is easily retained, the property is less likely to be specifically changed with time.

Since description has been already given in detail of the configuration of the electrolytic solution material, the description thereof will be omitted. The content of any of the first unsaturated compound, etc. in the electrolytic solution is not particularly limited. However, in particular, the content thereof may be preferably from 0.01 wt % to 10 wt % both inclusive, since higher effects are obtained thereby. Further, the content of any of the phenol-type compound, etc. may be preferably from about 1 ppm to about 50000 ppm with respect to the content of any of the first unsaturated compound, etc. as the electrolytic solution material. It is to be noted that details of the nonaqueous solvent may be, for example, similar to those described for the electrolytic solution material.

Examples of the electrolyte salt may include any one or more of salts such as a lithium salt. However, examples of the electrolyte salt may include a salt other than the lithium salt (such as a light metal salt other than the lithium salt).

Examples of the lithium salt may include lithium hexafluorophosphate ($LiPF_6$), lithium tetrafluoroborate ($LiBF_4$), lithium perchlorate ($LiClO_4$), lithium hexafluoroarsenate ($LiAsF_6$), lithium tetraphenylborate ($LiB(C_6H_5)_4$), lithium methanesulfonate ($LiCH_3SO_3$), lithium trifluoromethane sulfonate ($LiCF_3SO_3$), lithium tetrachloroaluminate ($LiAlCl_4$), dilithium hexafluorosilicate ($Li_2SiF_6$), lithium chloride (LiCl), and lithium bromide (LiBr).

In particular, any one or more of $LiPF_6$, $LiBF_4$, $LiClO_4$, and $LiAsF_6$ may be preferable, and $LiPF_6$ may be more preferable, since thereby, the internal resistance is lowered.

In particular, examples of the electrolyte salt may include any one or more of compounds represented by Formula (13) to Formula (15). It is to be noted that R41 and R43 may be the same type of group, or may be groups different from each other. The same is applied to R51 to R53 and to R61 and R62.

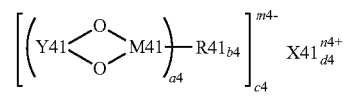

(13)

In Formula (13), X41 is one of Group 1 elements, Group 2 elements in the long-period periodic table, and Al; M41 is one of transition metals, Group 13 elements, Group 14 elements, and Group 15 elements in the long-period periodic table; R41 is a halogen group; Y41 is one of —C(=O)—R42-C(=O)—, —C(=O)—CR43$_2$-, and —C(=O)—C(=O)—; R42 is one of an alkylene group, a halogenated alkylene group, an arylene group, and a halogenated arylene group; R43 is one of an alkyl group, a halogenated alkyl group, an aryl group, and a halogenated aryl group; a4 is one of integer numbers 1 to 4 both inclusive; b4 is one of integer numbers 0, 2, and 4; and each of c4, d4, m4, and n4 is one of integer numbers 1 to 3 both inclusive.

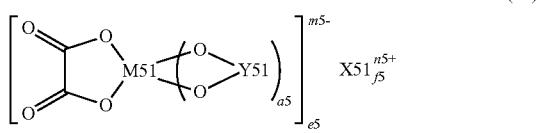

(14)

In Formula (14), X51 is one of Group 1 elements and Group 2 elements in the long-period periodic table; M51 is one of transition metals, Group 13 elements, Group 14 elements, and Group 15 elements in the long-period periodic table; Y51 is one of —C(=O)—(CR51$_2$)$_{b5}$-C(=O)—, —R53$_2$C—(CR52$_2$)$_{c5}$-C(=O)—, —R53$_2$C—(CR52$_2$)$_{c5}$-CR53$_2$-, —R53$_2$C—(CR52$_2$)$_{c5}$-S(=O)$_2$—, —S(=O)$_2$—(CR52$_2$)$_{d5}$-S(=O)$_2$—, and —C(=O)—(CR52$_2$)$_{d5}$-S(=O)$_2$—; each of R51 and R53 is one of a hydrogen group, an alkyl group, a halogen group, and a halogenated alkyl group; one or more of R51 and R53 are each the halogen group or the halogenated alkyl group; R52 is one of a hydrogen group, an alkyl group, a halogen group, and a halogenated alkyl group; each of a5, e5, and n5 is one of integer numbers 1 and 2; each of b5 and d5 is one of integer numbers 1 to 4 both inclusive; c5 is one of integer numbers 0 to 4 both inclusive; and each of f5 and m5 is one of integer numbers 1 to 3 both inclusive.

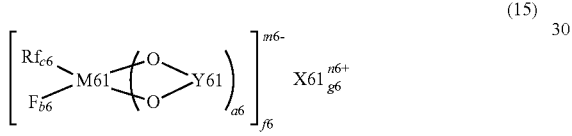

(15)

In Formula (15), X61 is one of Group 1 elements and Group 2 elements in the long-period periodic table; M61 is one of transition metals, Group 13 elements, Group 14 elements, and Group 15 elements in the long-period periodic table; Rf is one of a fluorinated alkyl group having carbon number from 1 to 10 both inclusive and a fluorinated aryl group having carbon number from 1 to 10 both inclusive; Y61 is one of —C(=O)—(CR61$_2$)$_{d6}$-C(=O)—, —R62$_2$C—(CR61$_2$)$_{d6}$-C(=O)—, —R62$_2$C—(CR61$_2$)$_{d6}$-CR62$_2$-, —R62$_2$C—(CR61$_2$)$_{d6}$-S(=O)$_2$—, —S(=O)$_2$—(CR61$_2$)$_{e6}$-S(=O)$_2$—, and —C(=O)—(CR61$_2$)$_{e6}$-S(=O)$_2$—; R61 is one of a hydrogen group, an alkyl group, a halogen group, and a halogenated alkyl group; R62 is one of a hydrogen group, an alkyl group, a halogen group, and a halogenated alkyl group, and one or more thereof are each a halogen group or a halogenated alkyl group; each of a6, f6, and n6 is one of integer numbers 1 and 2; each of b6, c6, and e6 is one of integer numbers 1 to 4 both inclusive; d6 is one of integer numbers 0 to 4 both inclusive; and each of g6 and m6 is one of integer numbers 1 to 3 both inclusive.

It is to be noted that Group 1 elements include H, Li, Na, K, Rb, Cs, and Fr. Group 2 elements include Be, Mg, Ca, Sr, Ba, and Ra. Group 13 elements include B, Al, Ga, In, and Tl. Group 14 elements include C, Si, Ge, Sn, and Pb. Group 15 elements include N, P, As, Sb, and Bi.

Specific examples of the compound shown in Formula (13) may include any one or more of compounds represented by Formula (13-1) to Formula (13-6). Specific examples of the compound represented by Formula (14) may include any one or more of compounds represented by Formula (14-1) to Formula (14-8). Specific examples of the compound shown in Formula (15) may include any one or more of compounds represented by Formula (15-1). However, specific examples of the compounds shown in Formula (13) to Formula (15) may include compounds other than the compounds specifically described here.

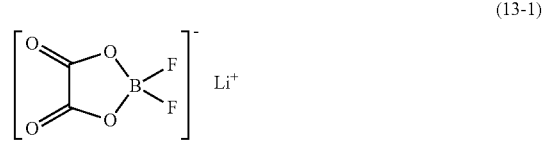

(13-1)

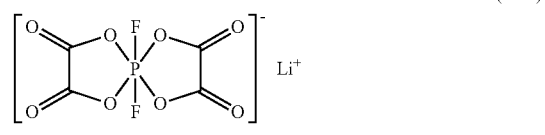

(13-2)

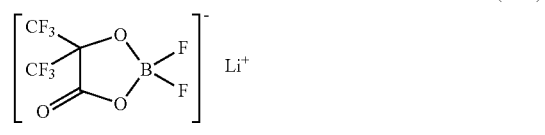

(13-3)

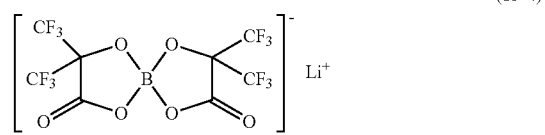

(13-4)

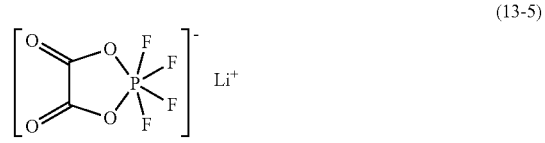

(13-5)

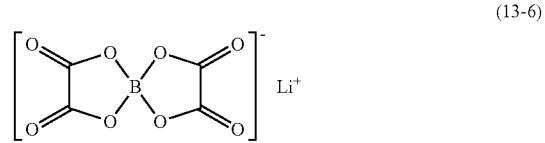

(13-6)

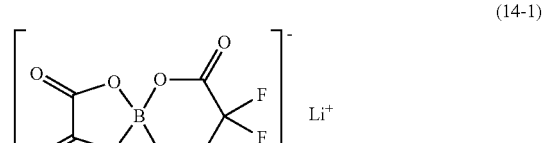

(14-1)

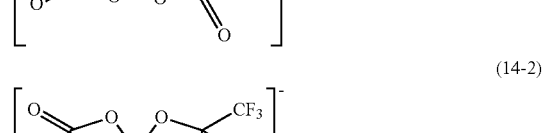

(14-2)

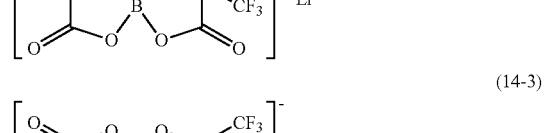

(14-3)

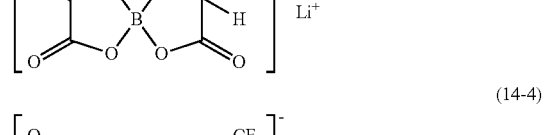

(14-4)

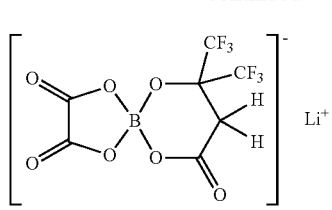 (14-5)

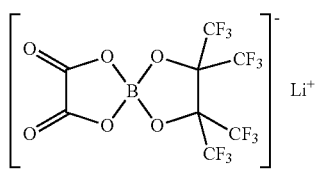 (14-6)

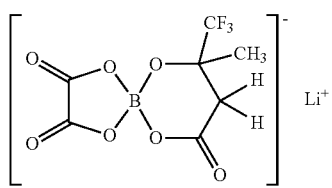 (14-7)

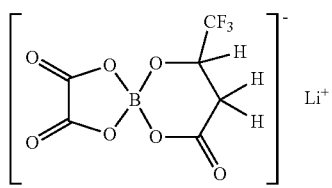 (14-8)

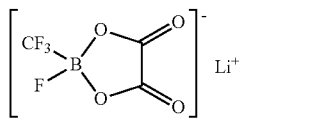 (15-1)

Further, examples of the electrolyte salt may include any one or more of compounds represented by Formula (16) to Formula (18). It is to be noted that m and n may be the same value or values different from each other. The same is applied to p, q, and r.

 (16)

In Formula (16), each of m and n is an integer number equal to or greater than 1.

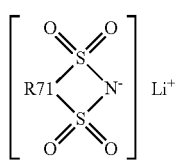 (17)

In Formula (17), R71 is a straight-chain or branched perfluoro alkylene group having carbon number from 2 to 4 both inclusive.

 (18)

In Formula (18), each of p, q, and r is an integer number equal to or greater than 1.

The compound shown in Formula (16) is a chain imide compound. Specific examples thereof may include any one or more of lithium bis(trifluoromethanesulfonyl)imide (LiN (CF$_3$SO$_2$)$_2$), lithium bis(pentafluoroethanesulfonyl)imide (LiN(C$_2$F$_5$SO$_2$)$_2$), lithium (trifluoromethanesulfonyl)(pentafluoroethanesulfonyl)imide (LiN(CF$_3$SO$_2$) (C$_2$F$_5$SO$_2$)), lithium(trifluoromethanesulfonyl)(heptafluoropropanesulfonyl)imide (LiN(CF$_3$SO$_2$) (C$_3$F$_7$SO$_2$)), lithium(trifluoromethanesulfonyl)(nonafluorobutanesulfonyl)imide (LiN (CF$_3$SO$_2$) (C$_4$F$_9$SO$_2$)), etc. However, specific examples of the chain imide compound may include compounds other than the compounds specifically described here.

The compound shown in Formula (17) is a cyclic imide compound. Specific examples thereof may include any one or more of compounds represented by Formula (17-1) to Formula (17-4), etc. However, specific examples of the cyclic imide compound may include compounds other than the compounds specifically described here.

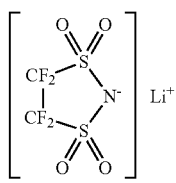 (17-1)

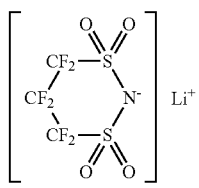 (17-2)

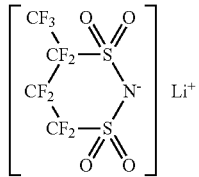 (17-3)

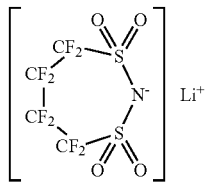 (17-4)

The compound shown in Formula (18) is a chain methyde compound. Specific examples thereof may include any one or more of lithium tris(trifluoromethanesulfonyl)methyde (LiC(CF$_3$SO$_2$)$_3$), etc. However, specific examples of the chain methyde compound may include compounds other than the compounds specifically described here.

The content of the electrolyte salt is not particularly limited. In particular, the content thereof may be preferably from 0.3 mol/kg to 3.0 mol/kg both inclusive with respect to the nonaqueous solvent, since high ion conductivity is obtained thereby.

[Method of Manufacturing Electrolytic Solution]

Upon manufacturing the electrolytic solution, for example, a nonaqueous solvent, an electrolyte salt, an electrolytic solution material, and as necessary, other materials such as an additive may be mixed, and thereafter, the resultant mixture may be stirred. Thereby, the electrolyte salt, the electrolytic solution material, etc. may be dispersed or dissolved in the nonaqueous solvent.

[Function and Effect of Electrolytic Solution]

The electrolytic solution contains the foregoing electrolytic solution material together with the nonaqueous solvent and the electrolyte salt. In this case, as described above, even though the electrolytic solution contains any of the first unsaturated compound, etc., oxidation degradation of any of the first unsaturated compound, etc. is suppressed by any of the phenol-type compound, etc., and therefore, property of the electrolytic solution is less likely to be specifically changed with time. Accordingly, superior characteristics are obtainable. Other functions and other effects are similar to those of the electrolytic solution material.

[3. Secondary Battery]

Next, description will be given of secondary batteries using the foregoing electrolytic solution.

[3-1. Lithium Ion Secondary Battery (Cylindrical-Type)]

Figure 2:
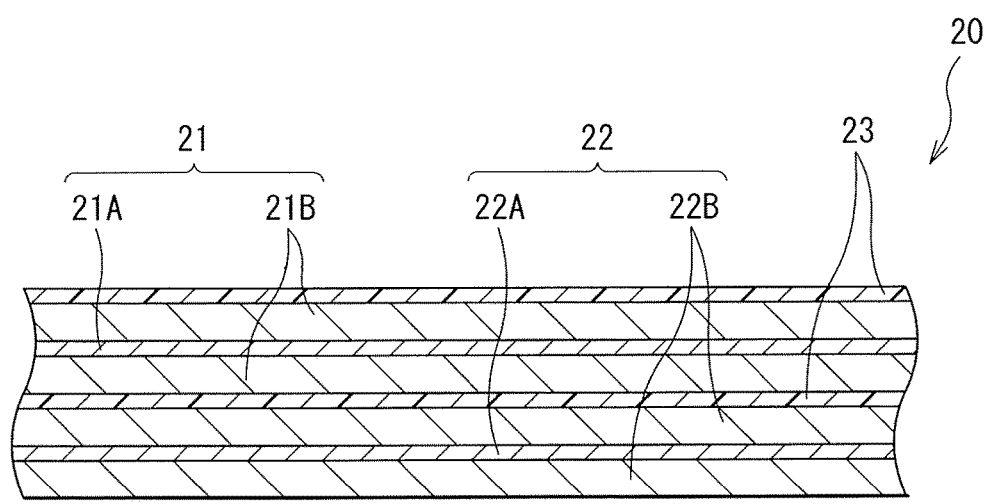
FIG. 2 is a cross-sectional view illustrating an enlarged part of a spirally wound electrode body illustrated in FIG. 1.

FIG. 1 and FIG. 2 illustrate cross-sectional configurations of a secondary battery according to an embodiment of the present application. FIG. 2 illustrates enlarged part of a spirally wound electrode body 20 illustrated in FIG. 1.

[Whole Configuration of Secondary Battery]

The secondary battery described here is a lithium secondary battery (a lithium ion secondary battery) in which the capacity of an anode 22 is obtained by insertion and extraction of lithium (lithium ions) as an electrode reactant.

For example, the secondary battery may be a so-called cylindrical-type secondary battery, and may contain the spirally wound electrode body 20 and a pair of insulating plates 12 and 13 inside a battery can 11 in the shape of a substantially hollow cylinder. The spirally wound electrode body 20 may be formed by, for example, laminating a cathode 21 and the anode 22 with a separator 23 in between, and spirally winding the resultant laminated body.

The battery can 11 may have, for example, a hollow structure in which one end of the battery can 11 is closed and the other end of the battery can 11 is opened. The battery can 11 may be made, for example, of iron (Fe), aluminum (Al), an alloy thereof, or the like. It is to be noted that the surface of the battery can 11 may be plated with nickel (Ni) or the like. The pair of insulating plates 12 and 13 is arranged to sandwich the spirally wound electrode body 20 in between, and to extend perpendicularly to the spirally wound periphery surface of the spirally wound electrode body 20.

At the open end of the battery can 11, a battery cover 14, a safety valve mechanism 15, and a positive temperature coefficient device (PTC device) 16 are attached by being swaged with a gasket 17. Thereby, the battery can 11 is hermetically sealed. The battery cover 14 may be made, for example, of a material similar to that of the battery can 11. The safety valve mechanism 15 and the PTC device 16 are provided inside the battery cover 14. The safety valve mechanism 15 is electrically connected to the battery cover 14 through the PTC device 16. In the safety valve mechanism 15, in the case where the internal pressure becomes a certain level or more by internal short circuit, external heating, or the like, a disk plate 15A inverts to cut electric connection between the battery cover 14 and the spirally wound electrode body 20. The PTC device 16 prevents abnormal heat generation resulting from a large current. As temperature rises, resistance of the PTC device 16 is increased accordingly. The gasket 17 may be made, for example, of an insulating material. The surface of the gasket 17 may be coated with asphalt or the like.

In the center of the spirally wound electrode body 20, for example, a center pin 24 may be inserted. However, the center pin 24 is not necessarily inserted in the center of the spirally wound electrode body 20. For example, a cathode lead 25 made of an electrically-conductive material such as aluminum may be connected to the cathode 21. For example, an anode lead 26 made of an electrically-conductive material such as nickel may be connected to the anode 22. For example, the cathode lead 25 may be welded to the safety valve mechanism 15, and may be electrically connected to the battery cover 14. For example, the anode lead 26 may be welded to the battery can 11, and may be electrically connected to the battery can 11.

[Cathode]

The cathode 21 has a cathode active material layer 21B on a single surface or both surfaces of a cathode current collector 21A. The cathode current collector 21A may be made, for example, of an electrically-conductive material such as aluminum, nickel, and stainless steel.

The cathode active material layer 21B contains, as cathode active materials, any one or more of cathode materials capable of inserting and extracting lithium ions. The cathode active material layer 21B may further contain any one or more of other materials such as a cathode binder and a cathode electric conductor.

The cathode material may be preferably a lithium-containing compound, since thereby, high energy density is obtained. Examples of the lithium-containing compound may include a lithium-transition-metal composite oxide and a lithium-transition-metal-phosphate compound. The lithium-transition-metal composite oxide is an oxide containing lithium and one or more transition metal elements as constituent elements. The lithium-transition-metal-phosphate compound is a phosphate compound containing lithium and one or more transition metal elements as constituent elements. In particular, the transition metal element may be preferably any one or more of cobalt (Co), nickel, manganese (Mn), iron, etc. since thereby, a higher voltage is obtained The chemical formula thereof may be expressed, for example, by $Li_xM1O_2$ or $Li_yM2PO_4$. In the formulas, M1 and M2 represent one or more transition metal elements. Values of x and y vary according to the charge-discharge state, and may be typically in the range of $0.05 \leq x \leq 1.10$ and $0.05 \leq y \leq 1.10$.

Specific examples of the lithium-transition-metal composite oxide may include $LiCoO_2$, $LiNiO_2$, and a lithium-nickel-based composite oxide represented by Formula (20). Specific examples of the lithium-transition-metal-phosphate compound may include $LiFePO_4$ and $LiFe_{1-u}Mn_uPO_4$ (u<1), since thereby, a high battery capacity is obtained and superior cycle characteristics are obtained as well.

$$LiNi_{1-z}M_zO_2 \tag{20}$$

In Formula (20), M is one or more of Co, Mn, Fe, Al, V, Sn, Mg, Ti, Sr, Ca, Zr, Mo, Tc, Ru, Ta, W, Re, Yb, Cu, Zn, Ba, B, Cr, Si, Ga, P, Sb, and Nb; and z satisfies $0.005<z<0.5$.

In addition thereto, examples of the cathode material may include any one or more of an oxide, a disulfide, a chalcogenide, an electrically-conductive polymer, etc. Examples of the oxide may include titanium oxide, vanadium oxide, and manganese dioxide. Examples of the disulfide may include titanium disulfide and molybdenum sulfide. Examples of the chalcogenide may include niobium selenide. Examples of the electrically-conductive polymer may include sulfur, polyaniline, and polythiophene. However, the cathode material may be a material other than the materials specifically described here.

Examples of the cathode binder may include any one or more of synthetic rubbers, polymer materials, etc. Examples of the synthetic rubber may include a styrene-butadiene-based rubber, a fluorine-based rubber, and ethylene propylene diene. Examples of the polymer material may include polyvinylidene fluoride and polyimide.

Examples of the cathode electric conductor may include any one or more of carbon materials, etc. Examples of the carbon materials may include graphite, carbon black, acetylene black, and Ketjen black. It is to be noted that the cathode electric conductor may be a metal material, an electrically-conductive polymer, or the like as long as the material has electric conductivity.

[Anode]

The anode 22 may have an anode active material layer 22B, for example, on both surfaces of an anode current collector 22A.

The anode current collector 22A may be made, for example, of any one or more of electrically-conductive materials such as copper (Cu), nickel, and stainless steel. The surface of the anode current collector 22A may be preferably roughened. Thereby, due to a so-called anchor effect, adhesibility of the anode active material layer 22B with respect to the anode current collector 22A is improved. In this case, it is enough that the surface of the anode current collector 22A in a region opposed to the anode active material layer 22B is roughened at minimum. Examples of roughening methods may include a method of forming fine particles by utilizing electrolytic treatment. The electrolytic treatment is a method of providing concavity and convexity on the surface of the anode current collector 22A by forming fine particles on the surface of the anode current collector 22A in an electrolytic bath with the use of an electrolytic method. A copper foil fabricated by an electrolytic method is generally called "electrolytic copper foil."

The anode active material layer 22B contains any one or more of anode materials capable of inserting and extracting lithium as anode active materials. However, the anode active material layer 22B may further contain any one or more of other materials such as an anode binder and an anode electric conductor. Details of the anode binder and the anode electric conductor may be, for example, similar to those described for the cathode binder and the cathode electric conductor.

However, the chargeable capacity of the anode material may be preferably larger than the discharge capacity of the cathode 21 in order to prevent lithium metal from being unintentionally precipitated on the anode 22 in the middle of charge. That is, the electrochemical equivalent of the anode material capable of inserting and extracting lithium may be preferably larger than the electrochemical equivalent of the cathode 21.

Examples of the anode material may include any one or more of carbon materials. In the carbon materials, crystal structure change at the time of insertion and extraction of lithium is extremely small. Therefore, the carbon materials are allowed to provide high energy density and superior cycle characteristics. Further, the carbon materials serve as anode electric conductors as well. Examples of the carbon materials may include graphitizable carbon, non-graphitizable carbon, and graphite. The spacing of (002) plane of the non-graphitizable carbon may be preferably equal to or greater than 0.37 nm, and the spacing of (002) plane in the graphite may be preferably equal to or smaller than 0.34 nm. More specifically, examples of the carbon materials may include pyrolytic carbons, cokes, glassy carbon fiber, an organic polymer compound fired body, activated carbon, and carbon blacks. Examples of the cokes may include pitch coke, needle coke, and petroleum coke. The organic polymer compound fired body is obtained by firing (carbonizing) a polymer compound such as a phenol resin and a furan resin at appropriate temperature. In addition thereto, examples of the carbon materials may include low crystalline carbon and amorphous carbon that are heat-treated at temperature of about 1000 deg C. or less. It is to be noted that the shape of any of the carbon materials may be any of a fibrous shape, a spherical shape, a granular shape, and a scale-like shape.

Further, examples of the anode material may include a material (a metal-based material) containing any one or more of metal elements and metalloid elements as constituent elements, since thereby, higher energy density is obtained. Such a metal-based material may be any of a simple substance, an alloy, and a compound, may be two or more thereof, or may be a material having one or more phases thereof in part or all thereof. It is to be noted that "alloy" may include a material containing one or more metal elements and one or more metalloid elements, in addition to a material configured of two or more metal elements. Further, the "alloy" may contain a non-metallic element. Examples of the structure thereof may include a solid solution, a eutectic crystal (eutectic mixture), an intermetallic compound, and a structure in which two or more thereof coexist.

Examples of the foregoing metal elements and the foregoing metalloid elements may include any one or more of metal elements and metalloid elements that are capable of forming an alloy with lithium. Specific examples thereof may include Mg, B, Al, Ga, In, Si, Ge, Sn, Pb, Bi, Cd, Ag, Zn, Hf, Zr, Y, Pd, and Pt. In particular, silicon (Si), tin (Sn), or both may be preferable. Silicon and tin have a superior ability of inserting and extracting lithium ions, and therefore, provide high energy density.

A material containing silicon, tin, or both as constituent elements may be any of a simple substance, an alloy, and a compound of silicon or tin, may be two or more thereof, or may be a material having one or more phases thereof in part or all thereof. It is to be noted that, the term "simple substance" merely refers to a general simple substance (a small amount of impurity may be therein contained), and does not necessarily refer to a purity 100% simple substance.

The alloys of silicon may contain, for example, any one or more of elements such as Sn, Ni, Cu, Fe, Co, Mn, Zn, In, Ag, Ti, Ge, Bi, Sb, and Cr as constituent elements other than Si. The compounds of silicon may contain, for example, any one or more of C, O, etc. as constituent elements other than Si. It is to be noted that, for example, the compounds of silicon may contain any one or more of the elements described for the alloys of silicon as constituent elements other than Si.

Specific examples of the alloys of silicon and the compounds of silicon may include $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, $SiC$, $Si_3N_4$, $Si_2N_2O$, $SiO_v$ ($0 \leq v \leq 2$), and LiSiO. It is to be noted that v in $SiO_v$ may be in the range of $0.2 < v < 1.4$.

The alloys of tin may contain, for example, any one or more of elements such as Si, Ni, Cu, Fe, Co, Mn, Zn, In, Ag, Ti, Ge, Bi, Sb, and Cr as constituent elements other than Sn. The compounds of tin may contain, for example, any one or more of elements such as C and O as constituent elements other than Sn. It is to be noted that the compounds of tin may contain, for example, any one or more of elements described for the alloys of tin as constituent elements other than Sn. Specific examples of the alloys of tin and the compounds of tin may include $SnO_w$ ($0 < w \leq 2$), $SnSiO_3$, LiSnO, and $Mg_2Sn$.

In particular, as a material containing tin as a constituent element, for example, a material containing a second constituent element and a third constituent element in addition to Sn as a first constituent element may be preferable. Examples of the second constituent element may include any one or more of elements such as Co, Fe, Mg, Ti, V, Cr, Mn, Ni, Cu, Zn, Ga, Zr, Nb, Mo, Ag, In, Ce, Hf, Ta, W, Bi, and Si. Examples of the third constituent element may include any one or more of B, C, Al, P, etc. In the case where the second constituent element and the third constituent element are contained, a high battery capacity, superior cycle characteristics, etc. are obtained.

In particular, a material (an SnCoC-containing material) containing Sn, Co, and C as constituent elements may be preferable. In the SnCoC-containing material, for example, the C content may be from 9.9 mass % to 29.7 mass % both inclusive, and the ratio of Sn and Co contents (Co/(Sn+Co)) may be from 20 mass % to 70 mass % both inclusive, since thereby, high energy density is obtained.

It may be preferable that the SnCoC-containing material have a phase containing Sn, Co, and C, and such a phase be low-crystalline or amorphous. The phase is a reaction phase capable of reacting with lithium. Therefore, due to existence of the reaction phase, superior characteristics are obtained. The half bandwidth of the diffraction peak obtained by X-ray diffraction of the phase may be preferably equal to or greater than 1 deg based on diffraction angle of 2θ in the case where CuKα ray is used as a specific X ray, and the insertion rate is 1 deg/min. Thereby, lithium is more smoothly inserted and extracted, and reactivity with the electrolytic solution is decreased. It is to be noted that, in some cases, the SnCoC-containing material includes a phase containing a simple substance or part of the respective constituent elements in addition to the low-crystalline phase or the amorphous phase.

Whether or not the diffraction peak obtained by the X-ray diffraction corresponds to the reaction phase capable of reacting with lithium is allowed to be easily determined by comparison between X-ray diffraction charts before and after electrochemical reaction with lithium. For example, if the position of the diffraction peak after electrochemical reaction with lithium is changed from the position of the diffraction peak before the electrochemical reaction with lithium, the obtained diffraction peak corresponds to the reaction phase capable of reacting with lithium. In this case, for example, the diffraction peak of the low crystalline reaction phase or the amorphous reaction phase may be seen in the range of 2θ=from 20 deg to 50 deg both inclusive. Such a reaction phase may have, for example, the foregoing respective constituent elements, and the low crystalline or amorphous structure thereof possibly results from existence of carbon mainly.

In the SnCoC-containing material, part or all of carbon as a constituent element may be preferably bonded to a metal element or a metalloid element as other constituent element, since cohesion or crystallization of tin and/or the like is suppressed thereby. The bonding state of elements is allowed to be checked with the use, for example, of XPS. In a commercially available device, for example, as a soft X ray, Al—Kα ray, Mg—Kα ray, or the like may be used. In the case where part or all of carbon are bonded to a metal element, a metalloid element, or the like, the peak of a synthetic wave of is orbit of carbon (C1s) is shown in a region lower than 284.5 eV. It is to be noted that in the device, energy calibration is made so that the peak of 4f orbit of gold atom (Au4f) is obtained in 84.0 eV. At this time, in general, since surface contamination carbon exists on the material surface, the peak of C1s of the surface contamination carbon is regarded as 284.8 eV, which is used as the energy standard. In XPS measurement, the waveform of the peak of C1s is obtained as a form including the peak of the surface contamination carbon and the peak of carbon in the SnCoC-containing material. Therefore, for example, analysis may be made with the use of commercially available software to isolate both peaks from each other. In the waveform analysis, the position of the main peak existing on the lowest bound energy side is the energy standard (284.8 eV).

It is to be noted that the SnCoC-containing material is not limited to the material (SnCoC) configured of only Sn, Co, and C as constituent elements. The SnCoC-containing material may further contain, for example, any one or more of Si, Fe, Ni, Cr, In, Nb, Ge, Ti, Mo, Al, P, Ga, Bi, etc. as constituent elements in addition to Sn, Co, and C.

In addition to the SnCoC-containing material, a material (an SnCoFeC-containing material) containing Sn, Co, Fe, and C as constituent elements may be also preferable. The composition of the SnCoFeC-containing material may be any composition. For example, the composition in which the Fe content may be set small is as follows. That is, the C content may be from 9.9 mass % to 29.7 mass % both inclusive, the Fe content may be from 0.3 mass % to 5.9 mass % both inclusive, and the ratio (Co/(Sn+Co)) of contents of Sn and Co may be from 30 mass % to 70 mass % both inclusive. Further, the composition in which the Fe content is set large is as follows. That is, the C content may be from 11.9 mass % to 29.7 mass % both inclusive, the ratio ((Co+Fe)/(Sn+Co+Fe)) of contents of Sn, Co, and Fe may be from 26.4 mass % to 48.5 mass % both inclusive, and the ratio (Co/(Co+Fe)) of contents of Co and Fe may be from 9.9 mass % to 79.5 mass % both inclusive. In such a composition range, high energy density is obtained. It is to be noted that the property (such as half bandwidth) of the SnCoFeC-containing material is similar to the property of the foregoing SnCoC-containing material.

In addition thereto, the anode material may be, for example, any one or more of metal oxides, polymer compounds, etc. Examples of the metal oxides may include iron oxide, ruthenium oxide, and molybdenum oxide. Examples of the polymer compounds may include polyacetylene, polyaniline, and polypyrrole.

The anode active material layer 22B may be formed, for example, by any one or more of a coating method, a vapor-phase deposition method, a liquid-phase deposition method, a spraying method, a firing method (a sintering method), etc. The coating method is a method in which, for example, after a particulate (powder) anode active material is mixed with an anode binder and/or the like, the resultant mixture is dispersed in a solvent such as an organic solvent, and the anode current collector 22A is coated with the resultant. Examples of the vapor-phase deposition method may include a physical deposition method and a chemical deposition method. More specifically, examples thereof may include a vacuum evaporation method, a sputtering method, an ion plating method, a laser ablation method, a thermal chemical vapor deposition method, a chemical vapor deposition (CVD) method, a plasma chemical vapor deposition method, etc. Examples of the liquid-phase deposition method may include an electrolytic plating method and an electroless plating method. The spraying method is a method in which an anode active material in a fused state or a semi-fused state is sprayed to the anode current collector 22A. The firing method is a method in which after the anode current collector 22A is coated with a mixture dispersed in a solvent with the use, for example, of a coating method, heat treatment is performed thereon at temperature higher than the melting point of the anode binder and/or the like.

Examples of the firing method may include an atmosphere firing method, a reactive firing method, and a hot press firing method.

In the secondary battery, as described above, in order to prevent lithium metal from being unintentionally precipitated on the anode 22 in the middle of charge, the electrochemical equivalent of the anode material capable of inserting and extracting lithium ions is larger than the electrochemical equivalent of the cathode. Further, in the case where the open circuit voltage (that is, a battery voltage) at the time of completely-charged state is equal to or greater than 4.25 V, the extraction amount of lithium per unit mass is larger than that in the case where the open circuit voltage is 4.20 V even if the same cathode active material is used. Therefore, amounts of the cathode active material and the anode active material are adjusted accordingly. Thereby, high energy density is obtained.

[Separator]

The separator 23 separates the cathode 21 from the anode 22, and passes lithium ions while preventing current short circuit resulting from contact of both electrodes. The separator 23 may be, for example, a porous film made of a synthetic resin, ceramics, or the like. The separator 23 may be a laminated film in which two or more types of porous films are laminated. Examples of the synthetic resin may include polytetrafluoroethylene, polypropylene, and polyethylene.

In particular, the separator 23 may include, for example, the foregoing porous film (a base material layer) and a polymer compound layer provided on a single surface or both surfaces of the base material layer. Thereby, adhesibility of the separator 23 with respect to the cathode 21 and the anode 22 is improved, and therefore, skewness of the spirally wound electrode body 20 is suppressed. Thereby, a decomposition reaction of the electrolytic solution is suppressed, and liquid leakage of the electrolytic solution with which the base material layer is impregnated is suppressed. Accordingly, even if charge and discharge are repeated, the resistance is less likely to be increased, and battery swollenness is suppressed.

The polymer compound layer may contain, for example, a polymer material such as polyvinylidene fluoride, since such a polymer material has a superior physical strength and is electrochemically stable. However, the polymer material may be a material other than polyvinylidene fluoride. In the case of forming the polymer compound layer, for example, after a solution in which the polymer material is dissolved is prepared, the base material layer is coated with the solution, and the resultant is subsequently dried. It is to be noted that, alternatively, the base material layer may be soaked in the solution and may be subsequently dried.

[Electrolytic Solution]

The separator 23 is impregnated with an electrolytic solution as a liquid electrolyte. Since the configuration of the electrolytic solution has been described in detail above, the description thereof will be omitted here.

[Operation of Secondary Battery]

The secondary battery may operate, for example, as follows. At the time of charge, when lithium ions are extracted from the cathode 21, the lithium ions are inserted in the anode 22 through the electrolytic solution. At the time of discharge, when lithium ions are extracted from the anode 22, the lithium ions are inserted in the cathode 21 through the electrolytic solution.

[Method of Manufacturing Secondary Battery]

The secondary battery may be manufactured, for example, by the following procedure.

First, the cathode 21 is fabricated. In this case, a cathode active material is mixed with a cathode binder, a cathode electric conductor, etc. as necessary to prepare a cathode mixture. Subsequently, the cathode mixture is dispersed in an organic solvent or the like to obtain paste cathode mixture slurry. Subsequently, both surfaces of the cathode current collector 21A are coated with the cathode mixture slurry, and the cathode mixture slurry is dried to form the cathode active material layer 21B. In this case, the cathode active material layer 21B may be formed only on a single surface of the cathode current collector 21A. Subsequently, the cathode active material layer 21B may be compression-molded with the use of a roll pressing machine and/or the like while heating the cathode active material layer 21B as necessary. In this case, compression-molding may be repeated several times.

Further, the anode 22 is fabricated by a procedure substantially similar to that of the cathode 21 described above. In this case, an anode active material is mixed with an anode binder, an anode electric conductor, etc. to prepare an anode mixture, and the anode mixture is subsequently dispersed in an organic solvent or the like to form paste anode mixture slurry. Subsequently, both surfaces of the anode current collector 22A are coated with the anode mixture slurry, and the anode mixture slurry is dried to form the anode active material layer 22B. Thereafter, the anode active material layer 22B is compression-molded with the use of a roll pressing machine and/or the like.

Finally, the secondary battery is assembled with the use of the cathode 21 and the anode 22. The cathode lead 25 is attached to the cathode current collector 21A with the use of a welding method and/or the like, and the anode lead 26 is attached to the anode current collector 22A with the use of a welding method and/or the like. Subsequently, the cathode 21 and the anode 22 are layered with the separator 23 in between and are spirally wound, and thereby, the spirally wound electrode body 20 is fabricated. Thereafter, the center pin 24 is inserted in the center of the spirally wound electrode body 20. Subsequently, the spirally wound electrode body 20 is sandwiched between the pair of insulating plates 12 and 13, and the spirally wound electrode body 20 is contained in the battery can 11. In this case, an end of the cathode lead 25 is attached to the safety valve mechanism 15 with the use of a welding method and/or the like, and an end of the anode lead 26 is attached to the battery can 11 with the use of a welding method and/or the like. Subsequently, an electrolytic solution is injected into the battery can 11, and the separator 23 is impregnated with the electrolytic solution. Subsequently, at the open end of the battery can 11, the battery cover 14, the safety valve mechanism 15, and the PTC device 16 are fixed by being swaged with the gasket 17.

[Function and Effect of Secondary Battery]

The cylindrical-type secondary battery includes the foregoing electrolytic solution. Therefore, as described above, even though the electrolytic solution material contains any of the first unsaturated compound, etc. oxidation degradation of any of the first unsaturated compound, etc. is suppressed by any of the phenol-type compound, etc. Therefore, property of the electrolytic solution is less likely to be specifically changed with time. Accordingly, superior characteristics are obtained. Other functions and other effects are similar to those of the electrolytic solution.

[3-2. Lithium Ion Secondary Battery (Laminated-Film-Type)]

Figure 3:
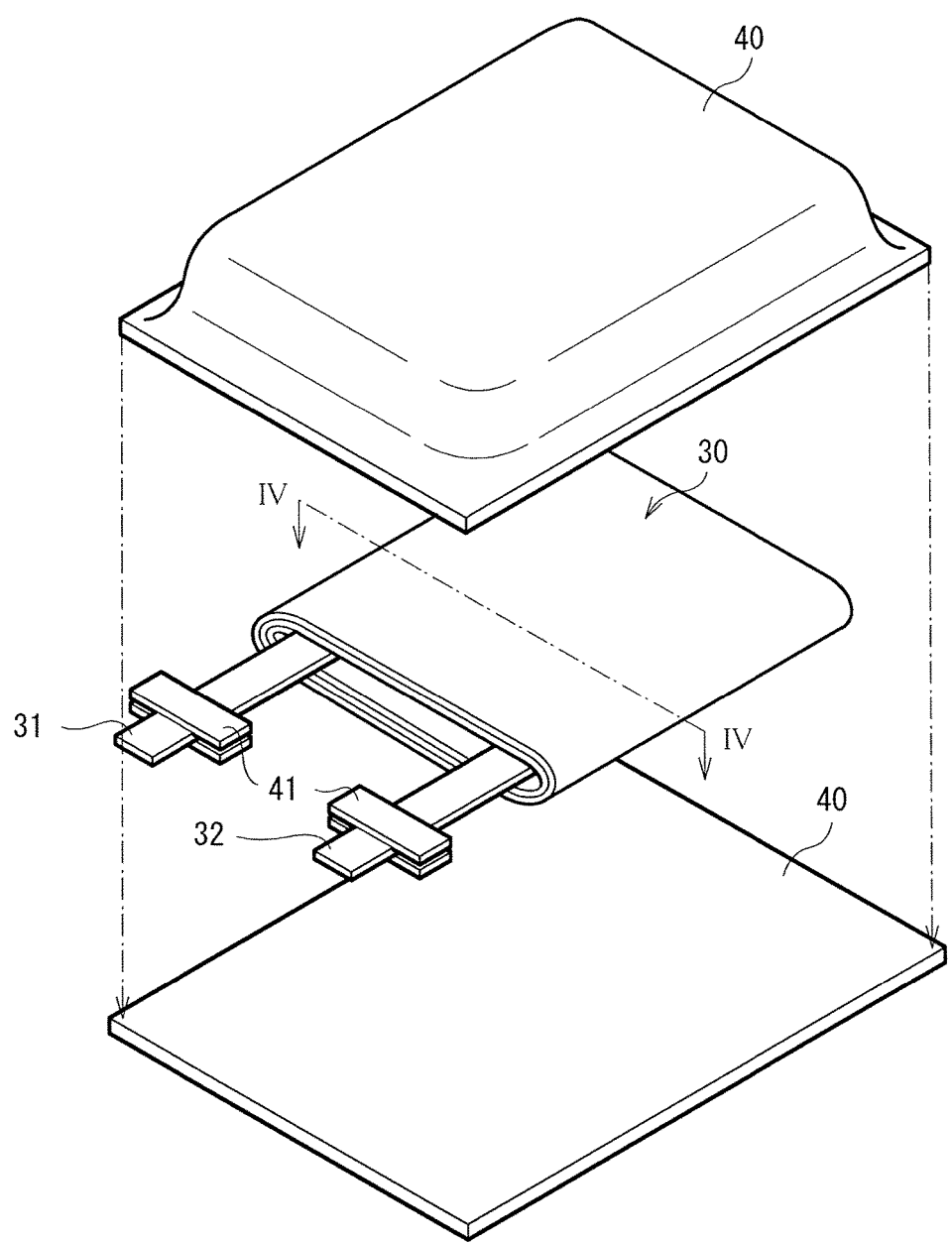
FIG. 3 is a perspective view illustrating a configuration of another secondary battery (laminated-film-type) using the electrolytic solution material and the electrolytic solution according to the embodiment of the present application.
Figure 4:
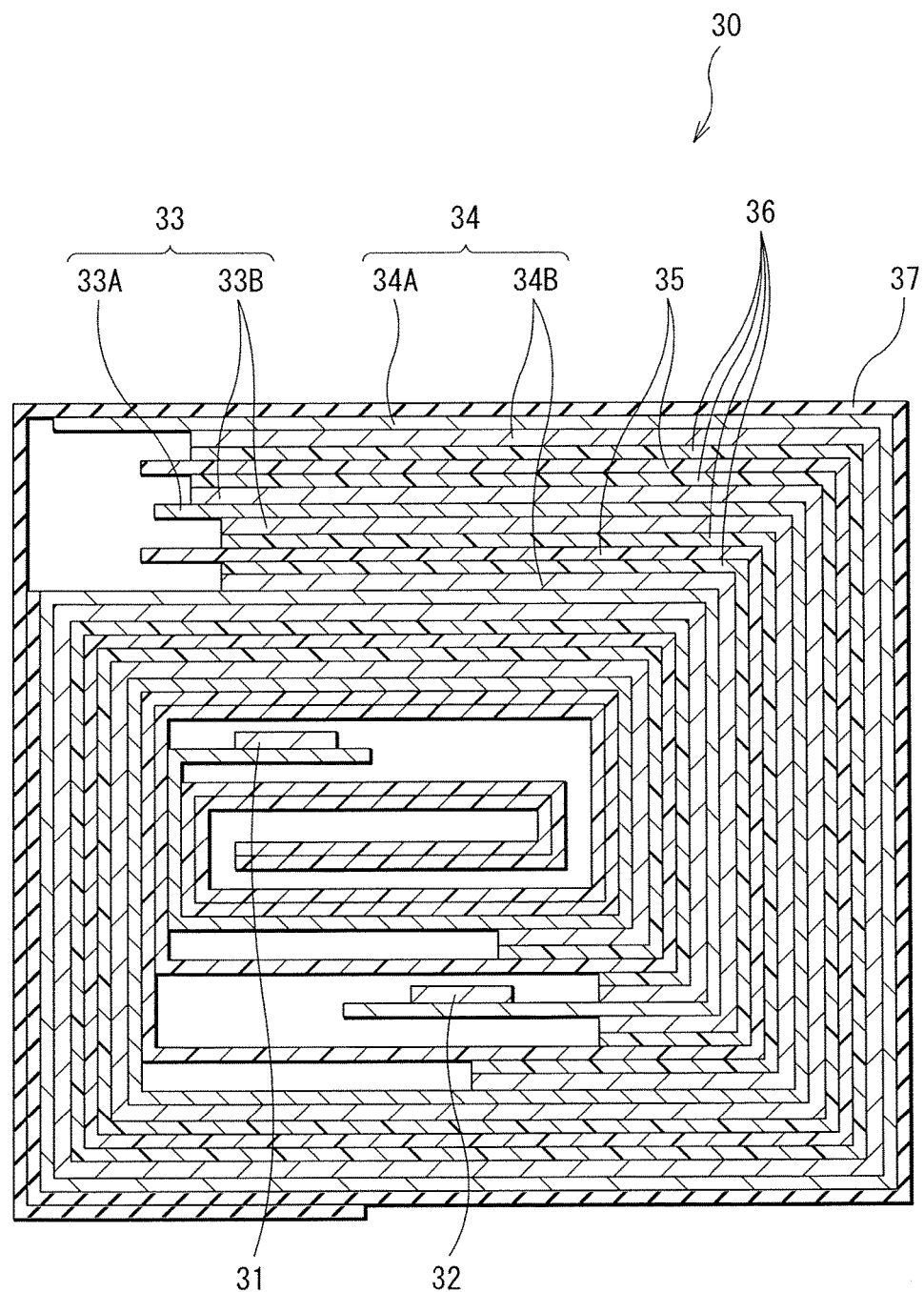
FIG. 4 is a cross-sectional view taken along a line IV-IV of a spirally wound electrode body illustrated in FIG. 3.

FIG. 3 illustrates an exploded perspective configuration of another secondary battery according to the embodiment of the present application. FIG. 4 illustrates an enlarged cross-section taken along a line IV-IV of a spirally wound electrode body 30 illustrated in FIG. 3. In the following description, the elements of the cylindrical-type secondary battery described above will be used as necessary.

[Whole Configuration of Secondary Battery]

The secondary battery described here may be, for example, a so-called laminated-film-type lithium ion secondary battery. In the secondary battery, the spirally wound electrode body 30 may be contained in a film-like outer package member 40. The spirally wound electrode body 30 is formed by laminating a cathode 33 and an anode 34 with a separator 35 and an electrolyte layer 36 in between, and subsequently spirally winding the resultant laminated body. A cathode lead 31 is attached to the cathode 33, and an anode lead 32 is attached to the anode 34. The outermost periphery of the spirally wound electrode body 30 is protected by a protective tape 37.

The cathode lead 31 and the anode lead 32 may be, for example, led out from inside to outside of the outer package member 40 in the same direction. The cathode lead 31 may be made, for example, of an electrically-conductive material such as aluminum, and the anode lead 32 may be made, for example, of an electrically-conducive material such as copper, nickel, and stainless steel. These electrically-conductive materials may be in the shape, for example, of a thin plate or mesh.

The outer package member 40 may be a laminated film in which, for example, a fusion bonding layer, a metal layer, and a surface protective layer are laminated in this order. In the laminated film, for example, outer edges of two film fusion bonding layers may be fusion-bonded so that the fusion bonding layers and the spirally wound electrode body 30 are opposed to each other. Alternatively, the two films may be attached to each other by an adhesive or the like. Examples of the fusion bonding layer may include a film made of any one or more of polyethylene, polypropylene, etc. Examples of the metal layer may include an aluminum foil. Examples of the surface protective layer may include a film made of any one or more of nylon, polyethylene terephthalate, etc.

In particular, as the outer package member 40, an aluminum laminated film in which a polyethylene film, an aluminum foil, and a nylon film are laminated in this order may be preferable. However, the outer package member 40 may be made of a laminated film having other laminated structure, a polymer film such as polypropylene, or a metal film.

An adhesive film 41 to protect from outside air intrusion is inserted between the outer package member 40 and the cathode lead 31 and between the outer package member 40 and the anode lead 32. The adhesive film 41 is made of a material having adhesibility with respect to the cathode lead 31 and the anode lead 32. Examples of the material having adhesibility may include any one or more of polyolefin resins such as polyethylene, polypropylene, modified polyethylene, and modified polypropylene.

The cathode 33 may have, for example, a cathode active material layer 33B on a single surface or both surfaces of a cathode current collector 33A. The anode 34 may have, for example, an anode active material layer 34B on a single surface or both surfaces of an anode current collector 34A. The configurations of the cathode current collector 33A, the cathode active material layer 33B, the anode current collector 34A, and the anode active material layer 34B may be, for example, similar to the configurations of the cathode current collector 21A, the cathode active material layer 21B, the anode current collector 22A, and the anode active material layer 22B, respectively. The configuration of the separator 35 may be, for example, similar to the configuration of the separator 23.

In the electrolyte layer 36, an electrolytic solution is supported by a polymer compound. The electrolyte layer 36 is a so-called gel electrolyte, since thereby, high ion conductivity (for example, 1 mS/cm or more at room temperature) is obtained and liquid leakage of the electrolytic solution is prevented. The electrolyte layer 36 may contain other material such as an additive as necessary.

Examples of the polymer compound may include any one or more of polyacrylonitrile, polyvinylidene fluoride, polytetrafluoroethylene, polyhexafluoropropylene, polyethylene oxide, polypropylene oxide, polyphosphazene, polysiloxane, polyvinyl fluoride, polyvinyl acetate, polyvinyl alcohol, polymethacrylic acid methyl, polyacrylic acid, polymethacrylic acid, styrene-butadiene rubber, nitrile-butadiene rubber, polystyrene, polycarbonate, a copolymer of vinylidene fluoride and hexafluoro propylene, etc. In particular, polyvinylidene fluoride and the copolymer of vinylidene fluoride and hexafluoro propylene may be preferable, and polyvinylidene fluoride may be more preferable, since such a polymer compound is electrochemically stable.

The composition of the electrolytic solution may be, for example, similar to the composition of the electrolytic solution of the cylindrical-type secondary battery. However, in the electrolyte layer 36 as a gel electrolyte, the term "solvent" of the electrolytic solution refers to a wide concept including not only a liquid solvent but also a material having ion conductivity capable of dissociating the electrolyte salt. Therefore, in the case where a polymer compound having ion conductivity is used, the polymer compound is also included in the solvent.

It is to be noted that the electrolytic solution may be used as it is instead of the gel electrolyte layer 36. In this case, the separator 35 is impregnated with the electrolytic solution.

[Operation of Secondary Battery]

The secondary battery may operate, for example, as follows. At the time of charge, when lithium ions are extracted from the cathode 33, the lithium ions are inserted in the anode 34 through the electrolyte layer 36. At the time of discharge, when lithium ions are extracted from the anode 34, the lithium ions are inserted in the cathode 33 through the electrolyte layer 36.

[Method of Manufacturing Secondary Battery]

The secondary battery including the gel electrolyte layer 36 may be manufactured, for example, by the following three types of procedures.

In the first procedure, the cathode 33 and the anode 34 are fabricated by a fabrication procedure similar to that of the cathode 21 and the anode 22. In this case, the cathode active material layer 33B is formed on both surfaces of the cathode current collector 33A to fabricate the cathode 33, and the anode active material layer 34B is formed on both surfaces of the anode current collector 34A to fabricate the anode 34. Subsequently, a precursor solution including an electrolytic solution, a polymer compound, and a solvent such as an organic solvent is prepared. Thereafter, the cathode 33 and the anode 34 are coated with the precursor solution to form the gel electrolyte layer 36. Subsequently, the cathode lead 31 is attached to the cathode current collector 33A with the use of a welding method and/or the like, and the anode lead 32 is attached to the anode current collector 34A with the use of a welding method and/or the like. Subsequently, cathode 33 and the anode 34 are layered with the separator 35 in between and are spirally wound to fabricate the spirally wound electrode body 30. Thereafter, the protective tape 37 is adhered to the outermost periphery thereof. Subsequently, after the spirally wound electrode body 30 is sandwiched between two pieces of film-like outer package members 40, the outer edges of the outer package members 40 are bonded with the use of a thermal fusion bonding method and/or the like. Thereby, the spirally wound electrode body 30 is enclosed into the outer package members 40. In this case, the adhesive films 41 are inserted between the cathode lead 31 and the outer package member 40 and between the anode lead 32 and the outer package member 40.

In the second procedure, the cathode lead 31 is attached to the cathode 33, and the anode lead 32 is attached to the anode 34. Subsequently, the cathode 33 and the anode 34 are layered with the separator 35 in between and are spirally wound to fabricate a spirally wound body as a precursor of the spirally wound electrode body 30. Thereafter, the protective tape 37 is adhered to the outermost periphery thereof. Subsequently, after the spirally wound body is sandwiched between two pieces of the film-like outer package members 40, the outermost peripheries except for one side are bonded with the use of a thermal fusion bonding method and/or the like to obtain a pouched state, and the spirally wound body is contained in the pouch-like outer package member 40. Subsequently, a composition for electrolyte containing an electrolytic solution, a monomer as a raw material for the polymer compound, a polymerization initiator, and other materials such as a polymerization inhibitor as necessary is prepared, and the composition for electrolyte is injected into the pouch-like outer package member 40. Thereafter, the outer package member 40 is hermetically sealed with the use of a thermal fusion bonding method and/or the like. Subsequently, the monomer is thermally polymerized, and thereby, a polymer compound is formed. Accordingly, the electrolyte layer 36 is formed.

In the third procedure, the spirally wound body is fabricated and contained in the pouch-like outer package member 40 in a manner similar to that of the foregoing second procedure, except that the separator 35 with both surfaces coated with a polymer compound is used. Examples of the polymer compound with which the separator 35 is coated may include a polymer (a homopolymer, a copolymer, or a multicomponent copolymer) containing vinylidene fluoride as a component. Specific examples thereof may include polyvinylidene fluoride, a binary copolymer containing vinylidene fluoride and hexafluoro propylene as components, and a ternary copolymer containing vinylidene fluoride, hexafluoro propylene, and chlorotrifluoroethylene as components. It is to be noted that, in addition to the polymer containing vinylidene fluoride as a component, other one or more polymer compounds may be used. Subsequently, an electrolytic solution is prepared and injected into the outer package member 40. Thereafter, the opening of the outer package member 40 is hermetically sealed with the use of a thermal fusion bonding method and/or the like. Subsequently, the resultant is heated while a weight is applied to the outer package member 40, and the separator 35 is adhered to the cathode 33 and the anode 34 with the polymer compound in between. Thereby, the polymer compound is impregnated with the electrolytic solution, and accordingly, the polymer compound is gelated to form the electrolyte layer 36.

In the third procedure, swollenness of the secondary battery is suppressed more than in the first procedure. Further, in the third procedure, the monomer as a raw material of the polymer compound, the solvent, etc. are less likely to be left in the electrolyte layer 36 compared to in the second procedure. Therefore, the formation step of the polymer compound is favorably controlled. Therefore, the cathode 33, the anode 34, and the separator 35 sufficiently adhere to the electrolyte layer 36.

[Function and Effect of Secondary Battery]

According to the laminated-film-type secondary battery, the electrolyte layer 36 contains the foregoing electrolytic solution. Therefore, for a reason similar to that of the cylindrical-type secondary battery, superior characteristics are obtainable. Other functions and other effects are similar to those of the cylindrical-type secondary battery.

[3-3. Lithium Metal Secondary Battery]

A secondary battery described here is a lithium secondary battery (a lithium metal secondary battery) in which the capacity of the anode 22 is represented by precipitation and dissolution of lithium metal. The secondary battery has a configuration similar to that of the foregoing lithium ion secondary battery (the cylindrical-type lithium ion secondary battery), except that the anode active material layer 22B is configured of the lithium metal, and is manufactured by a procedure similar to that of the lithium ion secondary battery (the cylindrical-type lithium ion secondary battery).

In the secondary battery, the lithium metal is used as an anode active material, and therefore, higher energy density is obtained. The anode active material layer 22B may exist at the time of assembling, or the anode active material layer 22B does not necessarily exist at the time of assembling and may be configured of the lithium metal precipitated at the time of charge. Further, the anode active material layer 22B may be utilized as a current collector, and thereby, the anode current collector 22A may be omitted.

The secondary battery operates, for example, as follows. At the time of charge, when lithium ions are discharged from the cathode 21, the lithium ions are precipitated as the lithium metal on the surface of the anode current collector 22A through the electrolytic solution. At the time of discharge, when the lithium metal is eluded in the electrolytic solution as lithium ions from the anode active material layer 22B, the lithium ions are inserted in the cathode 21 through the electrolytic solution.

The cylindrical-type lithium metal secondary battery includes the foregoing electrolytic solution. Therefore, for a reason similar to that of the lithium ion secondary battery, superior characteristics are obtainable. Other functions and other effects are similar to those of the lithium ion secondary battery.

It is to be noted that application of the configuration of the lithium metal secondary battery described here is not limited to the cylindrical-type secondary battery, and such a configuration may be also applied to a laminated-film-type secondary battery. In that case, a similar effect is obtainable as well.

[4. Applications of Secondary Battery]

Next, description will be given of application examples of the foregoing secondary battery.

Applications of the secondary battery are not particularly limited as long as the secondary battery is applied to a machine, a device, an instrument, an apparatus, a system (collective entity of a plurality of devices, etc.), or the like that is allowed to use the secondary battery as a driving electric power source, an electric power storage source for electric power storage, or the like. The secondary battery used as an electric power source may be a main electric power source (electric power source used preferentially), or may be an auxiliary electric power source (electric power source used instead of a main electric power source or used being switched from the main electric power source). In the case where the secondary battery is used as an auxiliary electric power source, the main electric power source type is not limited to the secondary battery.

Examples of applications of the secondary battery may include electronic apparatuses (including portable electronic apparatuses) such as a video camcorder, a digital still camera, a mobile phone, a notebook personal computer, a cordless phone, a headphone stereo, a portable radio, a portable television, and a personal digital assistant. Further examples thereof may include a mobile lifestyle electric appliance such as an electric shaver; a memory device such as a backup electric power source and a memory card; an electric power tool such as an electric drill and an electric saw; a battery pack used for a notebook personal computer or the like as an attachable and detachable electric power source; a medical electronic apparatus such as a pacemaker and a hearing aid; an electric vehicle such as an electric automobile (including a hybrid automobile); and an electric power storage system such as a home battery system for storing electric power for emergency or the like. It goes without saying that an application other than the foregoing applications may be adopted.

In particular, the secondary battery is effectively applicable to the battery pack, the electric vehicle, the electric power storage system, the electric power tool, the electronic apparatus, or the like. One reason for this is that, in these applications, since superior battery characteristics are demanded, performance is effectively improved with the use of the secondary battery according to the embodiment of the present application. It is to be noted that the battery pack is an electric power source using a secondary battery, and is a so-called assembled battery or the like. The electric vehicle is a vehicle that works (runs) with the use of a secondary battery as a driving electric power source. As described above, the electric vehicle may be an automobile (such as a hybrid automobile) including a drive source other than a secondary battery. The electric power storage system is a system using a secondary battery as an electric power storage source. For example, in a home electric power storage system, since electric power is stored in the secondary battery as an electric power storage source, the electric power is utilized, and thereby, home electric products, etc. become usable. The electric power tool is a tool in which a movable section (such as a drill) is moved with the use of a secondary battery as a driving electric power source. The electronic apparatus is an apparatus executing various functions with the use of a secondary battery as a driving electric power source (electric power supply source).

Description will be specifically given of some application examples of the secondary battery. It is to be noted that the configurations of the respective application examples explained below are merely examples, and may be changed as appropriate.

[4-1. Battery Pack]

Figure 5:
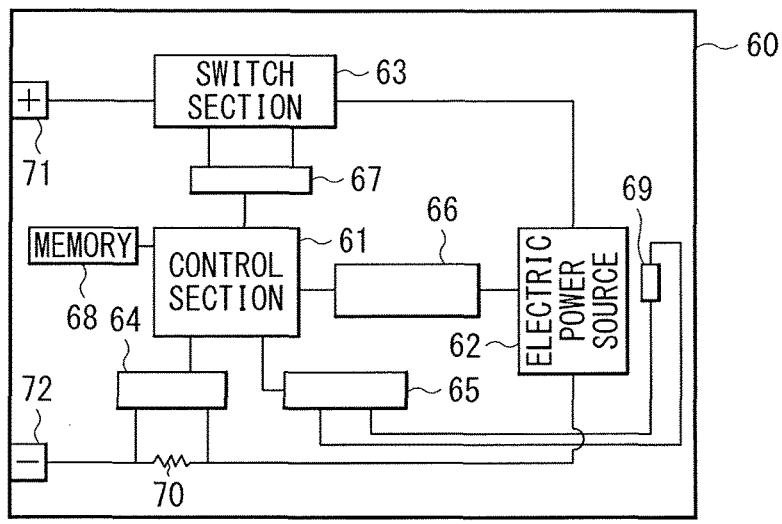
FIG. 5 is a block diagram illustrating a configuration of an application example (a battery pack) of the secondary battery.

FIG. 5 illustrates a block configuration of a battery pack. For example, the battery pack may include a control section 61, an electric power source 62, a switch section 63, a current measurement section 64, a temperature detection section 65, a voltage detection section 66, a switch control section 67, a memory 68, a temperature detection element 69, a current detection resistance 70, a cathode terminal 71, and an anode terminal 72 in a housing 60 made of a plastic material and/or the like.

The control section 61 controls operation of the whole battery pack (including operation of the electric power source 62), and may include, for example, a central processing unit (CPU) and/or the like. The electric power source 62 includes one or more secondary batteries (not illustrated). The electric power source 62 may be, for example, an assembled battery including two or more secondary batteries. Connection type of these secondary batteries may be a series-connected type, may be a parallel-connected type, or a mixed type thereof. As an example, the electric power source 62 may include six secondary batteries connected in a manner of dual-parallel and three-series.

The switch section 63 switches the operation of the electric power source 62 (whether or not the electric power source 62 is connectable to an external device) according to an instruction of the control section 61. The switch section 63 may include, for example, a charge control switch, a discharge control switch, a charging diode, a discharging diode, etc. (not illustrated). The charge control switch and the discharge control switch may each be, for example, a semiconductor switch such as a field-effect transistor (MOSFET) using a metal oxide semiconductor.

The current measurement section 64 measures a current with the use of the current detection resistance 70, and outputs the measurement result to the control section 61. The temperature detection section 65 measures temperature with the use of the temperature detection element 69, and outputs the measurement result to the control section 61. The temperature measurement result may be used, for example, for a case in which the control section 61 controls charge and discharge at the time of abnormal heat generation or a case in which the control section 61 performs a correction processing at the time of calculating a remaining capacity. The voltage detection section 66 measures a voltage of the secondary battery in the electric power source 62, performs analog-to-digital conversion on the measured voltage, and supplies the resultant to the control section 61.

The switch control section 67 controls operations of the switch section 63 according to signals inputted from the current measurement section 64 and the voltage detection section 66.

The switch control section 67 executes control so that a charging current is prevented from flowing in a current path of the electric power source 62 by disconnecting the switch section 63 (charge control switch) in the case where, for example, a battery voltage reaches an overcharge detection voltage. Thereby, in the electric power source 62, only discharge is allowed to be performed through the discharging diode. It is to be noted that, for example, in the case where a large current flows at the time of charge, the switch control section 67 blocks the charging current.

Further, the switch control section 67 executes control so that a discharging current is prevented from flowing in the current path of the electric power source 62 by disconnecting the switch section 63 (discharge control switch) in the case where, for example, a battery voltage reaches an overdischarge detection voltage. Thereby, in the electric power source 62, only charge is allowed to be performed through the charging diode. It is to be noted that, for example, in the case where a large current flows at the time of discharge, the switch control section 67 blocks the discharging current.

It is to be noted that, in the secondary battery, for example, the overcharge detection voltage may be 4.20 V±0.05 V, and the over-discharge detection voltage may be 2.4 V±0.1 V.

The memory 68 may be, for example, an EEPROM as a non-volatile memory or the like. The memory 68 may store, for example, numerical values calculated by the control section 61, information of the secondary battery measured in a manufacturing step (such as an internal resistance in the initial state), etc. It is to be noted that, in the case where the memory 68 stores a full charging capacity of the secondary battery, the control section 61 is allowed to comprehend information such as a remaining capacity.

The temperature detection element 69 measures temperature of the electric power source 62, and outputs the measurement result to the control section 61. The temperature detection element 69 may be, for example, a thermistor or the like.

The cathode terminal 71 and the anode terminal 72 are terminals connected to an external device (such as a notebook personal computer) driven using the battery pack or an external device (such as a battery charger) used for charging the battery pack. The electric power source 62 is charged and discharged through the cathode terminal 71 and the anode terminal 72.

[4-2. Electric Vehicle]

Figure 6:
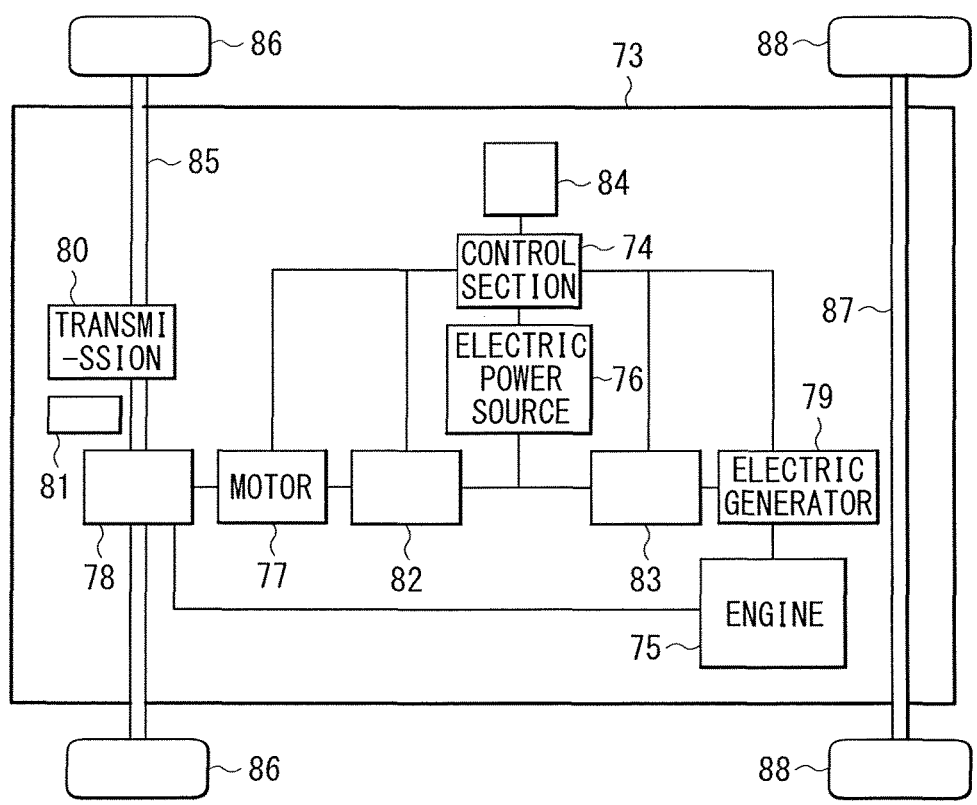
FIG. 6 is a block diagram illustrating a configuration of an application example (an electric vehicle) of the secondary battery.

FIG. 6 illustrates a block configuration of a hybrid automobile as an example of electric vehicles. For example, the electric vehicle may include a control section 74, an engine 75, an electric power source 76, a driving motor 77, a differential 78, an electric generator 79, a transmission 80, a clutch 81, inverters 82 and 83, and various sensors 84 in a housing 73 made of metal. In addition thereto, the electric vehicle may include, for example, a front drive shaft 85 and a front tire 86 that are connected to the differential 78 and the transmission 80, a rear drive shaft 87, and a rear tire 88.

The electric vehicle may run with the use, for example, of one of the engine 75 and the motor 77 as a drive source. The engine 75 is a main power source, and may be, for example, a petrol engine. In the case where the engine 75 is used as a power source, drive power (torque) of the engine 75 may be transferred to the front tire 86 or the rear tire 88 through the differential 78, the transmission 80, and the clutch 81 as drive sections, for example. The torque of the engine 75 may also be transferred to the electric generator 79. Due to the torque, the electric generator 79 generates alternating-current electric power. The alternating-current electric power is converted into direct-current electric power through the inverter 83, and the converted power is stored in the electric power source 76. In contrast, in the case where the motor 77 as a conversion section is used as a power source, electric power (direct-current electric power) supplied from the electric power source 76 is converted into alternating-current electric power through the inverter 82. The motor 77 may be driven by the alternating-current electric power. Drive power (torque) obtained by converting the electric power by the motor 77 may be transferred to the front tire 86 or the rear tire 88 through the differential 78, the transmission 80, and the clutch 81 as the drive sections, for example.

It is to be noted that, alternatively, the following mechanism may be adopted. In the mechanism, when speed of the electric vehicle is reduced by an unillustrated brake mechanism, the resistance at the time of speed reduction is transferred to the motor 77 as torque, and the motor 77 generates alternating-current electric power by the torque. It may be preferable that the alternating-current electric power be converted to direct-current electric power through the inverter 82, and the direct-current regenerative electric power be stored in the electric power source 76.

The control section 74 controls operations of the whole electric vehicle, and, for example, may include a CPU and/or the like. The electric power source 76 includes one or more secondary batteries (not illustrated). Alternatively, the electric power source 76 may be connected to an external electric power source, and electric power may be stored by receiving the electric power from the external electric power source. The various sensors 84 may be used, for example, for controlling the number of revolutions of the engine 75 or for controlling opening level (throttle opening level) of an unillustrated throttle valve. The various sensors 84 may include, for example, a speed sensor, an acceleration sensor, an engine frequency sensor, and/or the like.

It is to be noted that the description has been given above of the hybrid automobile as an electric vehicle. However, examples of the electric vehicles may include a vehicle (electric automobile) working with the use of only the electric power source 76 and the motor 77 without using the engine 75.

[4-3. Electric Power Storage System]

Figure 7:
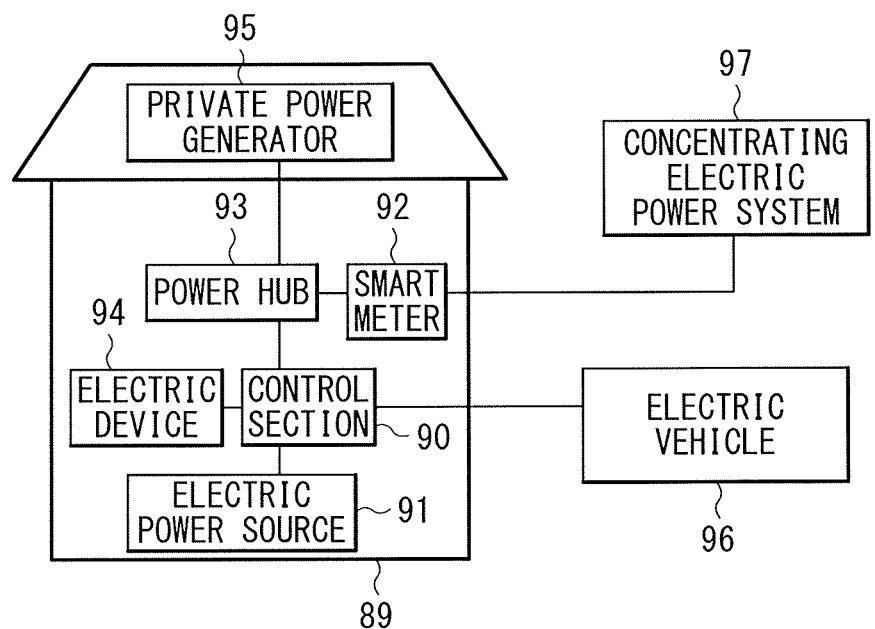
FIG. 7 is a block diagram illustrating a configuration of an application example (an electric power storage system) of the secondary battery.

FIG. 7 illustrates a block configuration of an electric power storage system. For example, the electric power storage system may include a control section 90, an electric power source 91, a smart meter 92, and a power hub 93 inside a house 89 such as a general residence and a commercial building.

In this case, the electric power source 91 may be connected to, for example, an electric device 94 arranged inside the house 89, and may be connected to an electric vehicle 96 parked outside the house 89. Further, for example, the electric power source 91 may be connected to a private power generator 95 arranged inside the house 89 through the power hub 93, and may be connected to an external concentrating electric power system 97 thorough the smart meter 92 and the power hub 93.

It is to be noted that the electric device 94 may include, for example, one or more home electric appliances such as a refrigerator, an air conditioner, a television, and a water heater. The private power generator 95 may be, for example, any one or more of a solar power generator, a wind-power generator, etc. The electric vehicle 96 may be, for example, one or more of an electric automobile, an electric motorcycle, a hybrid automobile, etc. The concentrating electric power system 97 may be, for example, one or more of a thermal power plant, an atomic power plant, a hydraulic power plant, a wind-power plant, etc.

The control section 90 controls operation of the whole electric power storage system (including operation of the electric power source 91), and, for example, may include a CPU and/or the like. The electric power source 91 includes one or more secondary batteries (not illustrated). The smart meter 92 may be, for example, an electric power meter compatible with a network arranged in the house 89 demanding electric power, and may be communicable with an electric power supplier. Accordingly, for example, while the smart meter 92 communicates with outside, the smart meter 92 controls the balance between supply and demand in the house 89 and allows effective and stable energy supply.

In the electric power storage system, for example, electric power may be stored in the electric power source 91 from the concentrating electric power system 97 as an external electric power source through the smart meter 92 and the power hub 93, and electric power may be stored in the electric power source 91 from the private power generator 95 as an independent electric power source through the power hub 93. The electric power stored in the electric power source 91 is supplied to the electric device 94 or to the electric vehicle 96 according to an instruction of the control section 90. Therefore, the electric device 94 becomes operable, and the electric vehicle 96 becomes chargeable. That is, the electric power storage system is a system capable of storing and supplying electric power in the house 89 with the use of the electric power source 91.

The electric power stored in the electric power source 91 is arbitrarily usable. Therefore, for example, electric power is allowed to be stored in the electric power source 91 from the concentrating electric power system 97 in the middle of the night when an electric rate is inexpensive, and the electric power stored in the electric power source 91 is allowed to be used during daytime hours when an electric rate is expensive.

It is to be noted that the foregoing electric power storage system may be arranged for each household (family unit), or may be arranged for a plurality of households (family units).

[4-4. Electric Power Tool]

Figure 8:
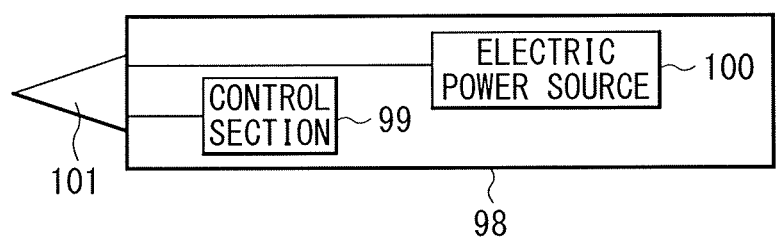
FIG. 8 is a block diagram illustrating a configuration of an application example (an electric power tool) of the secondary battery.

FIG. 8 illustrates a block configuration of an electric power tool. For example, the electric power tool may be an electric drill, and may include a control section 99 and an electric power source 100 in a tool body 98 made of a plastic material and/or the like. For example, a drill section 101 as a movable section may be attached to the tool body 98 in an operable (rotatable) manner.

The control section 99 controls operations of the whole electric power tool (including operation of the electric power source 100), and may include, for example, a CPU and/or the like. The electric power source 100 includes one or more secondary batteries (not illustrated). The control section 99 allows electric power to be supplied from the electric power source 100 to the drill section 101 according to operation of an unillustrated operation switch to operate the drill section 101.

EXAMPLES

Specific examples according to the embodiment of the present application will be described in detail.

Examples 1-1 to 1-42

First, an electrolytic solution material was manufactured, and property of the electrolytic solution material was examined.

Upon manufacturing the electrolytic solution material, a first unsaturated compound, a second unsaturated compound, a phenol-type compound (a Ph-type compound), a phosphorus-containing compound (a P-containing compound), and a sulfur-containing compound (an S-containing compound) were combined as appropriate and mixed, and subsequently, the resultant mixture was stirred. Types and compositions of respective combinations are as illustrated in Table 1 and Table 2. In the following description, the first unsaturated compound and the second unsaturated compound will be referred to collectively as the "first unsaturated compound, etc.," and the Ph-type compound, the P-containing compound, and the S-containing compound will be referred to collectively as the "Ph-type compound, etc." In this case, for comparison, instead of the first unsaturated compound, etc., vinylene carbonate (VC) as unsaturated cyclic ester carbonate was used.

In the first unsaturated compound, etc. before performing after-described conservation treatment, the purity was 99.5%, and the Hazen unit color number (APHA: American Public Healthy Association) indicating color tone was less than 10 (<10).

For examining the purity, the first unsaturated compound, etc. were analyzed with the use of gas chromatograph mass spectroscopy analysis (GC-MS). At the time of analysis, analysis conditions included column of HP-5 ms (30 m, 0.250 mm, 0.25 μm), inlet temperature of 250 deg C., and detector temperature of 280 deg C. In addition thereto, oven temperature was changed from 30 deg C. (fixed for 3 minutes) to 250 deg C. (fixed for 3 minutes) at a temperature increase rate of 10 deg C./min, and a total ion area was obtained from measurement results of respective detection peaks. Further, the measurement method of APHA was based on JIS K-6901. In this case, a reference solution having a concentration mostly approximate to a sample was found, and the number of the reference solution was set to an APAH value.

With regard to the electrolytic solution material, change of the purity of the first unsaturated compound, etc. and change of the APHA of the electrolytic solution material were examined after conservation at ambient temperature (23 deg C. for 100 days) and after conservation at high temperature (45 deg C. for 100 days). Results illustrated in Table 1 and Table 2 were obtained.

TABLE 1

| Example | First unsaturated compound | Second unsaturated compound | Ph-type compound | P-containing compound | S-containing compound | Content (ppm) | Conservation at ambient temperature | | Conservation at high temperature | |
|---|---|---|---|---|---|---|---|---|---|---|
| | | | | | | | Purity (%) | APHA | Purity (%) | APHA |
| 1-1 | Formula (1-1) | — | Formula (3-1) | — | — | 1 | 98.8 | <10 | 97.8 | 200 |
| 1-2 | | | | | | 100 | 99.2 | <10 | 98.8 | 100 |
| 1-3 | | | | | | 500 | 99.5 | <10 | 99.5 | 50 |
| 1-4 | | | | | | 1000 | 99.5 | <10 | 99.5 | 50 |
| 1-5 | | | | | | 10000 | 99.5 | <10 | 99.5 | 50 |
| 1-6 | | | | | | 50000 | 99.5 | <10 | 99.5 | 50 |
| 1-7 | Formula (1-1) | — | — | Formula (4-1) | — | 1 | 98.3 | 20 | 97.2 | 300 |
| 1-8 | | | | | | 100 | 98.7 | <10 | 98.4 | 200 |
| 1-9 | | | | | | 500 | 99.2 | <10 | 98.9 | 100 |
| 1-10 | | | | | | 1000 | 99.2 | <10 | 99 | 50 |
| 1-11 | | | | | | 10000 | 99.2 | <10 | 99 | 50 |
| 1-12 | | | | | | 50000 | 99.2 | <10 | 99 | 50 |
| 1-13 | Formula (1-1) | — | — | — | Formula (5-1) | 1 | 98 | 20 | 97.2 | 300 |
| 1-14 | | | | | | 100 | 98.2 | <10 | 98.4 | 200 |
| 1-15 | | | | | | 500 | 98.8 | <10 | 98.9 | 100 |
| 1-16 | | | | | | 1000 | 99 | <10 | 99 | 100 |
| 1-17 | | | | | | 10000 | 99 | <10 | 99 | 100 |
| 1-18 | | | | | | 50000 | 99 | <10 | 99 | 100 |
| 1-19 | — | Formula (2-1) | Formula (3-1) | — | — | 1 | 99.2 | <10 | 98.6 | 200 |
| 1-20 | | | | | | 100 | 99.5 | <10 | 99.3 | 100 |

TABLE 1-continued

| Example | First unsaturated compound | Second unsaturated compound | Ph-type compound | P-containing compound | S-containing compound | Content (ppm) | Conservation at ambient temperature Purity (%) | APHA | Conservation at high temperature Purity (%) | APHA |
|---|---|---|---|---|---|---|---|---|---|---|
| 1-21 | | | | | | 500 | 99.5 | <10 | 99.5 | 50 |
| 1-22 | | | | | | 1000 | 99.5 | <10 | 99.5 | 50 |
| 1-23 | | | | | | 10000 | 99.5 | <10 | 99.5 | 50 |
| 1-24 | | | | | | 50000 | 99.5 | <10 | 99.5 | 50 |
| 1-25 | — | Formula (2-2) | Formula (3-1) | — | — | 1 | 99.2 | <10 | 98.3 | 200 |
| 1-26 | | | | | | 100 | 99.5 | <10 | 99.1 | 100 |
| 1-27 | | | | | | 500 | 99.5 | <10 | 99.5 | 50 |
| 1-28 | | | | | | 1000 | 99.5 | <10 | 99.5 | 50 |

TABLE 2

| Example | First unsaturated compound | Second unsaturated compound | Ph-type compound | P-containing compound | S-containing compound | Content (ppm) | Conservation at ambient temperature Purity (%) | APHA | Conservation at high temperature Purity (%) | APHA |
|---|---|---|---|---|---|---|---|---|---|---|
| 1-29 | — | Formula (2-2) | Formula (3-1) | — | — | 10000 | 99.5 | <10 | 99.5 | 50 |
| 1-30 | | | | | | 50000 | 99.5 | <10 | 99.5 | 50 |
| 1-31 | Formula (1-1) | — | — | — | — | — | 96.2 | 50 | 92.1 | 500 |
| 1-32 | — | Formula (2-1) | — | — | — | — | 97.9 | 30 | 95.2 | 300 |
| 1-33 | — | Formula (3-1) | — | — | — | — | 97.5 | 30 | 94.5 | 300 |
| 1-34 | VC | | Formula (3-1) | — | — | 0 | 99.5 | <10 | 99.5 | <10 |
| 1-35 | | | | | | 1 | 99.5 | <10 | 99.5 | <10 |
| 1-36 | | | | | | 100 | 99.5 | <10 | 99.5 | <10 |
| 1-37 | | | | | | 500 | 99.5 | <10 | 99.5 | <10 |
| 1-38 | | | | | | 1000 | 99.5 | <10 | 99.5 | <10 |
| 1-39 | | | | | | 10000 | 99.5 | <10 | 99.5 | <10 |
| 1-40 | | | | | | 50000 | 99.5 | <10 | 99.5 | <10 |
| 1-41 | VC | | — | Formula (4-1) | — | 500 | 99.5 | <10 | 99.5 | <10 |
| 1-42 | VC | | — | — | Formula (5-1) | 500 | 99.5 | <10 | 99.5 | <10 |

When only any of the first unsaturated compound, etc. was used, the purity was significantly lowered and the APHA was significantly increased after conservation compared to before conservation. One reason for this may be that any of the first unsaturated compound, etc. was oxidized and degraded in the course of conservation. In particular, as temperature at the time of conservation was higher, such a tendency was more significant.

When the unsaturated cyclic ester carbonate (VC) was used instead of the first unsaturated compound, etc. both the purity and the APHA were not changed after conservation compared to before conservation even though the unsaturated cyclic ester carbonate was combined with any of the Ph-type compound, etc. Such a result shows the following fact. That is, as described above, since oxidation resistivity of the unsaturated cyclic ester carbonate is fundamentally and inherently high, oxidation degradation is less likely to occur even when the unsaturated cyclic ester carbonate is conserved alone.

In contrast, when any of the first unsaturated compound, etc. was combined with any of the Ph-type compound, etc. compared to before conservation, the purity was lowered in some cases and the APHA was increased after conservation. However, compared to the cases in which only any of the first unsaturated compound, etc. was used, both the decreased amount of the purity and the increased amount of the APHA were significantly suppressed. Such a result shows the following fact. That is, as described above, although oxidation resistivity of any of the first unsaturated compound, etc. is fundamentally and inherently low, oxidation degradation of any of the first unsaturated compound, etc. is suppressed by any of the Ph-type compound, etc. in a state that any of the first unsaturated compound, etc. coexists with any of the Ph-type compound, etc.

From the foregoing results, it was found that while any of the Ph-type compound, etc. did not fulfill a special function when any of the Ph-type compound, etc. was used together with the unsaturated cyclic ester carbonate, any of the Ph-type compound, etc. fulfilled such a special function (a function to suppress oxidation degradation) when any of the Ph-type compound, etc. was used together with any of the first unsaturated compound, etc.

Examples 2-1 to 2-55

Next, an electrolytic solution was manufactured with the use of the foregoing electrolytic solution material, and property of the electrolytic solution was examined.

Upon manufacturing the electrolytic solution, an electrolyte salt ($LiPF_6$) and the electrolytic solution material were dispersed in a nonaqueous solvent (ethylene carbonate and diethyl carbonate). In this case, the nonaqueous solvent composition at a weight ratio was ethylene carbonate:diethyl carbonate=50:50, and the content of the electrolyte salt with respect to the nonaqueous solvent was 1 mol/kg. Further, compositions of the electrolytic solution material are as illustrated in Table 3 and Table 4. In these examples, for comparison, instead of the first unsaturated compound, etc. unsaturated cyclic ester carbonate (VC) was used as well. In the electrolytic solution before conservation, the Hazen unit color number (APHA) was 50, and the electric conductivity (mS/cm) was 7.1 mS/cm. It is to be noted that for examining the electric conductivity, electric conductivity at 25 deg C. was measured with the use of an alternating-current bipolar cell.

With regard to the electrolytic solution, changes of the APHA and the electric conductivity after conservation at high temperature (45 deg C. for 100 days) were examined. Results illustrated in Table 3 and Table 4 were obtained.

TABLE 3

| Example | First unsaturated compound | Second unsaturated compound | Content (Wt %) | Ph-type compound | P-containing compound | S-containing compound | Content (ppm) | Conservation at high temperature APHA | Electric conductivity (mS/cm) |
|---|---|---|---|---|---|---|---|---|---|
| 2-1 | Formula (1-1) | — | 0.01 | Formula (3-1) | — | — | 1 | 300 | 6.92 |
| 2-2 | | | | | | | 100 | 100 | 7 |
| 2-3 | | | | | | | 500 | 50 | 7.1 |
| 2-4 | | | | | | | 1000 | 50 | 7.1 |
| 2-5 | | | | | | | 10000 | 50 | 7.1 |
| 2-6 | | | | | | | 50000 | 50 | 7.1 |
| 2-7 | Formula (1-1) | — | 0.1 | Formula (3-1) | — | — | 1 | 300 | 6.85 |
| 2-8 | | | | | | | 100 | 100 | 7 |
| 2-9 | | | | | | | 500 | 50 | 7.05 |
| 2-10 | | | | | | | 1000 | 50 | 7.1 |
| 2-11 | | | | | | | 10000 | 50 | 7.1 |
| 2-12 | | | | | | | 50000 | 50 | 7.1 |
| 2-13 | Formula (1-1) | — | 2 | Formula (3-1) | — | — | 1 | 300 | 6.8 |
| 2-14 | | | | | | | 100 | 200 | 7 |
| 2-15 | | | | | | | 500 | 100 | 7.1 |
| 2-16 | | | | | | | 1000 | 50 | 7.1 |
| 2-17 | | | | | | | 10000 | 50 | 7.1 |
| 2-18 | | | | | | | 50000 | 50 | 7.1 |
| 2-19 | Formula (1-1) | — | 5 | Formula (3-1) | — | — | 1 | 500 | 6.75 |
| 2-20 | | | | | | | 100 | 200 | 7 |
| 2-21 | | | | | | | 500 | 100 | 7.1 |
| 2-22 | | | | | | | 1000 | 50 | 7.1 |
| 2-23 | | | | | | | 10000 | 50 | 7.1 |
| 2-24 | | | | | | | 50000 | 50 | 7.1 |
| 2-25 | Formula (1-1) | — | 10 | Formula (3-1) | — | — | 1 | 500 | 6.52 |
| 2-26 | | | | | | | 100 | 200 | 7 |
| 2-27 | | | | | | | 500 | 100 | 7.1 |
| 2-28 | | | | | | | 1000 | 50 | 7.1 |

TABLE 4

| Example | First unsaturated compound | Second unsaturated compound | Content (Wt %) | Ph-type compound | P-containing compound | S-containing compound | Content (ppm) | Conservation at high temperature APHA | Electric conductivity (mS/cm) |
|---|---|---|---|---|---|---|---|---|---|
| 2-29 | Formula (1-1) | — | 10 | Formula (3-1) | — | — | 10000 | 50 | 7.1 |
| 2-30 | | | | | | | 50000 | 50 | 7.1 |
| 2-31 | Formula (1-1) | — | 5 | — | Formula (4-1) | — | 500 | 100 | 7.1 |
| 2-32 | Formula (1-1) | — | 5 | — | — | Formula (5-1) | 500 | 100 | 7.1 |
| 2-33 | — | Formula (2-1) | 5 | Formula (3-1) | — | — | 500 | 50 | 7.1 |
| 2-34 | — | Formula (2-2) | 5 | Formula (3-1) | — | — | 500 | 50 | 7.1 |
| 2-35 | — | — | — | Formula (3-1) | | | 0 | 50 | 7.1 |
| 2-36 | | | | | | | 1 | 50 | 7.1 |
| 2-37 | | | | | | | 100 | 50 | 7.1 |
| 2-38 | | | | | | | 500 | 50 | 7.1 |
| 2-39 | | | | | | | 1000 | 50 | 7.1 |
| 2-40 | | | | | | | 10000 | 50 | 7.1 |
| 2-41 | | | | | | | 50000 | 50 | 7.1 |
| 2-42 | VC | | 5 | Formula (3-1) | | | 0 | 50 | 7.1 |
| 2-43 | | | | | | | 1 | 50 | 7.1 |
| 2-44 | | | | | | | 100 | 50 | 7.1 |
| 2-45 | | | | | | | 500 | 50 | 7.1 |

TABLE 4-continued

| Example | First unsaturated compound | Second unsaturated compound | Content (Wt %) | Ph-type compound | P-containing compound | S-containing compound | Content (ppm) | Conservation at high temperature APHA | Electric conductivity (mS/cm) |
|---|---|---|---|---|---|---|---|---|---|
| 2-46 | | | | | | | 1000 | 50 | 7.1 |
| 2-47 | | | | | | | 10000 | 50 | 7.1 |
| 2-48 | | | | | | | 50000 | 50 | 7.1 |
| 2-49 | | VC | 5 | — | Formula (4-1) | — | 500 | 50 | 7.1 |
| 2-50 | | VC | 5 | — | — | Formula (5-1) | 500 | 50 | 7.1 |
| 2-51 | — | Formula (2-1) | 5 | — | — | — | — | 300 | 6.4 |
| 2-52 | — | Formula (2-2) | 5 | — | — | — | — | 300 | 6.2 |
| 2-53 | Formula (1-1) | — | 0.1 | | | | — | 300 | 6.8 |
| 2-54 | | | 2 | | | | — | 500 | 6.4 |
| 2-55 | | | 5 | | | | — | >500 | 5.8 |

When only any of the first unsaturated compound, etc. was used, the APHA was significantly increased and the electric conductivity was significantly lowered after conservation compared to before conservation, since such any of the first unsaturated compound, etc. was oxidized and degraded in the course of conservation. In contrast, when only any of the Ph-type compound, etc. was used, both the APHA and the electric conductivity were not changed after conservation compared to before conservation, since any of the first unsaturated compound, etc. as a factor of oxidation and degradation did not exist.

When the unsaturated cyclic ester carbonate (VC) having high oxidation resistivity was used, even though the unsaturated cyclic ester carbonate was combined with any of the Ph-type compound, etc. both the APHA and the electric conductivity were not changed after conservation.

In contrast, when any of the first unsaturated compound, etc. having low oxidation resistivity was combined with any of the Ph-type compound, etc., the APHA was increased and the electric conductivity was decreased in some cases after conservation compared to before conservation. However, since oxidation degradation of any of the first unsaturated compound, etc. was suppressed by any of the Ph-type compound, etc., both the increased amount of the APHA and the decreased amount of the electric conductivity were significantly suppressed, compared to the case using only any of the first unsaturated compound, etc.

Examples 3-1 to 3-43, 4-1 to 4-43, 5-1 to 5-43, and 6-1 to 6-18

Finally, the laminated-film-type lithium ion secondary battery illustrated in FIG. 3 and FIG. 4 was fabricated with the use of the foregoing electrolytic solution, and characteristics of the secondary battery were examined.

Upon fabricating the cathode 33, 90 parts by mass of a cathode active material ($LiCoO_2$), 5 parts by mass of a cathode binder (polyvinylidene fluoride), and 5 parts by mass of a cathode electric conductor (Ketjenblack) were mixed to obtain a cathode mixture. Subsequently, the cathode mixture was dispersed in an organic solvent (N-methyl-2-pyrrolidone) to obtain cathode mixture slurry. Subsequently, after both surfaces of the cathode current collector 33A (an aluminum foil being 15 μm thick) were coated with the cathode mixture slurry uniformly, the cathode mixture slurry was dried to form the cathode active material layer 33B. Finally, the cathode active material layer 33B was compression-molded with the use of a roll pressing machine, and subsequently, the cathode current collector 33A on which the cathode active material layer 33B was formed was cut in the shape of a strip (48 mm×300 mm).

Upon fabricating the anode 34, 90 parts by mass of an anode active material (artificial graphite) and 10 parts by mass of an anode binder (polyvinylidene fluoride) were mixed to obtain an anode mixture. Subsequently, the anode mixture was dispersed in an organic solvent (N-methyl-2-pyrrolidone) to obtain anode mixture slurry. Subsequently, after both surfaces of the anode current collector 34A (an electrolytic copper foil being 15 μm thick) were coated with the anode mixture slurry uniformly, the anode mixture slurry was dried to form the anode active material layer 34B. Finally, the anode active material layer 34B was compression-molded with the use of a roll pressing machine, and subsequently, the anode current collector 34A on which the anode active material layer 34B was formed was cut in the shape of a strip (50 mm×310 mm).

Upon assembling the secondary battery, the cathode lead 31 made of aluminum was welded to the cathode current collector 33A of the cathode 33, and the anode lead 32 made of copper was welded to the anode current collector 34A of the anode 34. Subsequently, the cathode 33 and the anode 34 were layered with the separator 35 (a microporous polyethylene film being 25 μm thick) in between and were spirally wound in the longitudinal direction to fabricate the spirally wound electrode body 30. Thereafter, the protective tape 37 was bonded to the outermost circumference portion thereof. Subsequently, the spirally wound electrode body 30 was sandwiched between two pieces of film-like outer package members 40, and subsequently, the outer edges in three sides of the outer package members 40 were thermally bonded to form the outer package members 40 into the shape of a pouch. The outer package member 40 was a moisture-resistant aluminum laminated film in which a nylon film being 25 μm thick, an aluminum foil being 40 μm thick, and a polypropylene film being 30 μm thick were laminated from outside in this order. Finally, the electrolytic solution was injected into the package members 40, and thereby, the separator 35 was impregnated with the electrolytic solution. Thereafter, the remaining one sides of the package member 40 were thermally bonded under reduced pressure environment. Compositions of the electrolytic solution were as illustrated in Table 5 to Table 11.

As characteristics of the secondary battery, cycle characteristics, conservation characteristics, and load characteristics were examined. Results illustrated in Table 5 to Table 11 were obtained.

Upon examining the cycle characteristics, in order to stabilize battery state, one cycle of charge and discharge was performed on the secondary battery in ambient-temperature environment (23 deg C.), and another one cycle of charge and discharge was performed on the secondary battery in high-temperature environment (60 deg C.) to measure a discharge capacity. Subsequently, the secondary battery was repeatedly charged and discharged in the same environment (60 deg C.) until the total number of cycles reached 100 cycles to measure a discharge capacity. From the result, cycle retention ratio (%)=(discharge capacity at the 100th cycle/discharge capacity at the second cycle)×100 was calculated. At the time of charge, charge was performed at a current of 0.2 C until the voltage reached 4.2 V, and thereafter, charge was performed at a voltage of 4.2 V until the current reached 0.05 C. At the time of discharge, discharge was performed at a current of 0.2 C until the voltage reached 2.5 V. It is to be noted that "0.2 C" and "0.05 C" refer to current values at which the battery capacity (the theoretical capacity) is fully discharged in five hours and 20 hours, respectively.

Upon examining the conservation characteristics, one cycle of charge and discharge was performed on the secondary battery with the battery state stabilized by a procedure similar to that in the case of examining the cycle characteristics in ambient temperature environment (23 deg C.) to measure a discharge capacity. Subsequently, the secondary battery was charged again, and was conserved for 10 days in such a state in a constant-temperature bath (at 60 deg C.), and thereafter, the secondary battery was discharged in ambient temperature environment to measure a discharge capacity. From the result, conservation retention ratio (%), (discharge capacity after conservation/discharge capacity before conservation)×100 was calculated. Charge and discharge conditions were similar to those in the case of examining the cycle characteristics.

Upon examining the load characteristics, one cycle of charge and discharge was performed on the secondary battery with the battery state stabilized by a procedure similar to that in the case of examining the cycle characteristics in ambient temperature environment (23 deg C.) to measure a discharge capacity. Subsequently, the secondary battery was repeatedly charged and discharged in low-temperature environment (−20 deg C.) until the total number of cycles reached 100 cycles to measure a discharge capacity. From the result, load retention ratio (%)=(discharge capacity at the 100th cycle/discharge capacity at the second cycle)×100 was calculated. Charge and discharge conditions were similar to those in the case of examining the cycle characteristics, except that the current at the time of discharge was changed to 1 C. It is to be noted that "1C" refers to a current value at which the battery capacity (the theoretical capacity) is fully discharged in 1 hour.

TABLE 5

| Example | First unsaturated compound | Second unsaturated compound | Content (Wt %) | Ph-type compound | Content (ppm) | Cycle retention ratio (%) | Conservation retention ratio (%) | Load retention ratio (%) |
|---|---|---|---|---|---|---|---|---|
| 3-1 | Formula (1-1) | — | 0.01 | Formula (3-1) | 1 | 66 | 79 | 42 |
| 3-2 | | | | | 100 | 67 | 80 | 44 |
| 3-3 | | | | | 500 | 70 | 82 | 45 |
| 3-4 | | | | | 1000 | 72 | 84 | 45 |
| 3-5 | | | | | 10000 | 70 | 80 | 42 |
| 3-6 | | | | | 50000 | 68 | 80 | 42 |
| 3-7 | Formula (1-1) | — | 0.1 | Formula (3-1) | 1 | 68 | 80 | 44 |
| 3-8 | | | | | 100 | 69 | 82 | 46 |
| 3-9 | | | | | 500 | 72 | 83 | 47 |
| 3-10 | | | | | 1000 | 74 | 84 | 47 |
| 3-11 | | | | | 10000 | 73 | 82 | 44 |
| 3-12 | | | | | 50000 | 70 | 82 | 44 |
| 3-13 | Formula (1-1) | — | 2 | Formula (3-1) | 1 | 70 | 82 | 46 |
| 3-14 | | | | | 100 | 71 | 84 | 48 |
| 3-15 | | | | | 500 | 74 | 85 | 49 |
| 3-16 | | | | | 1000 | 76 | 86 | 49 |
| 3-17 | | | | | 10000 | 75 | 84 | 46 |
| 3-18 | | | | | 50000 | 72 | 84 | 46 |
| 3-19 | Formula (1-1) | — | 5 | Formula (3-1) | 1 | 71 | 84 | 44 |
| 3-20 | | | | | 100 | 72 | 86 | 46 |
| 3-21 | | | | | 500 | 75 | 87 | 47 |
| 3-22 | | | | | 1000 | 77 | 88 | 47 |
| 3-23 | | | | | 10000 | 76 | 86 | 44 |
| 3-24 | | | | | 50000 | 73 | 86 | 44 |
| 3-25 | Formula (1-1) | — | 10 | Formula (3-1) | 1 | 69 | 82 | 42 |
| 3-26 | | | | | 100 | 70 | 84 | 44 |
| 3-27 | | | | | 500 | 73 | 85 | 45 |
| 3-28 | | | | | 1000 | 75 | 86 | 45 |

TABLE 6

| Example | First unsaturated compound | Second unsaturated compound | Content (Wt %) | Ph-type compound | Content (ppm) | Cycle retention ratio (%) | Conservation retention ratio (%) | Load retention ratio (%) |
|---|---|---|---|---|---|---|---|---|
| 3-29 | Formula (1-1) | — | 10 | Formula (3-1) | 10000 | 74 | 84 | 42 |
| 3-30 | | | | | 50000 | 71 | 84 | 42 |
| 3-31 | — | Formula (2-1) | 2 | Formula (3-1) | 500 | 70 | 83 | 46 |
| 3-32 | — | Formula (2-2) | 2 | Formula (3-1) | 500 | 72 | 84 | 46 |
| 3-33 | — | — | — | Formula (3-1) | 0 | 65 | 78 | 42 |
| 3-34 | | | | | 1 | 63 | 77 | 42 |
| 3-35 | | | | | 100 | 60 | 75 | 42 |
| 3-36 | | | | | 500 | 58 | 72 | 40 |
| 3-37 | | | | | 1000 | 55 | 70 | 38 |
| 3-38 | | | | | 10000 | 52 | 68 | 35 |
| 3-39 | | | | | 50000 | 48 | 81 | 35 |
| 3-40 | Formula (1-1) | — | 0.1 | — | — | 65 | 78 | 42 |
| 3-41 | | | 2 | | — | 66 | 79 | 40 |
| 3-42 | | | 5 | | — | 65 | 79 | 38 |
| 3-43 | VC | | 2 | Formula (3-1) | 500 | 63 | 75 | 39 |

TABLE 7

| Example | First unsaturated compound | Second unsaturated compound | Content (Wt %) | P-containing compound | Content (ppm) | Cycle retention ratio (%) | Conservation retention ratio (%) | Load retention ratio (%) |
|---|---|---|---|---|---|---|---|---|
| 4-1 | Formula (1-1) | — | 0.01 | Formula (4-1) | 1 | 66 | 79 | 42 |
| 4-2 | | | | | 100 | 66 | 80 | 42 |
| 4-3 | | | | | 500 | 69 | 80 | 44 |
| 4-4 | | | | | 1000 | 70 | 82 | 44 |
| 4-5 | | | | | 10000 | 68 | 80 | 42 |
| 4-6 | | | | | 50000 | 68 | 80 | 42 |
| 4-7 | Formula (1-1) | — | 0.1 | Formula (4-1) | 1 | 68 | 79 | 42 |
| 4-8 | | | | | 100 | 69 | 80 | 43 |
| 4-9 | | | | | 500 | 72 | 81 | 45 |
| 4-10 | | | | | 1000 | 72 | 82 | 45 |
| 4-11 | | | | | 10000 | 70 | 80 | 42 |
| 4-12 | | | | | 50000 | 69 | 80 | 42 |
| 4-13 | Formula (1-1) | — | 2 | Formula (4-1) | 1 | 70 | 81 | 43 |
| 4-14 | | | | | 100 | 70 | 82 | 45 |
| 4-15 | | | | | 500 | 72 | 84 | 46 |
| 4-16 | | | | | 1000 | 73 | 85 | 46 |
| 4-17 | | | | | 10000 | 70 | 82 | 44 |
| 4-18 | | | | | 50000 | 70 | 82 | 42 |
| 4-19 | Formula (1-1) | — | 5 | Formula (4-1) | 1 | 70 | 82 | 42 |
| 4-20 | | | | | 100 | 71 | 84 | 44 |
| 4-21 | | | | | 500 | 73 | 84 | 44 |
| 4-22 | | | | | 1000 | 72 | 85 | 45 |
| 4-23 | | | | | 10000 | 70 | 84 | 43 |
| 4-24 | | | | | 50000 | 70 | 82 | 42 |
| 4-25 | Formula (1-1) | — | 10 | Formula (4-1) | 1 | 68 | 82 | 42 |
| 4-26 | | | | | 100 | 70 | 84 | 42 |
| 4-27 | | | | | 500 | 72 | 84 | 44 |
| 4-28 | | | | | 1000 | 72 | 85 | 44 |

TABLE 8

| Example | First unsaturated compound | Second unsaturated compound | Content (Wt %) | P-containing compound | Content (ppm) | Cycle retention ratio (%) | Conservation retention ratio (%) | Load retention ratio (%) |
|---|---|---|---|---|---|---|---|---|
| 4-29 | Formula (1-1) | — | 10 | Formula (4-1) | 10000 | 68 | 83 | 42 |
| 4-30 | | | | | 50000 | 68 | 82 | 42 |
| 4-31 | — | Formula (2-1) | 2 | Formula (4-1) | 500 | 69 | 82 | 45 |

TABLE 8-continued

| Example | First unsaturated compound | Second unsaturated compound | Content (Wt %) | P-containing compound | Content (ppm) | Cycle retention ratio (%) | Conservation retention ratio (%) | Load retention ratio (%) |
|---|---|---|---|---|---|---|---|---|
| 4-32 | — | Formula (2-2) | 2 | Formula (4-1) | 500 | 70 | 82 | 45 |
| 4-33 | — | — | — | Formula (4-1) | 0 | 65 | 78 | 42 |
| 4-34 | | | | | 1 | 60 | 75 | 42 |
| 4-35 | | | | | 100 | 58 | 72 | 42 |
| 4-36 | | | | | 500 | 55 | 70 | 40 |
| 4-37 | | | | | 1000 | 52 | 68 | 38 |
| 4-38 | | | | | 10000 | 50 | 65 | 35 |
| 4-39 | | | | | 50000 | 45 | 65 | 35 |
| 4-40 | Formula (1-1) | — | 0.1 | — | — | 65 | 78 | 42 |
| 4-41 | | | 2 | | — | 66 | 79 | 40 |
| 4-42 | | | 5 | | — | 65 | 79 | 38 |
| 4-43 | | VC | 2 | Formula (4-1) | 500 | 61 | 72 | 38 |

TABLE 9

| Example | First unsaturated compound | Second unsaturated compound | Content (Wt %) | S-containing compound | Content (ppm) | Cycle retention ratio (%) | Conservation retention ratio (%) | Load retention ratio (%) |
|---|---|---|---|---|---|---|---|---|
| 5-1 | Formula (1-1) | — | 0.01 | Formula (5-1) | 1 | 65 | 79 | 42 |
| 5-2 | | | | | 100 | 65 | 80 | 42 |
| 5-3 | | | | | 500 | 67 | 80 | 44 |
| 5-4 | | | | | 1000 | 68 | 80 | 44 |
| 5-5 | | | | | 10000 | 65 | 79 | 42 |
| 5-6 | | | | | 50000 | 64 | 79 | 42 |
| 5-7 | Formula (1-1) | — | 0.1 | Formula (5-1) | 1 | 66 | 79 | 42 |
| 5-8 | | | | | 100 | 67 | 80 | 43 |
| 5-9 | | | | | 500 | 68 | 80 | 45 |
| 5-10 | | | | | 1000 | 70 | 81 | 45 |
| 5-11 | | | | | 10000 | 68 | 79 | 42 |
| 5-12 | | | | | 50000 | 67 | 79 | 42 |
| 5-13 | Formula (1-1) | — | 2 | Formula (5-1) | 1 | 68 | 80 | 43 |
| 5-14 | | | | | 100 | 68 | 81 | 45 |
| 5-15 | | | | | 500 | 70 | 82 | 46 |
| 5-16 | | | | | 1000 | 71 | 82 | 46 |
| 5-17 | | | | | 10000 | 68 | 81 | 44 |
| 5-18 | | | | | 50000 | 68 | 80 | 42 |
| 5-19 | Formula (1-1) | — | 5 | Formula (5-1) | 1 | 68 | 81 | 42 |
| 5-20 | | | | | 100 | 68 | 82 | 44 |
| 5-21 | | | | | 500 | 70 | 82 | 44 |
| 5-22 | | | | | 1000 | 70 | 84 | 45 |
| 5-23 | | | | | 10000 | 68 | 82 | 43 |
| 5-24 | | | | | 50000 | 67 | 82 | 42 |
| 5-25 | Formula (1-1) | — | 10 | Formula (5-1) | 1 | 68 | 81 | 42 |
| 5-26 | | | | | 100 | 70 | 83 | 42 |
| 5-27 | | | | | 500 | 72 | 84 | 44 |
| 5-28 | | | | | 1000 | 72 | 84 | 44 |

TABLE 10

| Example | First unsaturated compound | Second unsaturated compound | Content (Wt %) | S-containing compound | Content (ppm) | Cycle retention ratio (%) | Conservation retention ratio (%) | Load retention ratio (%) |
|---|---|---|---|---|---|---|---|---|
| 5-29 | Formula (1-1) | — | 10 | Formula (5-1) | 10000 | 68 | 82 | 42 |
| 5-30 | | | | | 50000 | 68 | 81 | 42 |
| 5-31 | — | Formula (2-1) | 2 | Formula (5-1) | 500 | 69 | 81 | 44 |
| 5-32 | — | Formula (2-2) | 2 | Formula (5-1) | 500 | 70 | 81 | 45 |
| 5-33 | — | — | — | Formula (5-1) | 0 | 65 | 78 | 42 |
| 5-34 | | | | | 1 | 58 | 73 | 42 |

TABLE 10-continued

| Example | First unsaturated compound | Second unsaturated compound | Content (Wt %) | S-containing compound | Content (ppm) | Cycle retention ratio (%) | Conservation retention ratio (%) | Load retention ratio (%) |
|---|---|---|---|---|---|---|---|---|
| 5-35 | | | | | 100 | 55 | 70 | 40 |
| 5-36 | | | | | 500 | 54 | 68 | 38 |
| 5-37 | | | | | 1000 | 50 | 65 | 35 |
| 5-38 | | | | | 10000 | 48 | 62 | 34 |
| 5-39 | | | | | 50000 | 40 | 60 | 32 |
| 5-40 | Formula (1-1) | — | 0.1 | — | — | 65 | 78 | 42 |
| 5-41 | | | 2 | — | — | 66 | 79 | 40 |
| 5-42 | | | 5 | — | — | 65 | 79 | 38 |
| 5-43 | | VC | 2 | Formula (5-1) | 500 | 60 | 70 | 38 |

TABLE 11

| Example | First unsaturated compound | Content (Wt %) | Ph-type compound | P-containing compound | S-containing compound | Content (ppm) | Cycle retention ratio (%) | Conservation retention ratio (%) | Load retention ratio (%) |
|---|---|---|---|---|---|---|---|---|---|
| 6-1 | Formula (1-4) | 2 | Formula (3-1) | — | — | 500 | 71 | 83 | 46 |
| 6-2 | Formula (1-5) | | | | | | 71 | 83 | 48 |
| 6-3 | Formula (1-16) | | | | | | 70 | 84 | 48 |
| 6-4 | Formula (1-18) | | | | | | 70 | 82 | 47 |
| 6-5 | Formula (1-31) | | | | | | 72 | 82 | 47 |
| 6-6 | Formula (1-32) | | | | | | 73 | 83 | 48 |
| 6-7 | Formula (1-4) | 2 | — | Formula (4-1) | — | 500 | 71 | 82 | 46 |
| 6-8 | Formula (1-5) | | | | | | 71 | 82 | 48 |
| 6-9 | Formula (1-16) | | | | | | 70 | 82 | 48 |
| 6-10 | Formula (1-18) | | | | | | 70 | 81 | 47 |
| 6-11 | Formula (1-31) | | | | | | 71 | 81 | 47 |
| 6-12 | Formula (1-32) | | | | | | 71 | 82 | 48 |
| 6-13 | Formula (1-4) | 2 | — | — | Formula (5-1) | 500 | 70 | 82 | 46 |
| 6-14 | Formula (1-5) | | | | | | 70 | 82 | 48 |
| 6-15 | Formula (1-16) | | | | | | 69 | 81 | 48 |
| 6-16 | Formula (1-18) | | | | | | 69 | 81 | 47 |
| 6-17 | Formula (1-31) | | | | | | 70 | 82 | 47 |
| 6-18 | Formula (1-32) | | | | | | 70 | 81 | 48 |

Each of the cycle retention ratio, the conservation retention ratio, and the load retention ratio was changed according to the compositions of the electrolytic solution as described below. In these examples, the cycle retention ratio, the conservation retention ratio, and the load retention ratio in the case of not using any of the first unsaturated compound, etc. and any of the Ph-type compound, etc. are used as references here.

In the case where only any of the first unsaturated compound, etc. was used, the cycle retention ratio and the conservation retention ratio were slightly increased depending on the content compared to the foregoing references, while the load retention ratio was equal to or less than the foregoing reference. In the case where only any of the Ph-type compound, etc. was used, the load retention ratio was equal to or less than the foregoing reference, while the cycle retention ratio and the conservation retention ratio were decreased compared to the foregoing references. From these results, it is predicted that when any of the first unsaturated compound, etc. is combined with any of the Ph-type compound, etc., the cycle retention ratio and the conservation retention ratio become equal to or less than the foregoing references, and the load retention ratio becomes equal to or less than the foregoing reference.

However, in reality, in the case where any of the first unsaturated compound, etc. was combined with any of the Ph-type compound, etc., while the load retention ratio was equal to or larger than the foregoing reference, the cycle retention ratio and the conservation retention ratio were increased compared to the foregoing references. The result shows that, when any of the first unsaturated compound, etc. is combined with any of the Ph-type compound, etc., chemical stability of the electrolytic solution is specifically improved due to synergic action between them, and therefore, an advantageous tendency is obtained contrary to the foregoing prediction.

It is to be noted that, for confirmation, the unsaturated cyclic ester carbonate (VC) was used instead of the first unsaturated compound, etc., and the unsaturated cyclic ester carbonate was combined with any of the Ph-type compound, etc. In this case, a result similar to that of the case where any of the first unsaturated compound, etc. was combined with any of the Ph-type compound, etc. was not obtained. Such a fact that a favorable result was not obtained when the unsaturated cyclic ester carbonate was combined with any of the Ph-type compound, etc. was matched with the experimental results (Table 1 to Table 4) of the electrolytic solution material and the electrolytic solution.

From the results of Table 1 to Table 11, in the case where the electrolytic solution material of the electrolytic solution contained any of the first unsaturated compound, etc. and any of the phenol-type compound, etc., the conservation property (stability) was improved, and the electric conductivity was improved. Therefore, superior property was obtained.

Further, in the case where the electrolytic solution of the secondary battery contained any of the first unsaturated compound, etc. and any of the phenol-type compound, etc., the cycle characteristic, the conservation characteristics, and the load characteristics were secured. Therefore, superior characteristics were obtained.

The present application has been described with reference to the embodiments and Examples. However, the present application is not limited to the examples described in the embodiments and Examples, and various modifications may be made. For example, the description has been given with the specific examples of the case in which the battery structure is the cylindrical-type or the laminated-film-type, and the battery element has the spirally wound structure. However, applicable structures are not limited thereto. The secondary battery of the present application is similarly applicable to a battery having other battery structure such as a square battery, a coin-type battery and a button-type battery, or a battery in which the battery element has other structure such as a laminated structure.

Further, the electrode of the present application is applicable not only to secondary batteries, but also to other electrochemical devices. Examples of such other electrochemical devices may include a capacitor.

Further, with regard to the contents of the phenol-type compound, etc., the description has been given of the appropriate ranges derived from the results of Examples. However, the description does not totally deny a possibility that the contents are out of the foregoing appropriate ranges. That is, the foregoing appropriate ranges are ranges particularly preferable for obtaining the effects of the present application. Therefore, as long as the effects of the present application are obtained, the contents may be out of the foregoing appropriate ranges in some degrees.

It is possible to achieve at least the following configurations from the above-described example embodiments of the disclosure.

(1) An electrolytic solution material including:
one or more of first unsaturated compounds represented by Formula (1) and second unsaturated compounds represented by Formula (2); and
one or more of phenol-type compounds represented by Formula (3), phosphorus-containing compounds represented by Formula (4), and sulfur-containing compounds represented by Formula (5),

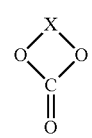

(1)

where X is a divalent group in which m-number of >C=CR1R2 and n-number of >CR3R4 are bonded in any order; each of R1 to R4 is one of a hydrogen group, a halogen group, a monovalent hydrocarbon group, a monovalent oxygen-containing hydrocarbon group, a monovalent halogenated hydrocarbon group, a monovalent halogenated oxygen-containing hydrocarbon group, and a group obtained by bonding two or more thereof to one another; any two or more of the R1 to the R4 may be bonded to one another; and m and n satisfy m≥1 and n≥0,

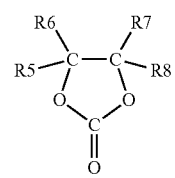

(2)

where each of R5 to R8 is one of a hydrogen group, a monovalent saturated hydrocarbon group, a monovalent unsaturated hydrocarbon group, and a group obtained by bonding two or more thereof to one another; any two or more of the R5 to the R8 may be bonded to one another; and each one or more of the R5 to the R8 is one of a monovalent unsaturated hydrocarbon group and a group obtained by bonding two or more thereof to one another,

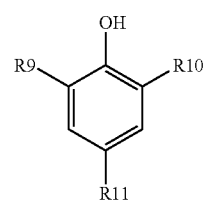

(3)

where each of R9 to R11 is one of a hydrogen group, a halogen group, a hydroxyl group, a monovalent hydrocarbon group, a monovalent oxygen-containing hydrocarbon group, a monovalent halogenated hydrocarbon group, a monovalent halogenated oxygen-containing hydrocarbon group, and a group obtained by bonding two or more thereof to one another; any two or more of the R9 to the R11 may be bonded to one another; and each of one or more of the R9 to the R11 is one of a halogen group, a hydroxyl group, a monovalent hydrocarbon group, a monovalent oxygen-containing hydrocarbon group, a monovalent halogenated hydrocarbon group, a monovalent halogenated oxygen-containing hydrocarbon group, and a group obtained by bonding two or more thereof to one another,

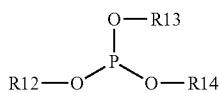

(4)

where each of R12 to R14 is one of a halogen group, a monovalent hydrocarbon group, a monovalent halogenated hydrocarbon group, and a group obtained by bonding two or more thereof to one another; and any two or more of the R12 to the R14 may be bonded to one another,

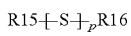

(5)

where each of R15 and R16 is one of a halogen group, a monovalent hydrocarbon group, a monovalent halogenated hydrocarbon group, and a group obtained by bonding two or more thereof to one another; the R15 and the R16 may be bonded to each other; and p is an integer number equal to or larger than 1.

(2) The electrolytic solution material according to (1), wherein the first unsaturated compound includes one or more of compounds represented by Formula (6) and Formula (7), and the second unsaturated compound includes one or more of compounds represented by Formula (8),

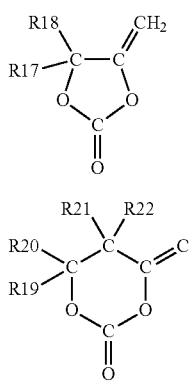

(6)

(7)

where each of R17 to R22 is one of a hydrogen group, a halogen group, a monovalent hydrocarbon group, a monovalent oxygen-containing hydrocarbon group, a monovalent halogenated hydrocarbon group, a monovalent halogenated oxygen-containing hydrocarbon group, and a group obtained by bonding two or more thereof to one another; the R17 and the R18 may be bonded to each other; and any two or more of the R19 to the R22 may be bonded to one another,

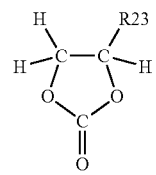

(8)

where R23 is one of a monovalent unsaturated hydrocarbon group and a group obtained by bonding two or more thereof to one another.

(3) The electrolytic solution material according to (1) or (2), wherein the halogen group includes one or more of a fluorine group, a chlorine group, a bromine group, and an iodine group, the monovalent hydrocarbon group includes one or more of an alkyl group having carbon number from 1 to 12 both inclusive, an alkenyl group having carbon number from 2 to 12 both inclusive, an alkynyl group having carbon number from 2 to 12 both inclusive, an aryl group having carbon number from 6 to 18 both inclusive, and a cycloalkyl group having carbon number from 3 to 18 both inclusive, the monovalent oxygen-containing hydrocarbon group includes one or both of an alkoxy group having carbon number from 1 to 12 both inclusive and an ester group, the monovalent halogenated hydrocarbon group includes a group obtained by substituting each of part or all of hydrogen groups out of the monovalent hydrocarbon group by the halogen group, the monovalent halogenated oxygen-containing hydrocarbon group includes a group obtained by substituting each of part or all of hydrogen groups out of the monovalent oxygen-containing hydrocarbon group by the halogen group, the monovalent saturated hydrocarbon group includes one or more of an alkyl group having carbon number from 1 to 12 both inclusive and a cycloalkyl group having carbon number from 3 to 18 both inclusive, and the monovalent unsaturated hydrocarbon group includes one or more of an alkenyl group having carbon number from 2 to 12 both inclusive, an alkynyl group having carbon number from 2 to 12 both inclusive, and an aryl group having carbon number from 6 to 18 both inclusive.

(4) The electrolytic solution material according to any one of (1) to (3), wherein the first unsaturated compound includes one or more of compounds represented by Formula (1-1) to Formula (1-56), the second unsaturated compound includes one or more of compounds represented by Formula (2-1) and Formula (2-2), the phenol-type compound includes one or more of compounds represented by Formula (3-1) to Formula (3-5), the phosphorus-containing compound includes one or more of compounds represented by Formula (4-1) and Formula (4-2), and the sulfur-containing compound includes one or more of compounds represented by Formula (5-1) to Formula (5-3),

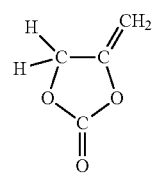

(1-1)

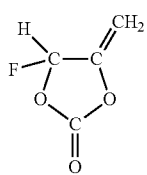 (1-2)
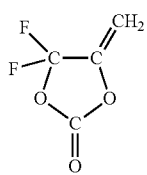 (1-3)
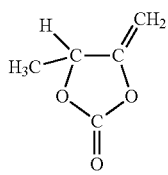 (1-4)
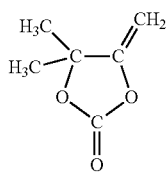 (1-5)
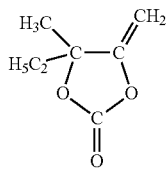 (1-6)
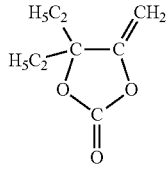 (1-7)
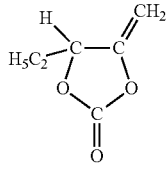 (1-8)
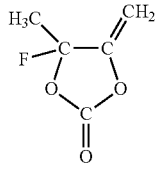 (1-9)
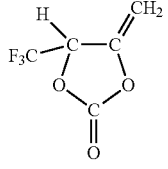 (1-10)
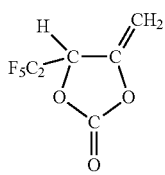 (1-11)
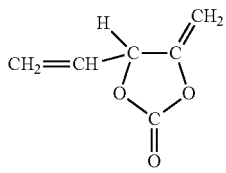 (1-12)
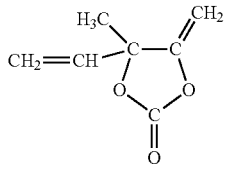 (1-13)
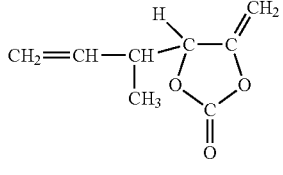 (1-14)
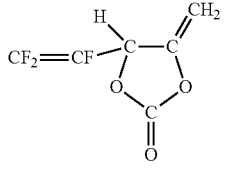 (1-15)
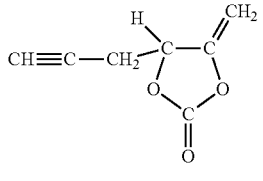 (1-16)
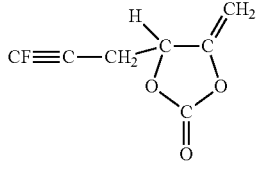 (1-17)
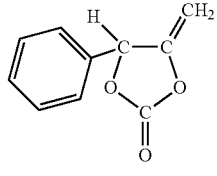 (1-18)
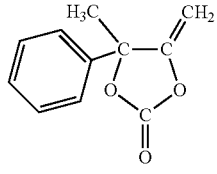 (1-19)

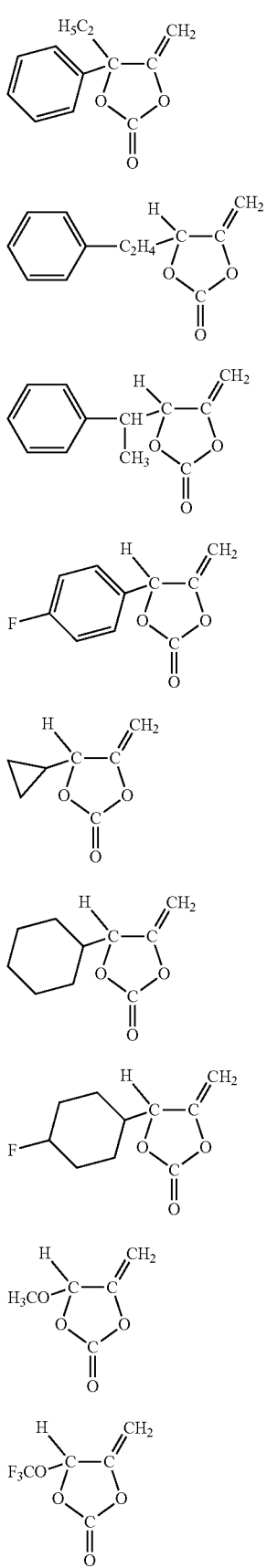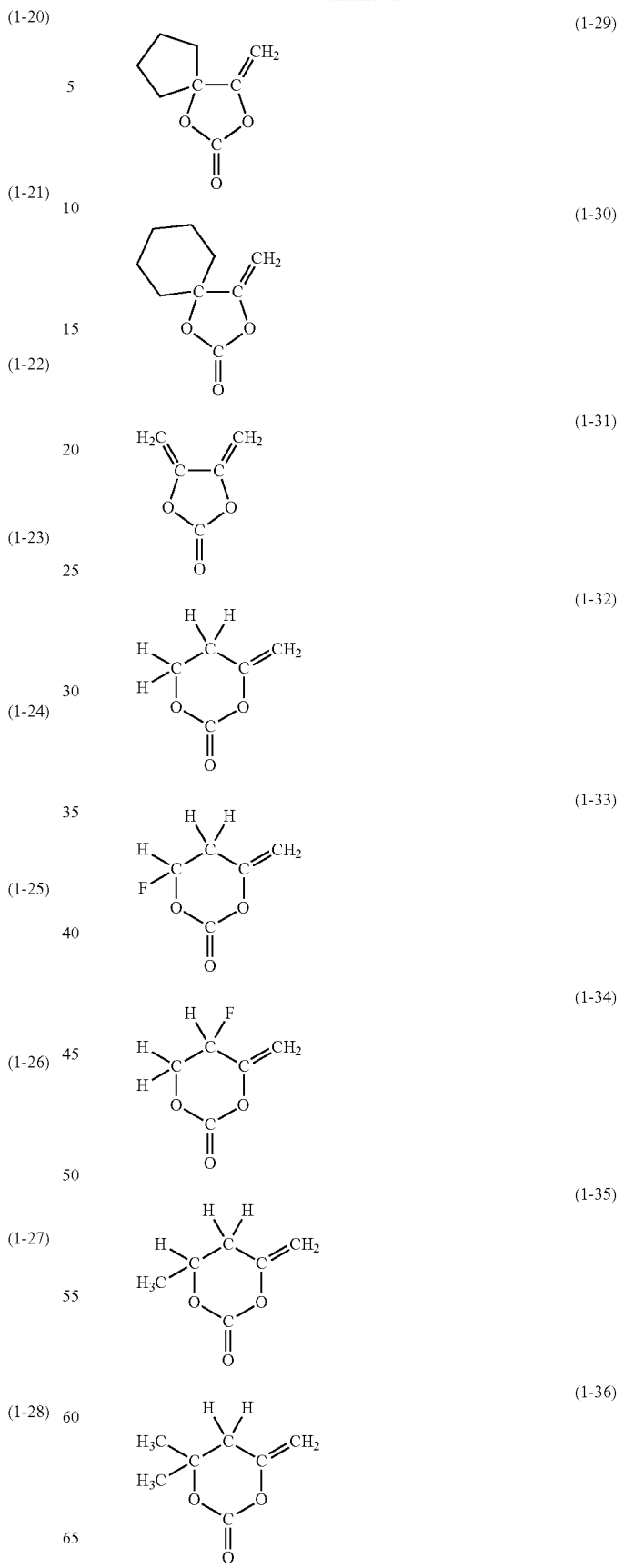

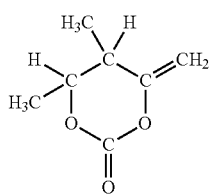 (1-37)
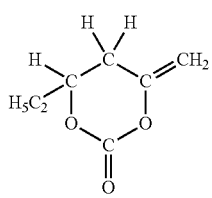 (1-38)
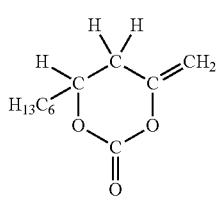 (1-39)
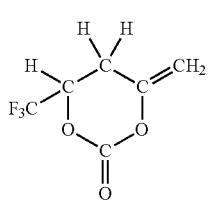 (1-40)
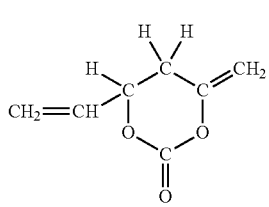 (1-41)
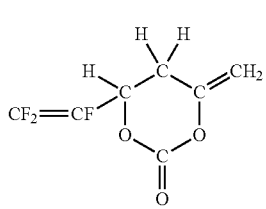 (1-42)
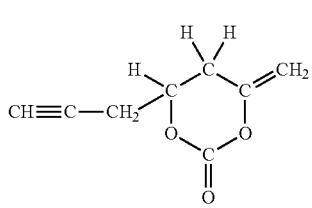 (1-43)
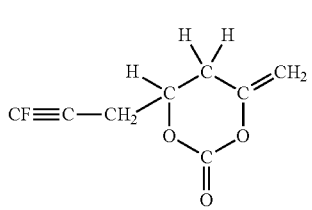 (1-44)
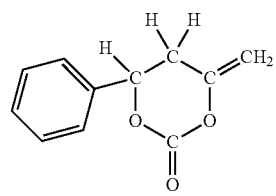 (1-45)
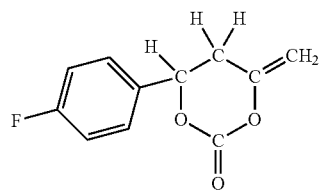 (1-46)
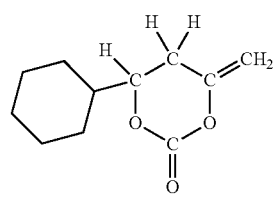 (1-47)
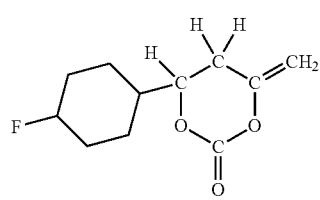 (1-48)
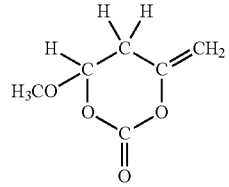 (1-49)
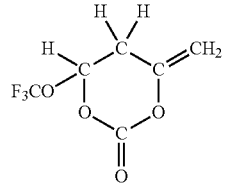 (1-50)
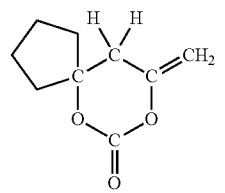 (1-51)
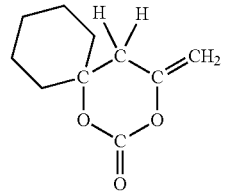 (1-52)

(1-53)
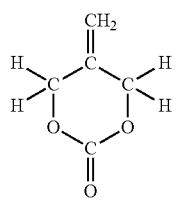
(1-54)
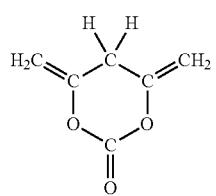
(1-55)
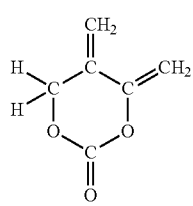
(1-56)
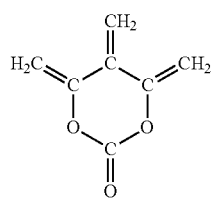
(2-1)
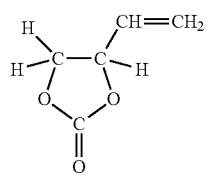
(2-2)
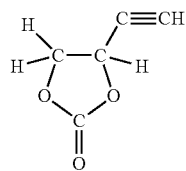
(3-1)
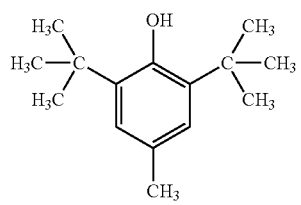
(3-2)
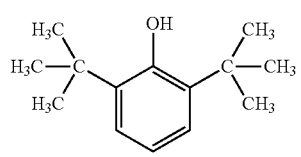
(3-3)
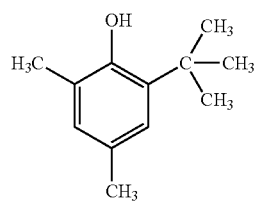
(3-4)
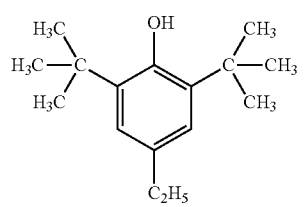
(3-5)
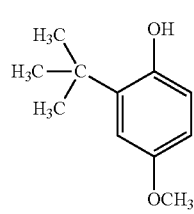
(4-1)
(4-2)
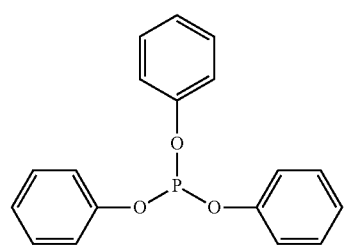
(5-1)
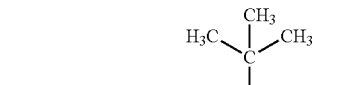
(5-2)

-continued

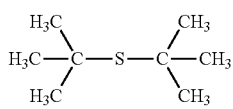
(5-3)

(5) The electrolytic solution material according to any one of (1) to (4), wherein sum of contents of the phenol-type compound, the phosphorus-containing compound, and the sulfur-containing compound is from about 1 parts per million to about 50000 parts per million with respect to sum of contents of the first unsaturated compound and the second unsaturated compound.

(6) The electrolytic solution material according to any one of (1) to (5), wherein the electrolytic solution material is used for an electrolytic solution of a lithium secondary battery.

(7) An electrolytic solution containing an electrolytic solution material together with a nonaqueous solvent and an electrolyte salt, the electrolytic solution material including:

one or more of first unsaturated compounds represented by Formula (1) and second unsaturated compounds represented by Formula (2); and one or more of phenol-type compounds represented by Formula (3), phosphorus-containing compounds represented by Formula (4), and sulfur-containing compounds represented by Formula (5),

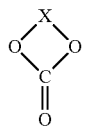
(1)

where X is a divalent group in which m-number of >C=CR1R2 and n-number of >CR3R4 are bonded in any order; each of R1 to R4 is one of a hydrogen group, a halogen group, a monovalent hydrocarbon group, a monovalent oxygen-containing hydrocarbon group, a monovalent halogenated hydrocarbon group, a monovalent halogenated oxygen-containing hydrocarbon group, and a group obtained by bonding two or more thereof to one another; any two or more of the R1 to the R4 may be bonded to one another; and m and n satisfy m≥1 and n≥0,

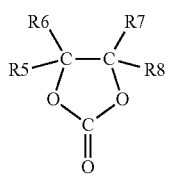
(2)

where each of R5 to R8 is one of a hydrogen group, a monovalent saturated hydrocarbon group, a monovalent unsaturated hydrocarbon group, and a group obtained by bonding two or more thereof to one another; any two or more of the R5 to the R8 may be bonded to one another; and each one or more of the R5 to the R8 is one of a monovalent unsaturated hydrocarbon group and a group obtained by bonding two or more thereof to one another,

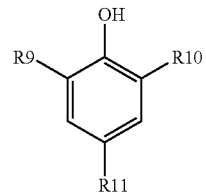
(3)

where each of R9 to R11 is one of a hydrogen group, a halogen group, a hydroxyl group, a monovalent hydrocarbon group, a monovalent oxygen-containing hydrocarbon group, a monovalent halogenated hydrocarbon group, a monovalent halogenated oxygen-containing hydrocarbon group, and a group obtained by bonding two or more thereof to one another; any two or more of the R9 to the R11 may be bonded to one another; and each of one or more of the R9 to the R11 is one of a halogen group, a hydroxyl group, a monovalent hydrocarbon group, a monovalent oxygen-containing hydrocarbon group, a monovalent halogenated hydrocarbon group, a monovalent halogenated oxygen-containing hydrocarbon group, and a group obtained by bonding two or more thereof to one another,

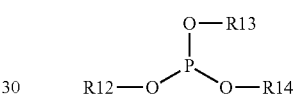
(4)

where each of R12 to R14 is one of a halogen group, a monovalent hydrocarbon group, a monovalent halogenated hydrocarbon group, and a group obtained by bonding two or more thereof to one another; and any two or more of the R12 to the R14 may be bonded to one another, $$R15 \text{---} (S)_p \text{---} R16 \quad (5)$$

where each of R15 and R16 is one of a halogen group, a monovalent hydrocarbon group, a monovalent halogenated hydrocarbon group, and a group obtained by bonding two or more thereof to one another; the R15 and the R16 may be bonded to each other; and p is an integer number equal to or larger than 1.

(8) The electrolytic solution according to (7), wherein sum of contents of the first unsaturated compound and the second unsaturated compound is from about 0.01 weight percent to about 10 weight percent, and sum of contents of the phenol-type compound, the phosphorus-containing compound, and the sulfur-containing compound is from about 1 parts per million to about 50000 parts per million with respect to the sum of the contents of the first unsaturated compound and the second unsaturated compound.

(9) A secondary battery provided with a cathode, an anode, and an electrolytic solution, wherein the electrolytic solution contains an electrolytic solution material together with a nonaqueous solvent and an electrolyte salt, and the electrolytic solution material includes:

one or more of first unsaturated compounds represented by Formula (1) and second unsaturated compounds represented by Formula (2); and one or more of phenol-type compounds represented by Formula (3), phosphorus-containing compounds represented by Formula (4), and sulfur-containing compounds represented by Formula (5),

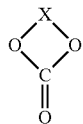
(1)

where X is a divalent group in which m-number of >C=CR1R2 and n-number of >CR3R4 are bonded in any order; each of R1 to R4 is one of a hydrogen group, a halogen group, a monovalent hydrocarbon group, a monovalent oxygen-containing hydrocarbon group, a monovalent halogenated hydrocarbon group, a monovalent halogenated oxygen-containing hydrocarbon group, and a group obtained by bonding two or more thereof to one another; any two or more of the R1 to the R4 may be bonded to one another; and m and n satisfy m≥1 and n≥0,

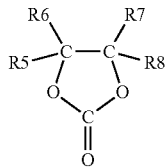
(2)

where each of R5 to R8 is one of a hydrogen group, a monovalent saturated hydrocarbon group, a monovalent unsaturated hydrocarbon group, and a group obtained by bonding two or more thereof to one another; any two or more of the R5 to the R8 may be bonded to one another; and each one or more of the R5 to the R8 is one of a monovalent unsaturated hydrocarbon group and a group obtained by bonding two or more thereof to one another,

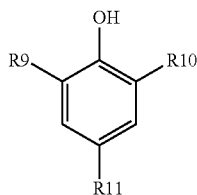
(3)

where each of R9 to R11 is one of a hydrogen group, a halogen group, a hydroxyl group, a monovalent hydrocarbon group, a monovalent oxygen-containing hydrocarbon group, a monovalent halogenated hydrocarbon group, a monovalent halogenated oxygen-containing hydrocarbon group, and a group obtained by bonding two or more thereof to one another; any two or more of the R9 to the R11 may be bonded to one another; and each of one or more of the R9 to the R11 is one of a halogen group, a hydroxyl group, a monovalent hydrocarbon group, a monovalent oxygen-containing hydrocarbon group, a monovalent halogenated hydrocarbon group, a monovalent halogenated oxygen-containing hydrocarbon group, and a group obtained by bonding two or more thereof to one another,

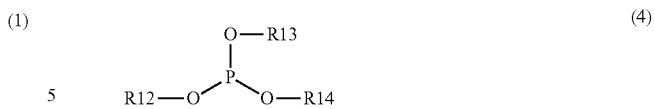
(4)

where each of R12 to R14 is one of a halogen group, a monovalent hydrocarbon group, a monovalent halogenated hydrocarbon group, and a group obtained by bonding two or more thereof to one another; and any two or more of the R12 to the R14 may be bonded to one another,

(5)

where each of R15 and R16 is one of a halogen group, a monovalent hydrocarbon group, a monovalent halogenated hydrocarbon group, and a group obtained by bonding two or more thereof to one another; the R15 and the R16 may be bonded to each other; and p is an integer number equal to or larger than 1.

(10) A battery pack including:
the secondary battery according to (9);
a control section configured to control operation of the secondary battery; and
a switch section configured to switch the operation of the secondary battery according to an instruction of the control section.

(11) An electric vehicle including:
the secondary battery according to (9);
a conversion section configured to convert electric power supplied from the secondary battery into drive power;
a drive section configured to operate according to the drive power; and
a control section configured to control operation of the secondary battery.

(12) An electric power storage system including:
the secondary battery according to (9);
one or more electric devices configured to be supplied with electric power from the secondary battery; and
a control section configured to control supplying of the electric power from the secondary battery to the one or more electric devices.

(13) An electric power tool including:
the secondary battery according to (9); and
a movable section configured to be supplied with electric power from the secondary battery.

(14) An electronic apparatus including
the secondary battery according to (9) as an electric power supply source.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:
1. An electrolytic solution material including:
first unsaturated compounds represented by Formula (1) and second unsaturated compounds represented by Formula (2); and
one or more of phenol-type compounds represented by Formula (3) and phosphorus-containing compounds represented by Formula (4), wherein a sum of contents of the phenol-type compound and the phosphorus-containing compound is from about 1 parts per million to about 50000 parts per million with respect to a sum of contents of the first unsaturated compound and the second unsaturated compound,

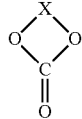
(1)

where X is a divalent group in which m-number of >C=CR1R2 and n-number of >CR3R4 are bonded in any order; each of R1 to R4 is one of a hydrogen group, a halogen group, a monovalent hydrocarbon group, a monovalent oxygen-containing hydrocarbon group, a monovalent halogenated hydrocarbon group, a monovalent halogenated oxygen-containing hydrocarbon group, and a group obtained by bonding two or more thereof to one another; any two or more of the R1 to the R4 may be bonded to one another; and m and n satisfy m≥1 and n≥0,

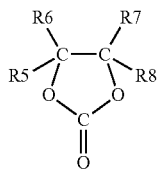
(2)

where each of R5 to R8 is one of a hydrogen group, a monovalent hydrocarbon group, an alkynyl group, an aryl group, and a group obtained by bonding two or more thereof to one another; any two or more of the R5 to the R8 may be bonded to one another;

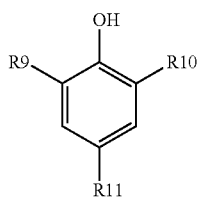
(3)

where each of R9 to R11 is one of a halogen group excluding fluorine, a hydroxyl group, a monovalent halogenated hydrocarbon group, a monovalent halogenated oxygen-containing hydrocarbon group, and a group obtained by bonding two or more thereof to one another; any two or more of the R9 to the R11 may be bonded to one another;

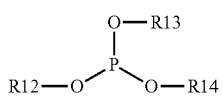
(4)

where each of R12 to R14 is a monovalent saturated hydrocarbon group, a monovalent unsaturated hydrocarbon group, and a group obtained by bonding two or more thereof to one another; and any two or more of the R12 to the R14 may be bonded to one another, wherein the first unsaturated compound includes one or more compounds represented by Formula (1-1) to Formula (1-56), and the second unsaturated compound includes a compound represented by Formula (2-2) as follows:

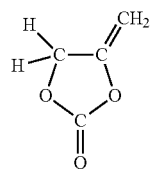
(1-1)

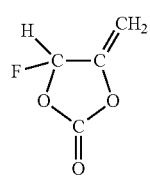
(1-2)

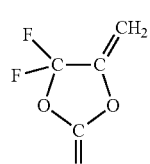
(1-3)

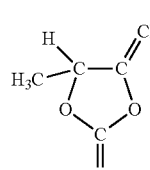
(1-4)

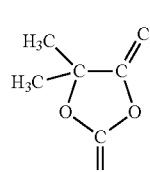
(1-5)

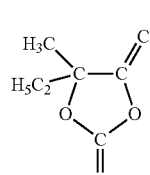
(1-6)

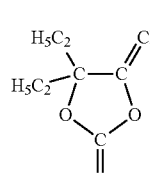
(1-7)

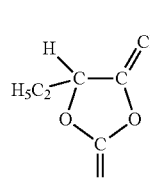
(1-8)

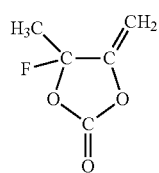 (1-9)
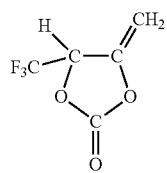 (1-10)
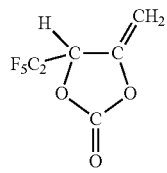 (1-11)
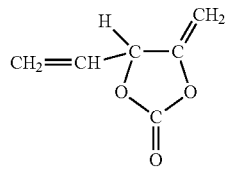 (1-12)
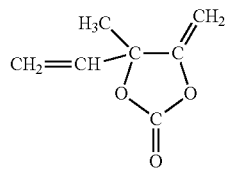 (1-13)
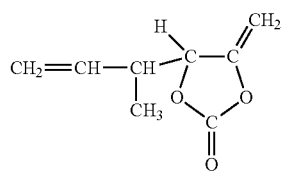 (1-14)
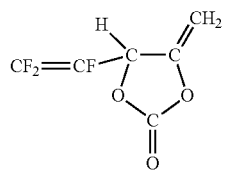 (1-15)
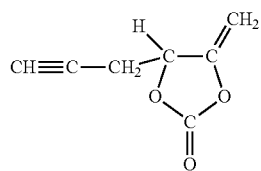 (1-16)
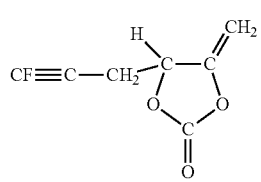 (1-17)
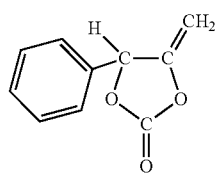 (1-18)
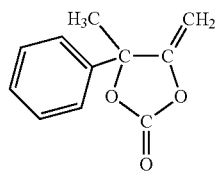 (1-19)
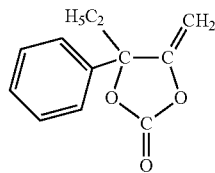 (1-20)
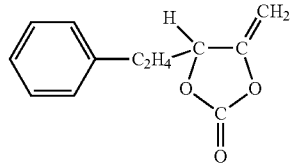 (1-21)
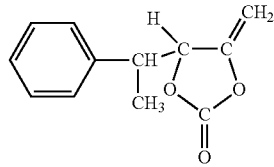 (1-22)
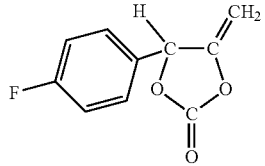 (1-23)
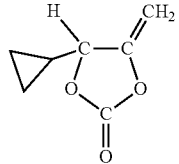 (1-24)
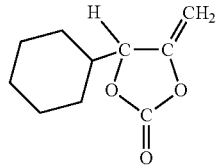 (1-25)
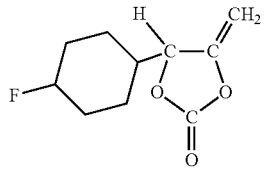 (1-26)

-continued
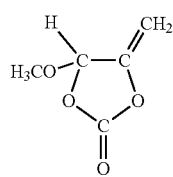 (1-27)
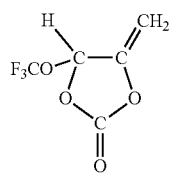 (1-28)
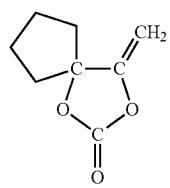 (1-29)
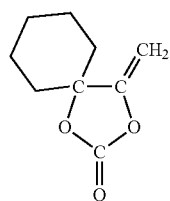 (1-30)
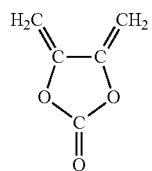 (1-31)
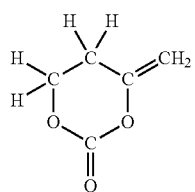 (1-32)
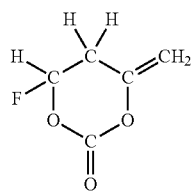 (1-33)
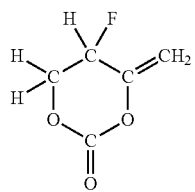 (1-34)
-continued
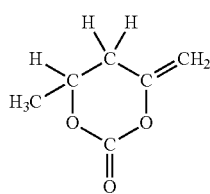 (1-35)
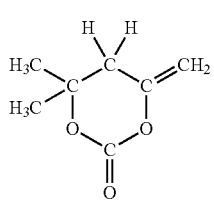 (1-36)
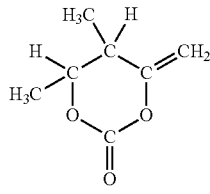 (1-37)
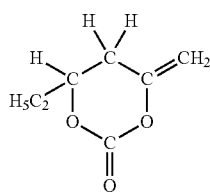 (1-38)
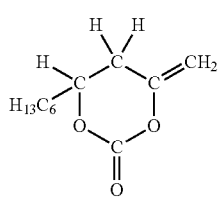 (1-39)
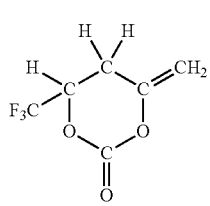 (1-40)
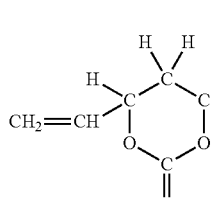 (1-41)
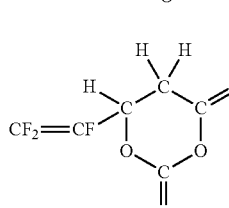 (1-42)

(1-43) 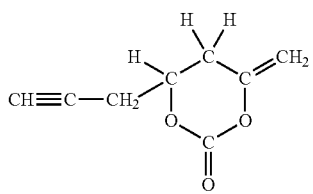
(1-44) 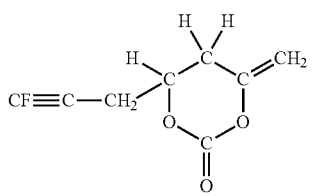
(1-45) 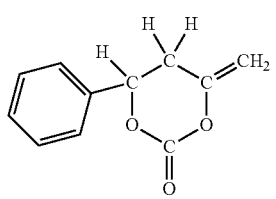
(1-46) 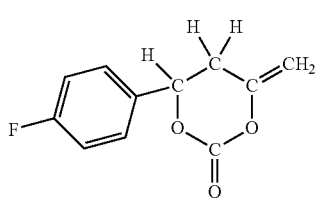
(1-47) 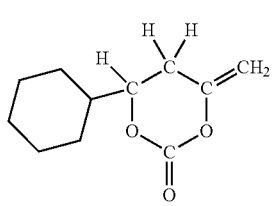
(1-48) 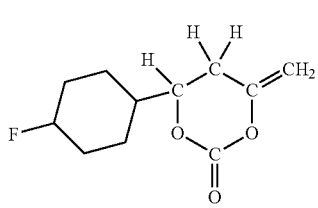
(1-49) 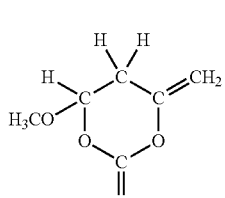
(1-50) 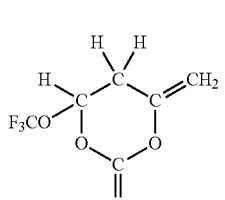
(1-51) 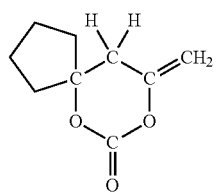
(1-52) 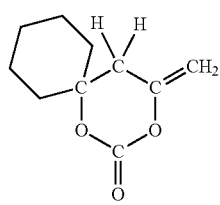
(1-53) 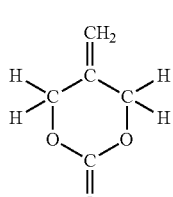
(1-54) 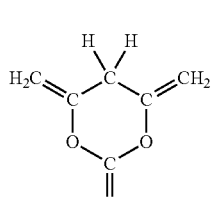
(1-55) 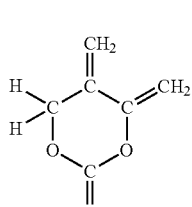
(1-56) 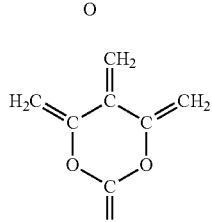
(2-2) 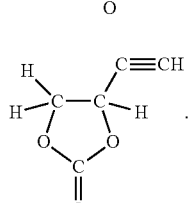
2. The electrolytic solution material according to claim 1, wherein the electrolytic solution material is used for an electrolytic solution of a lithium secondary battery.
3. An electrolytic solution comprising the electrolytic solution material according to claim 1, a nonaqueous solvent and an electrolyte salt.

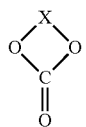
(1)

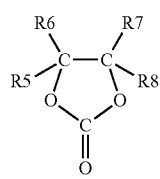
(2)

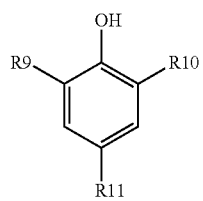
(3)

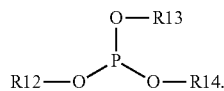
(4)

4. The electrolytic solution according to claim 3, wherein the sum of contents of the first unsaturated compound and the second unsaturated compound is from about 0.01 weight percent to about 10 weight percent.

5. The electrolytic solution according to claim 3, wherein the electrolytic solution material comprising one or more of the phosphorus-containing compounds represented by Formula (4).

6. A secondary battery comprising a cathode, an anode, and an electrolytic solution, wherein the electrolytic solution includes the electrolytic solution material according to claim 1, a nonaqueous solvent and an electrolyte salt.

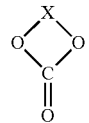
(1)

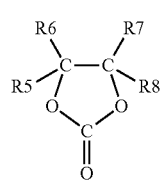
(2)

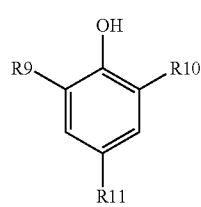
(3)

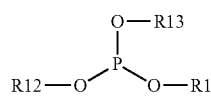
(4)

7. The secondary battery according to claim 6, wherein the electrolytic solution material comprising one or more of the phosphorus-containing compounds represented by Formula (4).

8. The electrolytic solution material according to claim 1 comprising one or more of the phosphorus-containing compounds represented by Formula (4).

* * * * *